United States Patent
Zhang et al.

(10) Patent No.: US 10,568,094 B2
(45) Date of Patent: Feb. 18, 2020

(54) SYSTEMS AND METHODS FOR OFDM CHANNELIZATION

(71) Applicant: Apple Inc., Cupertino, CA (US)

(72) Inventors: Hang Zhang, Nepean (CA); Jianglei Ma, Kanata (CA); Ming Jia, Ottawa (CA); Sophie Vrzic, Nepean (CA); Mo-Han Fong, L'Orignal (CA); Dong-Sheng Yu, Ottawa (CA); Hua Xu, Nepean (CA)

(73) Assignee: Apple Inc., Cupertino, CA (US)

( * ) Notice: Subject to any disclaimer, the term of this patent is extended or adjusted under 35 U.S.C. 154(b) by 35 days.

(21) Appl. No.: 16/021,546

(22) Filed: Jun. 28, 2018

(65) Prior Publication Data
US 2018/0310304 A1   Oct. 25, 2018

Related U.S. Application Data

(63) Continuation of application No. 15/486,594, filed on Apr. 13, 2017, now Pat. No. 10,039,100, which is a (Continued)

(51) Int. Cl.
   *H04W 72/04* (2009.01)
   *H04B 7/12* (2006.01)
   (Continued)

(52) U.S. Cl.
   CPC .......... *H04W 72/0446* (2013.01); *H04B 7/12* (2013.01); *H04L 1/0026* (2013.01); *H04L 5/006* (2013.01); *H04L 5/0007* (2013.01); *H04L 5/0023* (2013.01); *H04L 5/0039* (2013.01); *H04L 5/0041* (2013.01); (Continued)

(58) Field of Classification Search
   CPC .......... H04W 72/0446; H04W 72/0453; H04L 27/26; H04L 1/00; H04L 25/02; H04L 29/06; H04L 5/0041; H04L 1/18; H04L 1/06; H04B 7/12; H04B 7/06; H04B 7/02; H04B 7/1066
   See application file for complete search history.

(56) References Cited

U.S. PATENT DOCUMENTS 6,952,454 B1   10/2005   Jalali et al.
7,028,246 B2   4/2006   Kim et al.
(Continued)

FOREIGN PATENT DOCUMENTS

CA   2402011   9/2001
CA   2537534   3/2005
(Continued)

OTHER PUBLICATIONS

Notification of Reexamination in Chinese Application No. 201110120817.9. dated Jul. 31, 2015, 25 pages.
(Continued)

*Primary Examiner* — Chi Ho A Lee
(74) *Attorney, Agent, or Firm* — Anthony M. Petro; Kowert Hood Munyon Rankin & Goetzel, P.C.

(57) ABSTRACT

Systems and methods for OFDM channelization are provided that allow for the coexistence of sub-band channels and diversity channels. Methods of defining diversity sub-channels and sub-band sub-channels are provided and systematic channel definition and labeling schemes are provided.

20 Claims, 40 Drawing Sheets

Related U.S. Application Data continuation of application No. 15/082,523, filed on Mar. 28, 2016, now Pat. No. 9,629,155, which is a continuation of application No. 14/493,225, filed on Sep. 22, 2014, now Pat. No. 9,307,536, which is a continuation of application No. 13/588,674, filed on Aug. 17, 2012, now Pat. No. 8,842,514, which is a continuation of application No. 11/887,114, filed as application No. PCT/CA2006/000463 on Mar. 30, 2006, now Pat. No. 8,274,880.

(60) Provisional application No. 60/751,101, filed on Dec. 16, 2005, provisional application No. 60/741,923, filed on Dec. 2, 2005, provisional application No. 60/728,845, filed on Oct. 21, 2005, provisional application No. 60/710,527, filed on Aug. 23, 2005, provisional application No. 60/666,548, filed on Mar. 30, 2005.

(51) Int. Cl.

| | | |
|---|---|---|
| *H04L 1/00* | (2006.01) | |
| *H04L 5/00* | (2006.01) | |
| *H04L 25/02* | (2006.01) | |
| *H04L 27/26* | (2006.01) | |
| *H04L 29/06* | (2006.01) | |
| *H04B 7/06* | (2006.01) | |
| *H04L 1/06* | (2006.01) | |
| *H04L 1/18* | (2006.01) | |
| *H04L 25/03* | (2006.01) | |
| *H04B 7/02* | (2018.01) | |

(52) U.S. Cl.
CPC .......... *H04L 5/0046* (2013.01); *H04L 5/0048* (2013.01); *H04L 5/0051* (2013.01); *H04L 5/0085* (2013.01); *H04L 5/0096* (2013.01); *H04L 25/0226* (2013.01); *H04L 27/2627* (2013.01); *H04L 65/1066* (2013.01); *H04W 72/0453* (2013.01); *H04B 7/02* (2013.01); *H04B 7/0669* (2013.01); *H04L 1/0003* (2013.01); *H04L 1/0009* (2013.01); *H04L 1/0071* (2013.01); *H04L 1/0656* (2013.01); *H04L 1/1812* (2013.01); *H04L 1/1887* (2013.01); *H04L 5/0042* (2013.01); *H04L 5/0053* (2013.01); *H04L 25/0228* (2013.01); *H04L 25/03057* (2013.01); *H04L 27/2655* (2013.01)

(56) References Cited

U.S. PATENT DOCUMENTS

| | | |
|---|---|---|
| 7,269,782 B2 | 9/2007 | Kim et al. |
| 7,623,442 B2 | 11/2009 | Laroia et al. |
| 7,813,261 B2 | 10/2010 | Ma et al. |
| 2002/0034161 A1 | 3/2002 | Deneire et al. |
| 2002/0159422 A1 | 10/2002 | Li et al. |
| 2004/0001429 A1 | 1/2004 | Ma et al. |
| 2004/0081073 A1 | 4/2004 | Walton et al. |
| 2004/0178934 A1 | 9/2004 | Balakrishnan et al. |
| 2004/0190636 A1 | 9/2004 | Oprea |
| 2004/0190640 A1 | 9/2004 | Dubuc et al. |
| 2004/0246998 A1 | 12/2004 | Ma et al. |
| 2005/0063378 A1 | 3/2005 | Kadous |
| 2006/0003335 A1 | 1/2006 | Crispino |
| 2006/0088114 A1 | 4/2006 | Chen et al. |
| 2006/0245346 A1 | 11/2006 | Bar-Ness et al. |
| 2006/0256755 A1 | 11/2006 | Matsumoto et al. |
| 2007/0153928 A1 | 7/2007 | Liu et al. |
| 2007/0274252 A1 | 11/2007 | Zhang et al. |
| 2008/0002619 A1 | 1/2008 | Tujkovic et al. |
| 2008/0080628 A1 | 4/2008 | To et al. |
| 2008/0219365 A1 | 9/2008 | Viorel et al. |
| 2008/0274692 A1 | 11/2008 | Larsson |
| 2009/0028258 A1 | 1/2009 | Ma et al. |
| 2009/0141620 A1 | 6/2009 | Hwang et al. |
| 2009/0245392 A1 | 10/2009 | Leung et al. |
| 2009/0245398 A1 | 10/2009 | Oh et al. |
| 2009/0285163 A1 | 11/2009 | Zhang et al. |
| 2010/0086066 A1 | 4/2010 | Chrabieh et al. |
| 2010/0110982 A1 | 5/2010 | Roh et al. |
| 2010/0202545 A1 | 8/2010 | Lim et al. |
| 2010/0316153 A1 | 12/2010 | Wang et al. |
| 2016/0381684 A1 | 12/2016 | Mohamed et al. |

FOREIGN PATENT DOCUMENTS

| | | |
|---|---|---|
| CN | 1448015 | 10/2003 |
| EP | 1198100 | 4/2002 |
| WO | 02/05506 | 1/2002 |
| WO | 2004/004269 | 1/2004 |
| WO | 2005/022811 | 3/2005 |
| WO | 2006/014143 | 2/2006 |

OTHER PUBLICATIONS

Office Action in Chinese Application No. 201310048966.8 dated Apr. 27, 2015, 10 pages.

Office Action in Chinese Application No. 201110120817.9 dated Dec. 30, 2014, 28 pages.

Office Action in Chinese Application No. 200680017818.8 dated Nov. 2, 2010, 6 pages.

International Search Report in Application No. PCT/CA2006/000463 dated Jul. 14, 2006, 1 page.

International Search Report in Application No. PCT/CA2006/000464 dated Jul. 14, 2006, 1 page.

K. Sathananthan, et al., "Adaptive transform scheme to reduce PAR of an OFDM signal," 15th IEEE International Symposium on Personal, Indoor and Mobile Radio Communications, Sep. 5-8, 2004, PIMRC 2004, pp. 1722-1725.

Guangliang Ren, et al., "A Complementary Clipping Transform Technique for the Reduction of Peak-to-Average Power Ratio of OFDM System," IEEE Transactions on Consumer Electronics, vol. 49, No. 4, Nov. 2003, pp. 922-926.

Myonghee Park, et al., "PAPR Reduction in OFDM Transmission using Hadamard Transform," IEEE International Conference on Communications, vol. 1, Jun. 18, 2000-Jun. 22, 2000, ICC 2000, pp. 430-433.

Zbigniew Dlugaszewski, et al., "WHT/OFDM—an Improved OFDM Transmission Method for Selective Fading Channels," Symposium on Communication and Vehicular Technology, Oct. 2000, SCVT-2000, pp. 144-149.

Office Action in U.S. Appl. No. 131047,259 dated Feb. 27, 2013, 13 pages.

Office Action in U.S. Appl. No. 13/047,291 dated Mar. 11, 2013, 17 pages.

Office Action in U.S. Appl. No. 11/887,114 dated Jul. 19, 2011, 6 pages.

European Search Report in Appl. No. 17194152.9 dated Jan. 18, 2018, 6 pages.

| System Bandwidth (MHz) | 20 | 15 | 10 | 5 | 2.5 | 1.25 |
|---|---|---|---|---|---|---|
| FFT Size | 2048 | 1536 | 1024 | 512 | 256 | 128 |
| Number of Used Sub-Carriers | 1201 | 897 | 609 | 305 | 145 | 65 |
| Number of Sub-Bands | 150 | 112 | 76 | 38 | 18 | 8 |
| Number of Channels per TTI | 75 | 56 | 38 | 19 | 9 | 4 |

FIG. 6

SYSTEMS AND METHODS FOR OFDM CHANNELIZATION

PRIORITY CLAIM

The present application is a continuation of U.S. application Ser. No. 15/486,594, filed Apr. 13, 2017, which is a continuation of U.S. application Ser. No. 15/082,523, filed Mar. 28, 2016 (now U.S. Pat. No. 9,629,155), which is a continuation of U.S. application Ser. No. 14/493,225, filed Sep. 22, 2014 (now U.S. Pat. No. 9,307,536), which is a continuation of U.S. application Ser. No. 13/588,674, filed Aug. 17, 2012 (now U.S. Pat. No. 8,842,514), which is a continuation of U.S. application Ser. No. 11/887,114, filed Sep. 25, 2007 (now U.S. Pat. No. 8,274,880), which is a National Stage application from International Application No. PCT/CA2006/000463, filed Mar. 30, 2006, which claims the benefit of priority from five (5) U.S. Provisional Appl. Nos. 60/666,548, filed Mar. 30, 2005; 60/710,527, filed Aug. 23, 2005; 60/728,845, filed Oct. 21, 2005; 60/741,923, filed Dec. 2, 2005; 60/751,101, filed Dec. 16, 2005; the disclosures of each of the above-referenced applications are incorporated by reference herein in their entireties.

BACKGROUND

Field of the Application

The present invention relates to channelization systems and methods for use in OFDM (orthogonal frequency division multiplexing) systems, such as OFDM wireless networks.

Background of the Disclosure

Conventional OFDM systems accommodate slow moving mobile stations in a manner that takes advantage of the fact that it is possible to track the fading in the frequency domain as well as the time domain. In order to take advantage of the slowly changing channel, sub-band scheduling is performed to assign a contiguous set of sub-carriers to each mobile station. In this case, each sub-band mobile station typically reports the carrier to interference ratio (CIR) for each sub-band or only the best sub-bands, where the number of bands to report is specified by the base station.

Conventional OFDM systems accommodate fast moving mobile stations as well. When a mobile station is moving too fast to perform channel sensitive scheduling, sub-carriers are assigned that are distributed over the entire bandwidth. In this case, the mobile station reports a full band CIR rather than a sub-band CIR.

The conventional approach to handling both slow moving mobile stations and fast moving mobile stations has been to have some transmission periods dedicated to slow moving mobile stations, and to have other transmission periods dedicated to fast moving mobile stations. An example of this is shown in FIG. 34 where the breakdown between resource allocation for slow moving mobile stations and fast moving stations is shown with frequency on the vertical access 10, and time on the horizontal axis 12. During some time intervals 14, the entire frequency band is used to support channels with distributed sub-carriers, while other time intervals 15 are used to support channels that are implemented using sub-bands.

SUMMARY

According to one broad aspect, the invention provides a method comprising: transmitting OFDM symbols using a plurality of sub-carriers within an OFDM band; the OFDM symbols collectively containing diversity channels and sub-band channels, each diversity channel utilizing a plurality of sub-carriers distributed across the OFDM band, and each sub-band channel utilizing a contiguous set of sub-carriers within the OFDM band; at least some of the OFDM symbols simultaneously including sub-carriers utilized by a sub-band channel and sub-carriers utilized by a diversity channel.

In some embodiments, the method further comprises: sub-dividing the plurality of sub-carriers into resource blocks, each resource block comprising a fixed number of contiguous sub-carriers over at least one OFDM symbol duration; using each resource block in its entirety for one of sub-band channel use or distributed channel use.

In some embodiments, the method further comprises: assigning each resource block to either sub-band channel use or distributed channel use in a manner that is statically defined.

In some embodiments, the method further comprises: assigning each resource block to either sub-band channel use or distributed channel in a manner that changes over time.

In some embodiments, the method further comprises: transmitting at least one reference OFDM symbol for each fixed size set of traffic OFDM symbols.

In some embodiments, each diversity channel comprises a plurality of resource blocks spaced in frequency.

In some embodiments, the plurality of resource blocks spaced in frequency for a given diversity channel are simultaneously transmitted.

In some embodiments, the plurality of resource blocks spaced in frequency for a given diversity channel are transmitted during different OFDM symbols.

In some embodiments, transmitting OFDM symbols using a plurality of sub-carriers within an OFDM band is performed for each of a plurality of antennas, the method further comprising: for each antenna, transmitting a respective set of scattered pilots, the sets of scattered pilots being transmitted so as not to interfere with each other.

In some embodiments, the method further comprises: for each antenna, transmitting at least one reference OFDM symbol; and for each fixed size set of traffic OFDM symbols, the scattered pilots being transmitted during the reference symbol.

In some embodiments, the method further comprises transmitting at least one reference OFDM symbol for each fixed size set of traffic; and for each antenna transmitting some of the respective set of scattered pilots during the reference symbol and some of the scattered pilots during traffic symbols.

In some embodiments, the scattered pilots are inserted in a diamond shaped lattice pattern for each antenna.

In some embodiments, the method further comprises: defining a slot to contain an N×M resource block space by dividing the plurality of OFDM sub-carriers into N≥2 sub-bands in frequency transmitted over M≥1 sub-slots in time, each sub-slot containing L≥1 OFDM symbol; allocating each resource block in its entirety for one of diversity channel use or sub-band channel use.

In some embodiments, the method further comprises: for each slot, allocating resource blocks for sub-band channel use first, and allocating remaining resource blocks for diversity channel use.

In some embodiments, the method comprises: for each slot, defining a set of diversity sub-channels using sub-carriers of resource blocks left over after sub-band channel assignment, and assigning each diversity channel to be transmitted during the slot at least one diversity sub-channel.

In some embodiments, the diversity sub-channels are systematically defined such that given a set of resource blocks left over after sub-band channel assignment, an identical set of diversity sub-channels will always result.

In some embodiments, diversity sub-channels are assigned to diversity channels using a sub-channelization tree having multiple levels, with a first level in the tree comprising a plurality of nodes each representing a single diversity sub-channel, and each subsequent level in the tree comprising one or more nodes, each node in a subsequent level combining at least two nodes of a previous level and representing all sub-channels represented by the at least two nodes of the previous level.

In some embodiments, each diversity channel comprises a set of one or more diversity sub-channels represented by a respective single node in the sub-channelization tree.

In some embodiments, the method further comprises: signaling diversity channel definitions by sending information associating each diversity channel with the respective single node in the sub-channelization tree, and sending a user identifier for each diversity channel.

In some embodiments, each diversity sub-channel comprises: at least one sub-carrier in corresponding sub-carrier positions within each resource block available for diversity channel use.

In some embodiments, diversity sub-channels are defined using a sub-channelization tree based on sub-carriers within a single sub-band leftover-space-wise sub-channelization.

In some embodiments, defining a set of diversity sub-channels using sub-carriers of resource blocks left over after sub-band channel assignment comprises performing left-over-space-wise sub-channelization.

In some embodiments, diversity sub-channels are defined using a sub-channelization tree based on all sub-carriers available in the resource blocks left over after sub-band channel assignment in a given slot, and diversity channels are assigned to be transmitted on diversity sub-channels on a slot-wise basis.

In some embodiments, diversity sub-channels are defined using a sub-channelization tree based on all sub-carriers available in the resource blocks left over after sub-band channel assignment in a given sub-slot, and diversity channels are assigned to sub-channels on a sub-slot-wise basis.

In some embodiments, each diversity sub-channel includes a respective set of OFDM sub-carriers over multiple consecutive OFDM symbols.

In some embodiments, each diversity sub-channel is transmitted over multiple OFDM symbols, and comprises a respective set of OFDM sub-carriers that changes in a systematic manner within the multiple OFDM symbols.

In some embodiments, the method further comprises: sending signaling information that indicates which resource blocks are assigned to sub-band channels and which blocks are available to diversity channels.

In some embodiments, sending signaling information comprises: sending a two dimensional bitmap that indicates for the N×M resource block space which resource blocks are assigned to sub-band channels and which blocks are available to diversity channels.

In some embodiments, sending signaling information comprises: sending a one-dimensional bit map containing a single bit indicating for each sub-band whether or not sub-band channels are to be included in that sub-band; for each one bit in the one-dimensional bit map, sending information that identifies a number of users, and for each user, start sub-slot index, and number of sub-slots.

In some embodiments, the method further comprises: assigning a unique region identifier to each resource block, and sending the region identifier to indicate that the region is being used for a sub-band channel.

In some embodiments, the method further comprises: for each sub-band channel and each diversity channel, sending a respective user identifier.

In some embodiments, defining a set of diversity sub-channels using sub-carriers of resource blocks left over after sub-band channel assignment comprises: for each slot, defining a respective set of diversity sub-channels that use the available sub-carriers for the slot; combining all of the sub-channels into a sub-channelization tree that defines allowable combinations of the sub-channels.

In some embodiments, the method further comprises: using a time domain tree to identify consecutive OFDM symbols within a slot; using a frequency domain tree to identify contiguous sub-bands; defining each sub-band channel using a combination of the time domain tree and the frequency domain tree.

In some embodiments, the time domain tree identifies consecutive symbols within a slot always including a first symbol within the slot.

In some embodiments, the method further comprises defining names for each possible sub-band channel by performing one of: assigning a region ID to each node in the time domain tree and assigning a region ID to each node in the frequency domain tree; assigning a region ID to each node in the time domain tree and using a bit map to identify nodes in the frequency domain tree; using a bit map to identify nodes in the time domain tree, and assigning a region ID to each node in the frequency domain tree; using a first bit map to identify nodes in the time domain tree, and using a second bit map to identify nodes in the frequency domain tree; using a bit map to identify each possible time domain tree node plus frequency domain tree node combination; assigning a region ID to each time domain tree node plus frequency domain tree node combination.

In some embodiments, the method further comprises: identifying sub-band channels by: sending information that identifies which resource blocks are available for sub-band channels; using a systematic naming convention to name each permutation of one or more contiguous sub-bands over one or more consecutive sub-slots; for each sub-band channel, transmitting a user identifier and a name from the systematic naming convention that identifies the particular permutation of one or more contiguous sub-bands over one or more consecutive sub-slots assigned to that user.

In some embodiments, sending information that identifies which resource blocks are available for sub-band channels comprises sending a bit map.

In some embodiments, the method comprises: defining sub-band sub-channels using all of the plurality of OFDM sub-carriers; defining diversity sub-channels using all of the plurality of OFDM sub-carriers; assigning each sub-band channel one or more sub-band sub-channels; assigning each diversity sub-channel one or more diversity sub-channels.

In some embodiments, the method further comprises: where there is a conflict between a sub-band channel and a diversity channel on a given sub-carrier, sending the sub-band channel on the sub-carrier.

In some embodiments, the method further comprises: using a sub-band sub-channelization tree in time and/or frequency to organize sub-band sub-channels into allowable combinations for sub-band channels; using a diversity sub-channelization tree in time and/or frequency to organize diversity sub-channels into allowable combinations for diversity channels.

In some embodiments, the method further comprises: using a bitmap or region identifiers to indicate which of the allowable combinations of sub-band basic access units are being used as sub-band channels, and which of the allowable combinations of diversity sub-channels are being used as diversity channels.

In some embodiments, the method further comprises: for each sub-band channel or diversity sub-channel, sending a respective user identifier.

In some embodiments, the method further comprises performing partial tree activation by: using a respective sub-channelization tree to organize sub-channels into allowable channels for at least one of diversity channel definition and sub-band channel definition; for at least one sub-channelization tree activating a portion of the sub-channelization tree and sending information identifying the portion; assigning channels from the portion of the sub-channelization tree.

In some embodiments, activating a portion of the sub-channelization tree comprises activating a certain set of consecutive levels within the tree.

In some embodiments, activating a portion of the sub-channelization tree comprises activating a respective set of consecutive levels within the tree for each of a respective set of at least one defined top node.

In some embodiments, the set of consecutive levels are defined by a respective top level and a respective bottom level for each top node.

In some embodiments, the set of consecutive levels are defined by the top node and a respective bottom level for the top node.

In some embodiments, activating a portion of the sub-channelization tree comprises: employing a first bitmap to identify a subset of nodes of the sub-channelization tree that are active.

In some embodiments, the method further comprises: using a second bitmap to identify which nodes of the subset of nodes are being assigned, and for each node being assigned, assigning a user identifier.

In some embodiments, the method further comprises: updating the partial tree activation from time to time.

In some embodiments, updating the partial tree activation from time to time comprises: sending update information only for segments of the tree that have changed.

In some embodiments, the method comprises, for each segment to be changed: sending an indication of the segment that is to be changed; sending updated activation information for the segment.

In some embodiments, the method further comprises: dynamically powering off a partial resource of bandwidth.

In some embodiments, the method further comprises: dynamically powering off a partial resource of bandwidth.

In some embodiments, the method further comprises sending information identifying which resources have been powered off.

In some embodiments, sending information identifying which resources have been powered off comprises one of: sending a two dimensional bit map indicating which resource blocks are powered off; sending a one dimensional bit map indicating which sub-bands are powered off; sending a one dimensional bit map indicating which sub-bands are powered off at some point in the slot, and sending additional information indicating when they are powered off within the slot.

In some embodiments, the method further comprises: scheduling each receiver to either a sub-band channel or a diversity channel as a function of information received from receivers.

In some embodiments, the method further comprises: defining a priority for each receiver; attempting to schedule each receiver in order of priority.

In some embodiments, attempting to schedule each receiver in order of priority comprises: if the receiver is a sub-band channel receiver, attempting to assign a sub-band channel to the receiver; if the receiver is a diversity channel receiver, attempting to assign a diversity channel to the receiver.

In some embodiments, attempting to assign a sub-band channel to the receiver comprises: receiving a selection of one or selected sub-bands the receiver has chosen; if the selected sub-band are available, determining if scheduling the receiver using the selected sub-bands will impact already scheduled diversity users and if not scheduling the receiver using the available selected sub-bands; if the selected sub-band are available and scheduling the receiver using the selected sub-bands will impact already scheduled diversity users, attempting to re-schedule at least one impacted diversity user and if successful in re-scheduling the receiver using the available selected sub-bands.

In some embodiments, the method further comprises: allocating some resources persistently over multiple slots and allocating other resources non-persistently.

In some embodiments, the method further comprises: allocating some resources persistently at the beginning of each slot, and signaling information indicating how much resource has been allocated persistently, with non-persistent allocations following the persistent allocations.

In some embodiments, the method further comprises using asynchronous HARQ for retransmission, and assigning all retransmitted packets a higher priority than non-retransmitted packets.

In some embodiments, a method further comprises: for a given scheduling period, allocating sub-band channels up to an allocation threshold.

In some embodiments, for a given scheduling period, allocating sub-band channels up to an allocation threshold comprises: allocating sub-band channels first up to the allocation threshold; defining diversity channels using sub-carriers left over after sub-band channel assignment.

In some embodiments, for a given scheduling period, allocating sub-band channels up to an allocation threshold comprises: allocating sub-band channels up to the allocation threshold; defining diversity sub-channels using all OFDM sub-carriers, and allocating diversity sub-channels to diversity channels; transmitting each diversity channel punctured in sub-carrier locations that are common between the diversity channel and an assigned sub-band channel.

In some embodiments, the method further comprises: persistently allocating a sub-band or diversity channel transmission resource for VoIP traffic.

In some embodiments, the method further comprises: using one of two MCS (modulation and coding scheme) levels VoIP traffic by assigning one of the two MCS levels at a beginning of a call and only changing the MCS level if a significant change in a receiver's average reported CQI is detected.

In some embodiments, the method further comprises: if a mobile station reports a CQI that maps to a higher MCS than an operating MCS, decreasing a transmit power by an amount specified for the difference between the two MCS levels; and if the mobile station reports a CQI that maps to a lower MCS than the operating MCS then performing no power adjustment.

According to another broad aspect, the invention provides a method comprising: receiving OFDM symbols using a plurality of sub-carriers within an OFDM band; the OFDM symbols collectively containing diversity channels and sub-band channels, each diversity channel utilizing a plurality of sub-carriers distributed across the OFDM band, and each sub-band channel utilizing a contiguous set of sub-carriers within the OFDM band; at least some of the OFDM symbols simultaneously including sub-carriers utilized by a sub-band channel and sub-carriers utilized by a diversity channel; receiving signaling information indicating which diversity channel or sub-band channel to extract.

In some embodiments, the method further comprises: receiving signaling information allowing a determination of how diversity channels and sub-band channels are defined.

In some embodiments, the signaling information comprises an identification of which sub-carriers are occupied by sub-band channels, the diversity channels being systematically defined using left over sub-carriers.

In some embodiments, a receiver is adapted to implement the method as summarized above.

In some embodiments, a transmitter is adapted to implement the method as summarized above.

According to another broad aspect, the invention provides a transmitter comprising: an OFDM modulator that produces OFDM symbols for transmission from a plurality of inputs; a channelizer that maps symbols to inputs of the OFDM modulator such that the OFDM symbols collectively contain diversity channels and sub-band channels, each diversity channel utilizing a plurality of sub-carriers distributed across an OFDM band, and each sub-band channel utilizing a contiguous set of sub-carriers within the OFDM band, such that at least some of the OFDM symbols simultaneously including sub-carriers utilized by a sub-band channel and sub-carriers utilized by a diversity channel.

According to another broad aspect, the invention provides a system comprising: at least one transmitter and at least one receiver; the at least one transmitter and the at least one receiver communicating using OFDM symbols that collectively contain diversity channels and sub-band channels, each diversity channel utilizing a plurality of sub-carriers distributed across an OFDM band, and each sub-band channel utilizing a contiguous set of sub-carriers within the OFDM band, such that at least some of the OFDM symbols simultaneously including sub-carriers utilized by a sub-band channel and sub-carriers utilized by a diversity channel.

BRIEF DESCRIPTION OF THE DRAWINGS

Preferred embodiments of the invention will now be described with reference to the attached drawings in which:

FIG. 6 is a table showing example parameters for sub-band definition;

DETAILED DESCRIPTION

A broad aspect of the invention provides an OFDM channelization system and method in which sub-band channels and diversity channels are transmitted simultaneously within the same OFDM symbol. Each sub-band channel employs a contiguous set of sub-carriers. Each diversity channel includes a set of sub-carriers that are not entirely contiguous, and that are diversity throughout across a frequency band. The conventional meaning of non-contiguous applies here, namely that there are at least some gaps between some of the sub-carriers.

Figure 1A:
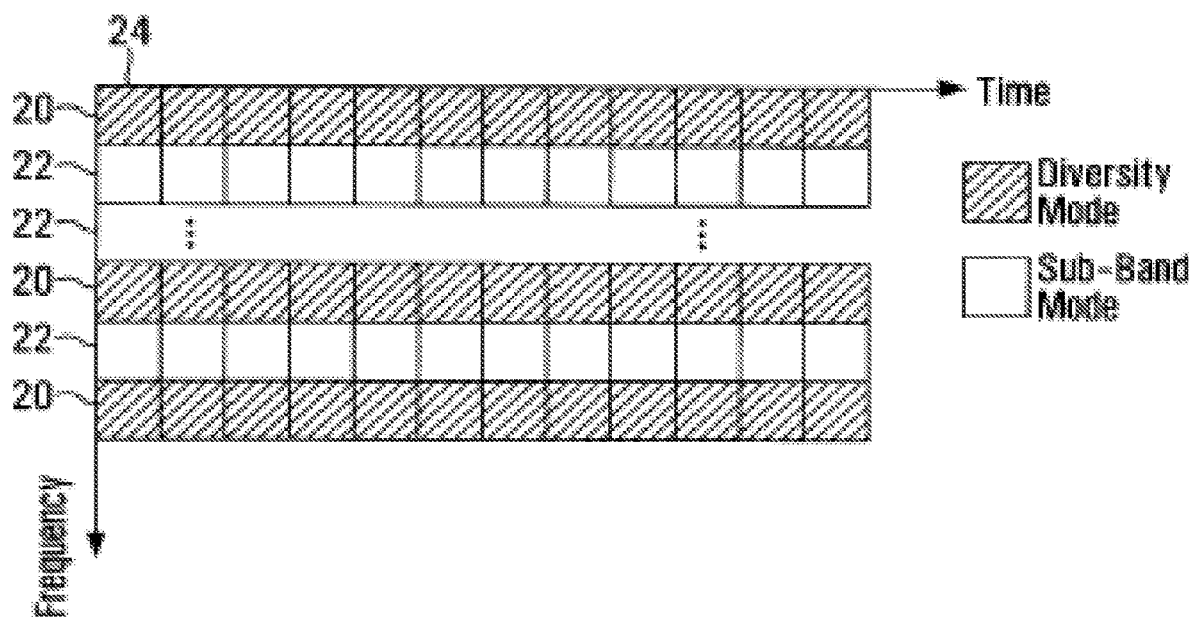
FIGS. 1A and 1B are diagrams of OFDM symbol structures that allow for the co-existence of both sub-band channels and diversity channels.
Figure 1B:
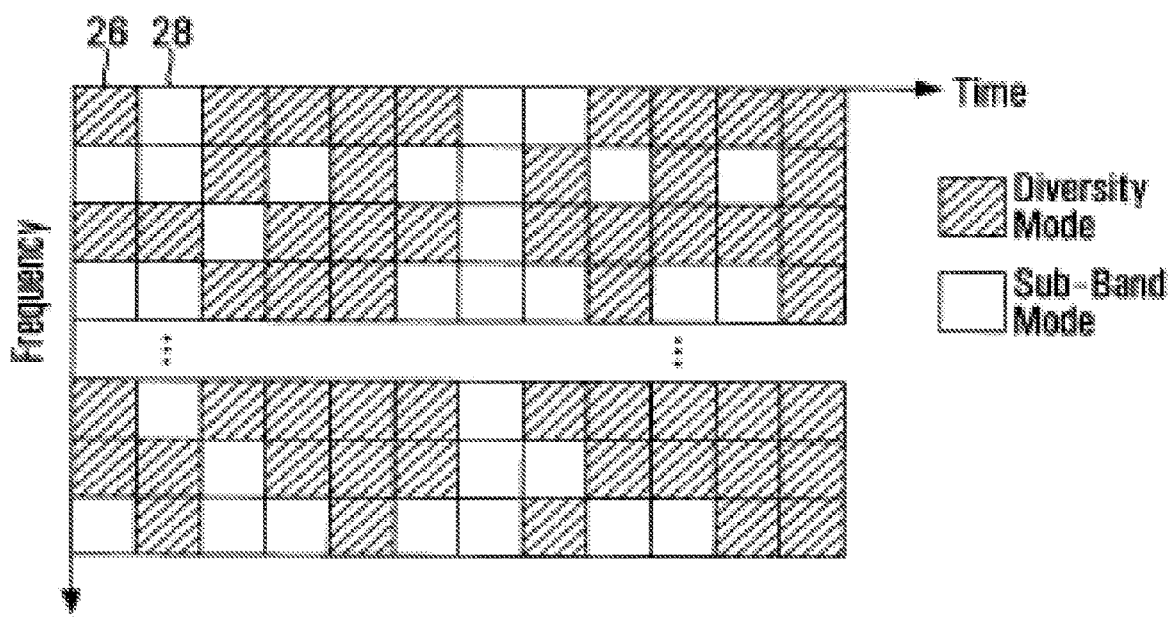

FIG. 1A shows the co-existence of two types of channels in accordance with an embodiment of the invention. In this example, some of the sub-carriers, collectively indicated at 20, are dedicated for diversity channels, while some of the sub-carriers, collectively indicated at 22, are dedicated for sub-band channels. It can be seen that during any given OFDM symbol interval, for example OFDM symbol 24, diversity channels and sub-band channels are simultaneously supported. In the particular example illustrated, the OFDM sub-carrier set is divided into sub-bands each containing a fixed number of sub-carriers, and the overall OFDM resource in time and frequency is divided into resource blocks, each resource block consisting of one sub-band in frequency over a fixed number (one or more) of OFDM symbol intervals. When a resource block is allocated for sub-band channel use, all of the sub-carriers of the resource block are allocated to the same sub-band channel. In some implementations, a given sub-band channel is only allowed to occupy a single sub-band; in other implementations a sub-band channel can occupy a maximum of two adjacent sub-bands; in other implementations, a given sub-band channel is allowed to occupy an arbitrary number of multiple adjacent sub-bands. Many examples of sub-band channel definitions are provided below. When a resource block is allocated for distributed channel use, multiple distributed channels may use the resource block and other resource blocks, or a single distributed channel might use the entire resource block together with other non-adjacent resource blocks. Many examples of distributed channel definitions are provided below. In some embodiments, the size of the resource block is selected as a function of the coherence bandwidth such that for sub-band channels the entire set of sub-carriers experiences a similar channel. Once the overall band of sub-carriers has been assigned to resource blocks, each resource block is then used in its entirety either in the construction of diversity or sub-band channels. In the example of FIG. 1A, this assignment does not change from one OFDM symbol duration (in the time direction) to another. In another embodiment, illustrated by way of example in FIG. 1B, the assignment of resource blocks to diversity channels or sub-band channels can change over time. In FIG. 1B, it can be seen that during OFDM symbol interval 26, there are four resource blocks that are used for diversity channels, and three resource blocks that are used for sub-band channels whereas during OFDM symbol interval 28, there are four resource blocks being used for sub-band channels and three resource blocks being used for diversity channels. Furthermore it can be seen that the assignment of the resource blocks changes on a per OFDM symbol basis. FIG. 1A has been used to show a specific example of resource block assignment that is statistically defined in time. The number and allocation of fixed in time resource blocks is an implementation specific parameter. Similarly, for the example of FIG. 1B, a very specific layout of resource blocks for diversity channels in sub-band channels that changes over time has been shown, for example through dynamic assignment. More generally, any appropriate layout of resource blocks for these two channel types can be employed.

Figure 2:
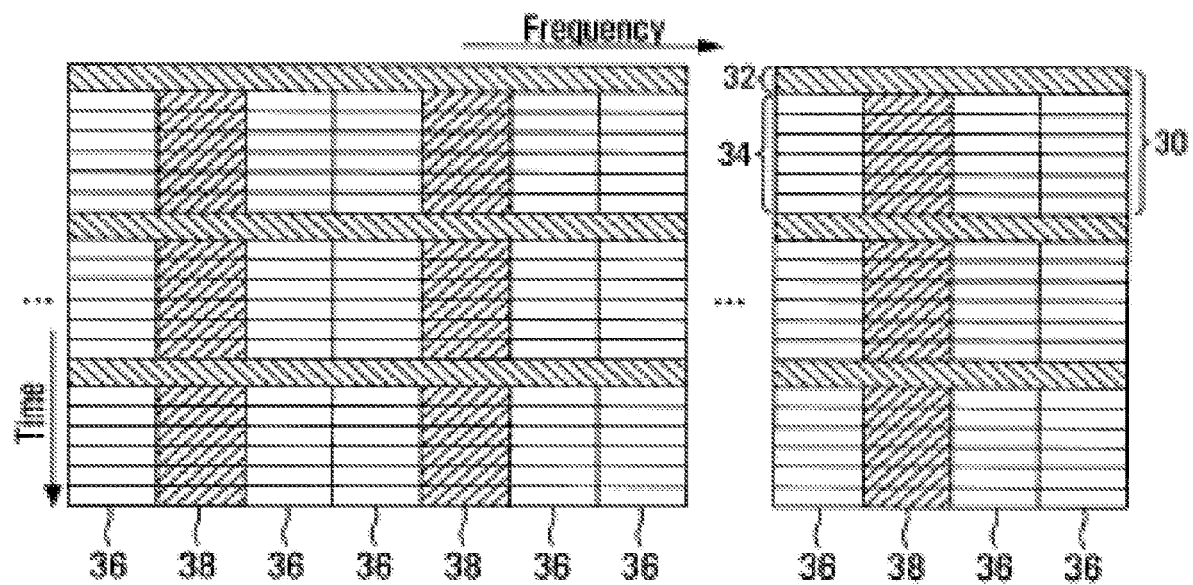
FIG. 2 is a diagram of an OFDM frame structure in which OFDM sub-carriers are divided into sub-bands, with each sub-band being assigned to one of sub-band channel use of diversity channel use.

Another example of the co-existence of the two types of channels will now be described with reference to FIG. 2. In this example, OFDM symbols are divided into TTIs (transmit time interval). In the illustrated example, each TTI consists of seven consecutive OFDM symbols, but of course an arbitrary number of symbols could be employed. One such TTI is indicated at 30. The first symbol in each TTI, namely symbol 32 for the first TTI 30, is used as a reference symbol. This might for example include pilot and control information. More generally, each TTI has at least one reference symbol. The remaining six OFDM symbols 34 are used for traffic channels. In the frequency direction, the available bandwidth of sub-carriers is divided into resource blocks. In a particular example, each resource block might contain 25 sub-carriers. Then, each resource block is assigned to be used for either sub-band channels or diversity channels. In the illustrated example, resource blocks 36 are being used for sub-band channels while resource blocks 38 are being used for diversity channels. With this particular example, the assignment of resource blocks to sub-band channels and diversity channels is fixed, but in another implementation this can be allowed to change as was the case for the example of FIG. 1B. With the example of FIG. 2, the reference symbols are inserted in a TDM (time division multiplexed) fashion, with every seventh symbol being a reference symbol but different frequencies can be employed.

Figure 3:
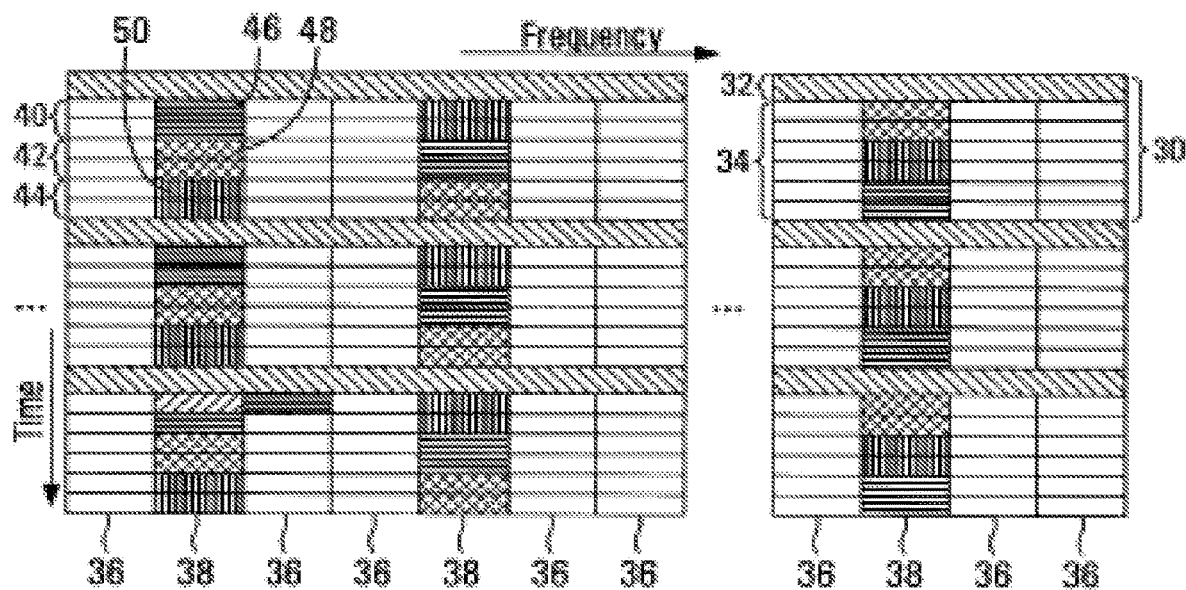
FIG. 3 is a diagram of a frame structure in which the sub-carriers allocated for diversity channel use of FIG. 2 are further broken down into three different diversity channels.

Having allocated the sub-carriers and OFDM symbol durations to either sub-band or diversity mode, there are many ways to define diversity sub-channels using the allocated sub-carriers. A first example will now be described with reference to FIG. 3 where the reference symbol insertion, TTI size, and resource block assignment is assumed to be the same as was described with reference to FIG. 2. In this case, three different diversity channels are defined using the assigned resources. The resources assigned for the first channel are indicated at 46. This consists of a single resource block during the first two OFDM symbols 40 reach TTI, a single resource block during the next two OFDM symbols 42 reach TTI, and a single resource block 50 during the next two OFDM symbols 44 reach TTI. The location in frequency of the three resource blocks that make up the diversity channel is different and that is why the channel is to be considered a diversity channel. A similar assignment of resource blocks is shown for channels 48 and 50. In the illustrated example, the channel assignment is constant from one TTI to the next, but this need not necessarily be the case. It should be readily understood that using the model of FIG. 33, an arbitrary number of diversity channels could be created assuming sufficient resources are assigned for diversity channel use. Furthermore, as was the case with the example of FIG. 2, the number of OFDM symbols in each TTI and the number of sub-carriers in each resource block is to be considered an implementation specific detail.

Figure 4:
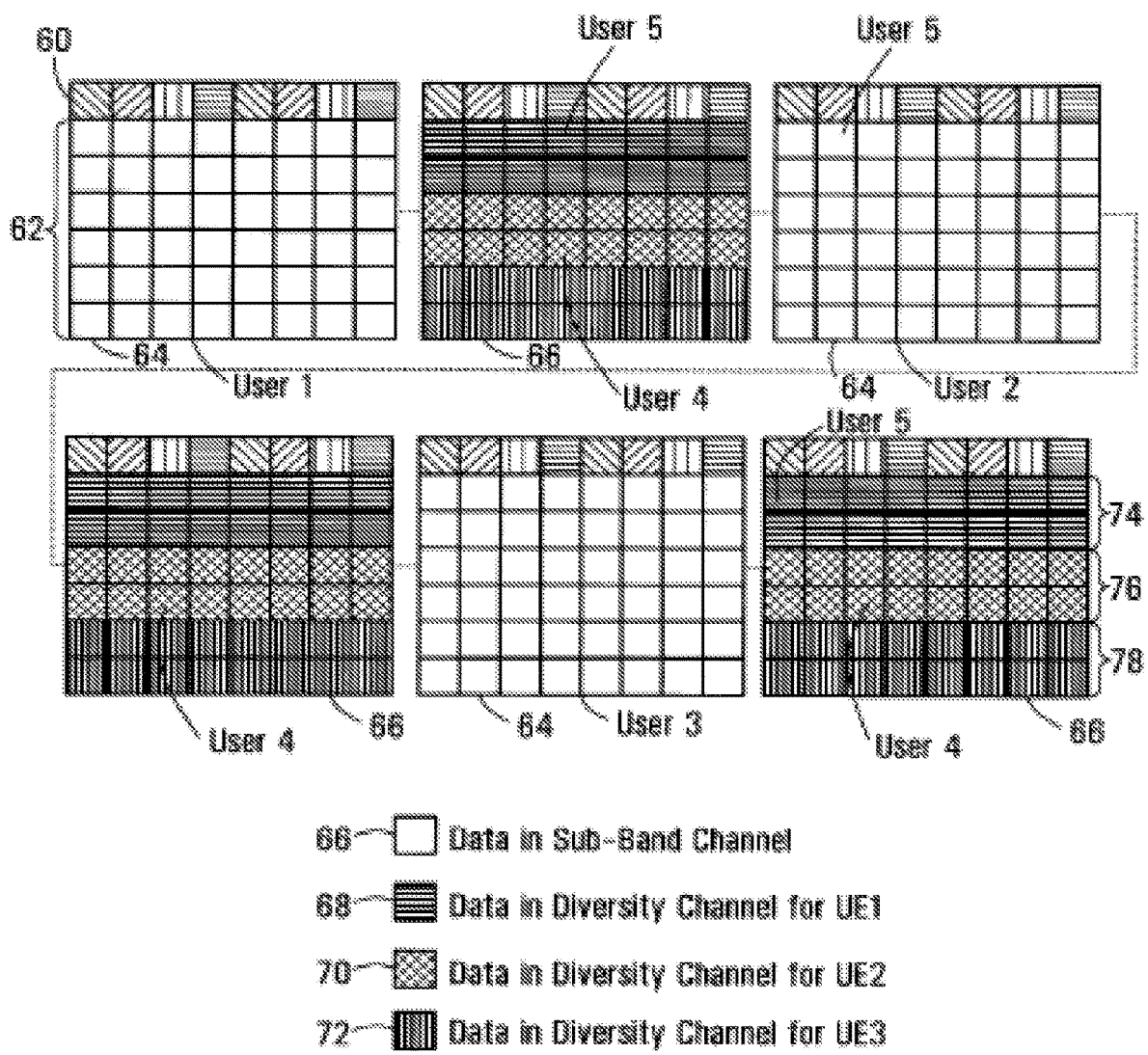
FIG. 4 is another diagram of an OFDM frame structure showing the assignment of both diversity channels and sub-band channels with pilots inserted in the first OFDM symbol in each group of seven OFDM symbols.

Referring now to FIG. 4, shown is another example of the co-existence of sub-band and diversity channels. With this example, the available sub-carriers are again divided into resource blocks. In the illustrated example each resource block is eight sub-carriers, but other numbers can be employed. The first OFDM symbol 60 of each TTI is used as a reference symbol and in the particular example illustrated the reference symbol is used for pilot symbol insertion. In the illustrated example, MIMO transmission is assumed with four transmit antennas. The pilots are inserted with a respective distributed set of sub-carriers assigned to function as the pilot for each antenna. In the particular example illustrated, the first sub-carrier and every fourth sub-carrier thereafter is used for a first antenna; the second sub-carrier and every fourth sub-carrier thereafter is used for a second antenna and so on. In frequencies that one antenna is transmitting a pilot, the other antennas transmit nulls. Until the next symbol containing pilot information, the OFDM symbols 62 are used for data transmission. As was the case in previous examples, several of the resource blocks 64 are allocated for sub-band channels while several of the resource blocks 66 are allocated for diversity channels. In this example, the sub-carriers are allocated for diversity channels are used to implement three different diversity channels indicated at 68,70,72. In this example, the first two OFDM symbols 74 are used for the first diversity sub-channel; the next two OFDM symbols 76 are used for the second diversity sub-channel 70, and the third pair of OFDM symbols 78 is used for the third diversity channel 72. The channels are still diversity channels in the sense that they employ sub-carriers from resource blocks 66 that are spread throughout the spectrum. In contrast, for the sub-band channels one or more resource blocks would be allocated to a given user. The frequency breakdown between sub-band and diversity channels may be the same in the multiple antenna case. However, more generally, the breakdown between sub-band channels and diversity channels need not be the same for the multiple transmit antenna case and can be defined on a per antenna basis. A specific example has been shown in FIG. 4 that is suitable for a four transmit antenna system. Of course appropriate modifications could be made to support systems with fewer or greater numbers of antennas. Furthermore, the particular layout of sub-band resource blocks and diversity resource blocks is only an example. Similarly, the size of the TTI 62, and the number of sub-carriers in each resource block are also implementation specific details.

Figure 5:
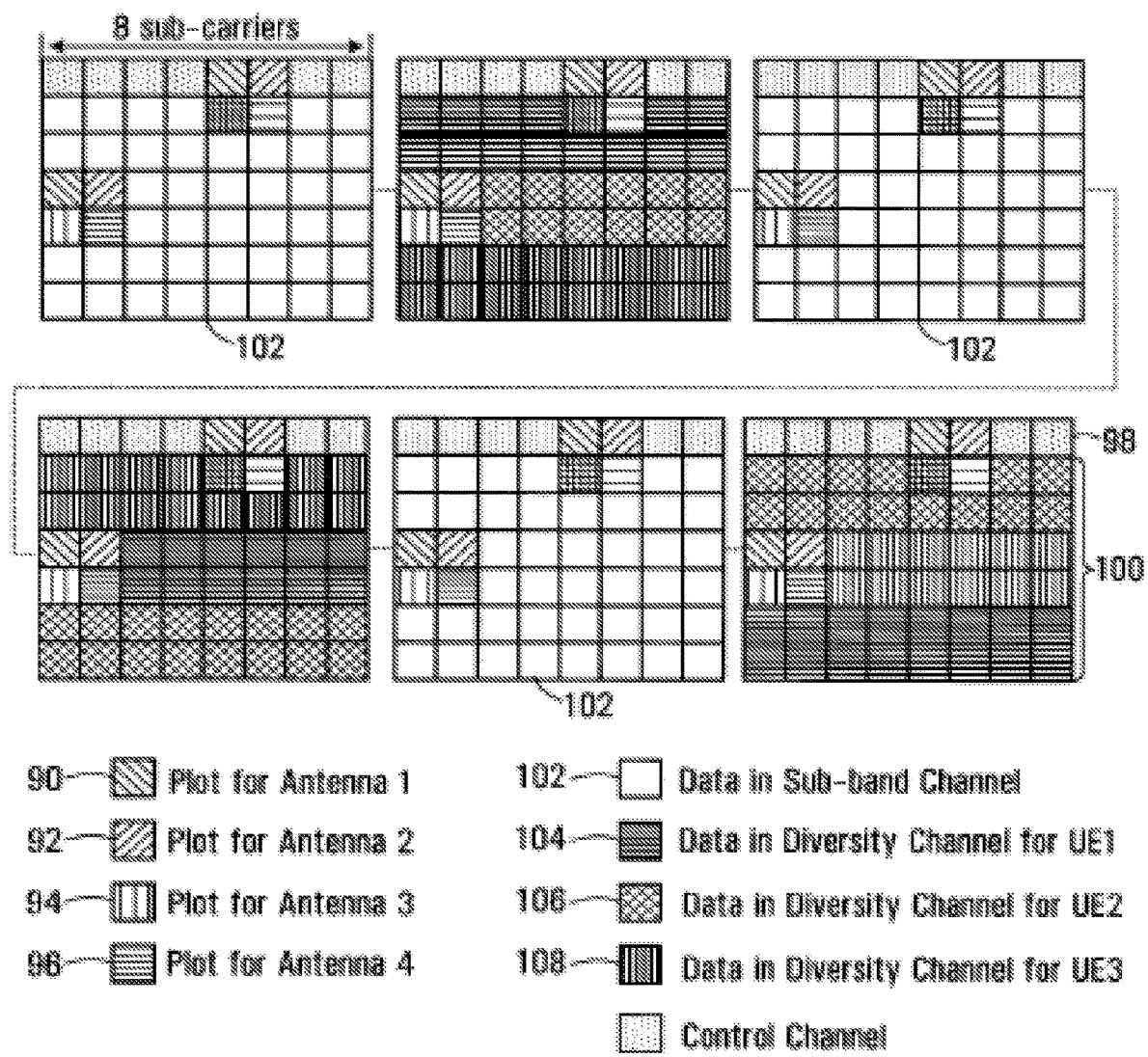
FIG. 5 is a diagram of a frame structure again showing the co-existence of sub-band channels and diversity channels, in this case also including a scattered pilot and a control channel.

For the OFDM symbol used for pilot insertion in FIG. 4, for a given OFDM sub-carrier, only a single antenna transmits a pilot. In this manner, there is no interference between the pilots from the various antennas. Thus, the pilots are scattered with the FIG. 4 embodiment with a spacing of four sub-carriers between the pilots for a given antenna, and a spacing of every seven OFDM symbols. More generally, a scattered pilot design is one that includes pilots for each antenna that are spaced in frequency and time. FIG. 5 shows another example of a scattered pilot design in which pilots for each antenna are inserted in a diamond shaped lattice with pilots for antennas 1, 2, 3 and 4 indicated at 90,92,94,96 respectively. The structure of the channels in FIG. 5 consists of a reference OFDM symbol 98 that is used to as a control channel, followed by six OFDM symbols 100 used for traffic. The control channel is used to transmit the same content from all of the antennas for this example. The particular breakdown of the OFDM symbols 100 for traffic is the same as was the case for the FIG. 4 example, with sub-band channels indicated at 102 and three diversity channels indicated at 104,106,108. However, in this case the diamond shaped lattice pilot pattern has been punctured across both the control channel 98 and the data channels 100. A first option for puncturing is that it is a pure puncture with actual content from the respective data channels simply being omitted. In this case, it would be necessary that the forward error correction coding or other error correction techniques be employed to enable the recovery of the missing contents. Another option is that the payload size is changed for channels that have punctured locations. For example, for the first sub-band channel 102, it can be seen that in the absence of the pilot insertion there would be 8 sub-carriers by 6 OFDM symbols=48 data locations. When the puncturing has been performed, six of these are removed and as such there is now room for 42 data locations. If the payload is proportionately reduced in size, then forward error correction does not need to be relied upon to recover any missing information, at least not any missing information due to punctured pilot channels. In FIG. 5, a very specific example has been shown. It is to be understood that the number of OFDM symbols used for data in each slot is an implementation specific detail; the number of OFDM sub-carriers in each resource block is implementation specific; the particular layout of the scattered pilots is implementation specific; the number of antennas employed is implementation specific; the arrangement and layout of the sub-band channels versus the diversity channels is implementation specific.

FIG. 6 is a table showing various examples of how specified system bandwidths can be used to implement OFDM channelization structures.

In another generalized approach to channelization, a scheduling period is referred to as a "slot", this consisting of a set of L (L≥1) OFDM symbols.

All the sub-carriers within a slot (time domain) and whole band (frequency domain) are viewed as a sub-carrier pool. A slot in the time domain is divided into M sub-slots with each sub-slot including one or multiple consecutive OFDM symbols or symbol pairs. The whole band (frequency domain) is divided into N sub-bands with each sub-band including multiple contiguous sub-carriers. Thus the sub-carrier pool is effectively divided into an M×N resource block space with each resource block including one or multiple sub-slots and multiple contiguous sub-carriers. The sub-slot duration in time is equivalent to the resource block duration in time. M and N can be updated dynamically on slot basis or statically on a few slots basis based on traffic statistics. M is ≥1, and N≥2.

Figure 7:
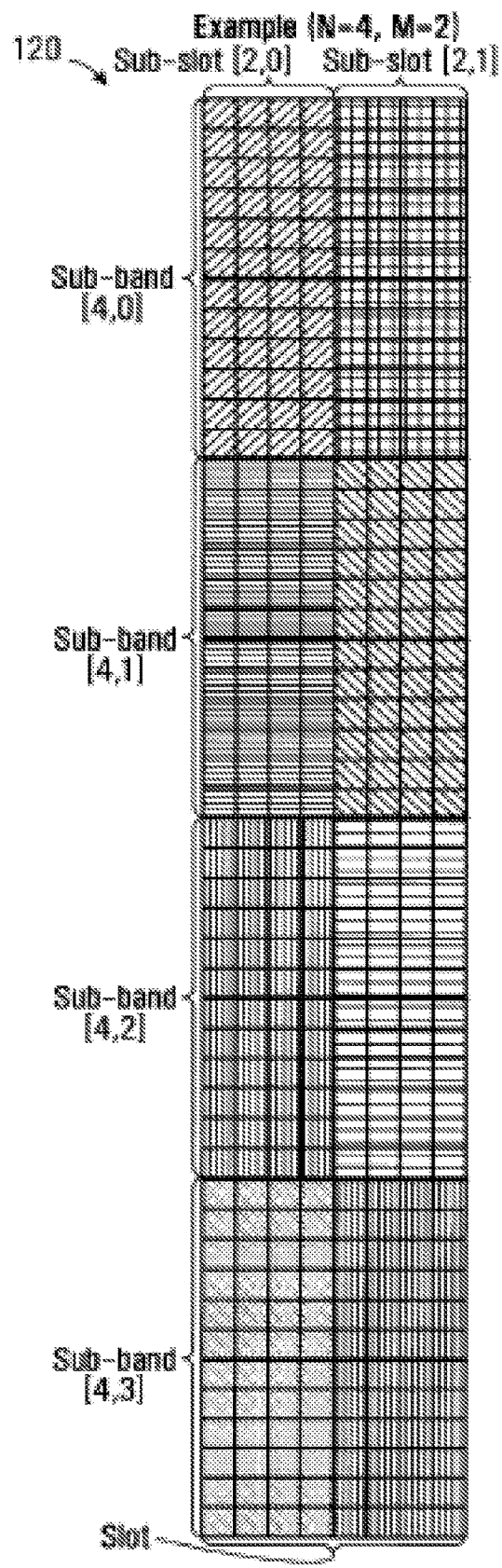
FIGS. 7 and 8 shown are diagrams of example frame structures in which the OFDM sub-carriers are divided into sub-bands, and the OFDM symbols of a given slot are divided into sub-slots.
Figure 7:
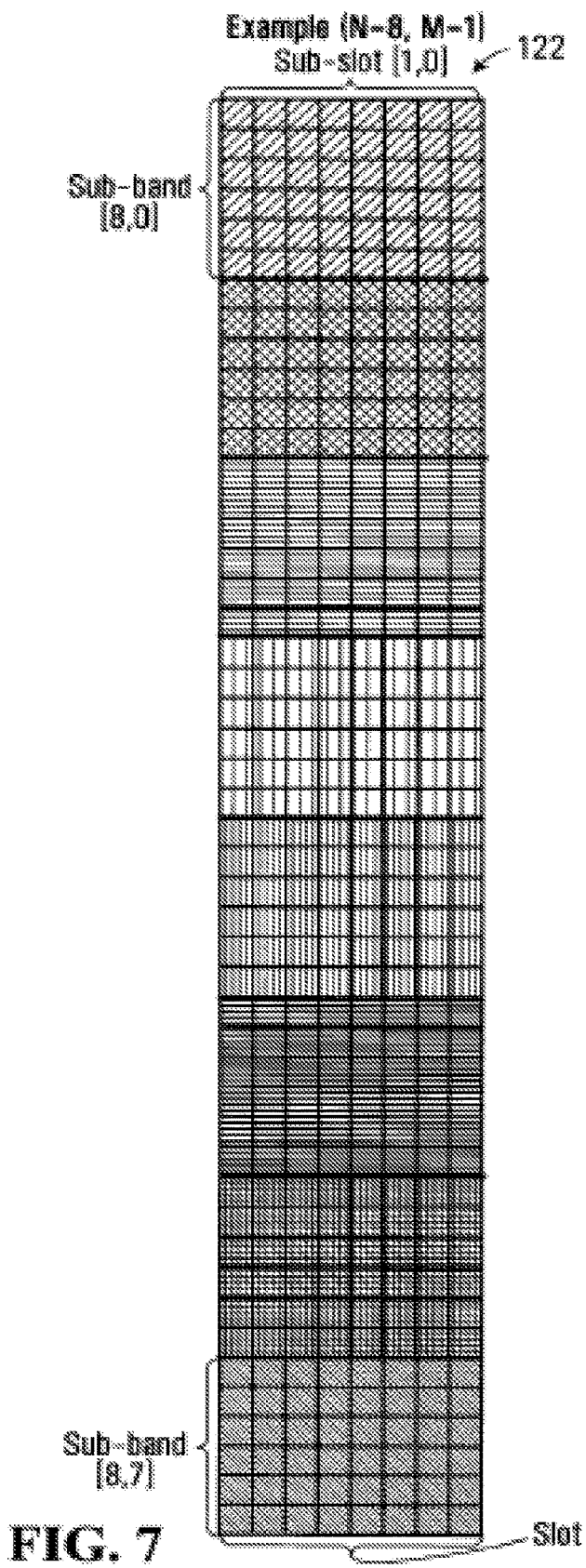

It is readily apparent how the examples presented thus far can fit in with this generalization, allowing for the insertion of additional OFDM symbols for reference, pilot or control. Two specific examples of resource block definition are given in FIG. 7. A first example, generally indicated at 120 involves a sub-carrier space with 48 sub-carriers, and a slot length consisting of eight OFDM symbols. The time domain slot is divided into M=2 sub-slots each contains four OFDM symbols, and the frequency domain is divided into N=4 sub-bands each containing 12 contiguous sub-carriers. The result is a 4.times.2 resource block space. A second example, generally indicated at 122, involves the same set of 48 OFDM sub-carriers and the same eight OFDM symbols per slot. In this case, the entire eight OFDM symbols are used to define a single sub-slot, and the 48 OFDM sub-carriers are divided in the frequency domain into eight sub-bands each containing six OFDM sub-carriers. Thus in this example, there is an N=8 by M=1 resource block space.

Figure 8:
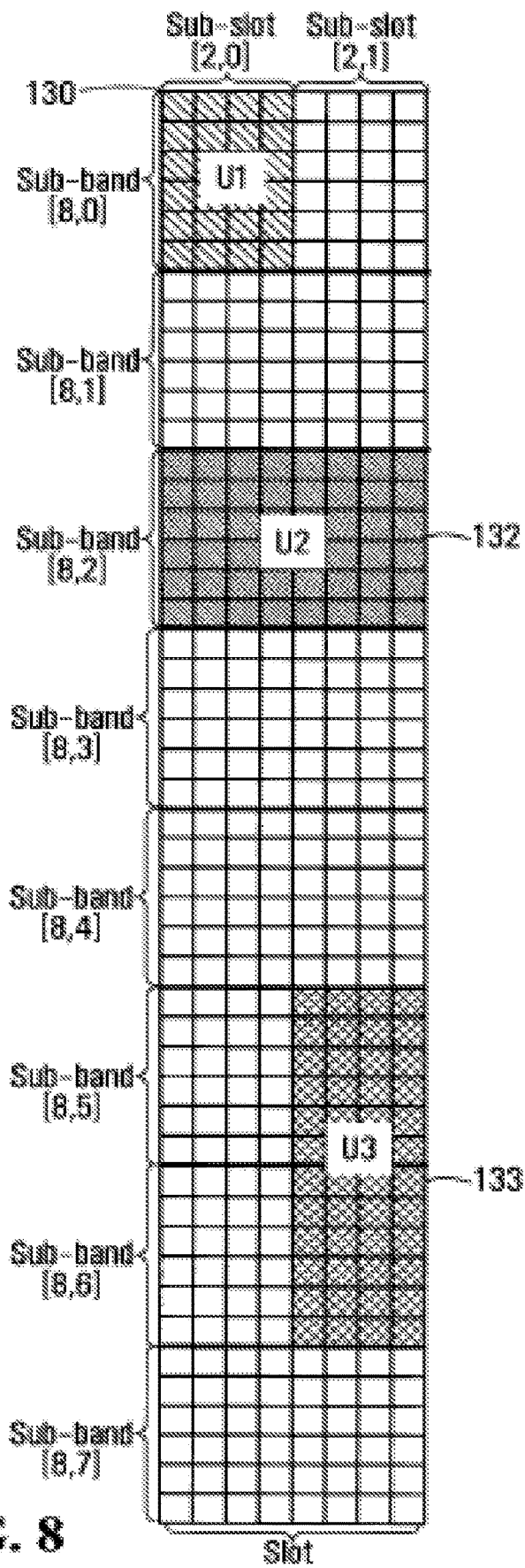

Referring to FIG. 8, another example of resource block definition is shown in which 48 sub-carriers over eight OFDM symbols are divided into N=8 sub-bands each with six OFDM sub-carriers, and two sub-slots each containing four OFDM symbols for an 8×2 resource block space.

Having defined the N×M resource block space, each of the resource blocks is then used for sub-band or distributed channels.

A slot can be configured to include the two types of channels, namely sub-band channel and diversity channel. A sub-band channel includes a contiguous set of one or more resource blocks. A diversity channel includes multiple sub-carriers with those sub-carriers distributed across multiple resource blocks. Many examples of how the division between sub-band channels and diversity channels can be implemented within a slot will be described below. In some of these, sub-band channel resources are allocated first, and then all leftover resource space within a slot is available for diversity channels.

Referring again to FIG. 8, in the illustrated example, a single resource block has been assigned to create a first sub-band channel 130; two resource blocks that are consecutive in time have been assigned to a second sub-band channel 132, and two resource blocks that are adjacent in frequency have been assigned for a third sub-band channel 133. The remaining capacity is then available for diversity channels.

Diversity Channel Definition Using Diversity Sub-Channelization

In some embodiments, the resource blocks left over after sub-band channel assignment are used to define a set of diversity sub-channels, and then each diversity channel is defined to include one or multiple diversity sub-channels. Various options for diversity sub-channelization exists, and several examples will be described below. In some embodiments, the diversity sub-channels are systematically defined such that given a set of available sub-carriers, the same set of diversity sub-channels will always result. With this approach, assuming a transmitter and a receiver both know the systematic definitions that are being applied, given a set of sub-carriers available for diversity sub-channelization, both the transmitter and receiver will know the sub-channel structure. The sub-channelization tree approaches described below are examples of this systematic sub-channel definition approach.

In a first example, sub-band-wise sub-channelization is performed. A diversity sub-channel is defined by taking at least one selected sub-carrier within a sub-band into consideration. The definition is then applied to all available resource blocks for diversity channels. In other words, the diversity sub-channel includes a corresponding sub-carrier in the same position within each sub-band available for diversity channelization. For example, a diversity sub-channel might consist of the first sub-carrier of each sub-band available for diversity channelization.

In another option, leftover space wise sub-channelization is performed. Diversity sub-channels are defined by taking all leftover sub-carriers (after sub-band allocation) in one or more OFDM symbols into the consideration.

In some embodiments, a diversity sub-channel includes the same definition is applied across however many OFDM symbols are to be included in a resource block. In other embodiments, a diversity sub-channel definition changes from one OFDM symbol to the next within a resource block, for example through frequency hopping. An example of this is given below.

With diversity sub-channels thus defined, a diversity channel is constructed from one or more such sub-channels.

In some embodiments, where channel definitions are not fixed, signaling is employed to let each mobile station know where within the overall available resource their particular content is located. In one example of such signaling a two-dimensional bitmap is employed to indicate where the sub-band channels are versus where the diversity channels are. The following is an example of such a two-dimensional bitmap for the resource allocation shown in FIG. 8, where:

N=8, M=2:

[1 0 1 0 0 0 0 0

0 0 1 0 0 1 1 0]

Each "1" in the two-dimensional bitmap represents a resource block that is being allocated for sub-band channel use. It can be seen how the "1"s in the bitmap above correspond with the sub-band channels 130,132,133 shown in FIG. 8. Then, for each one bit in the two-dimensional bitmap, a user ID is signaled. For example, user IDs 1, 2 and 3 might be signaled for the five "1" bits that appear in the bitmap as follows:

{User ID=1

User ID=2

User ID=2

User ID=3

User ID=3}.

In another option for resource allocation signaling, a one-dimensional bitmap can be employed, with a single bit indicating for each sub-band whether or not sub-band channels are to be included in that sub-band. The following is an example of such a one-dimensional bitmap for the allocation of FIG. 8:

N=8 [1 0 1 0 0 1 1 0]

This indicates that the first, third, sixth and seventh sub-bands are for sub-band channel user, but does not indicate the particular channel assigned to each sub-band thus reserved. To achieve this, for each "one" bit in the one-dimensional bitmap, information is sent that identifies the number of users, and for each user, a start sub-slot index, and number of sub-slots.

In yet another option for resource allocation signaling, each resource block is given a respective region ID. For the particular case of N=8 sub-bands and M=2 sub-slots, there are a total of 16 resource blocks and four bits can be used to identify region IDs. Then, for each region, the signaling that is performed consists of the region ID and the user ID that is to be transmitted in that region.

More generally, where channel definitions can change, any appropriate signaling information can be sent that enables a determination of which resource blocks are assigned to sub-band channels and which blocks are available to diversity channels. A user ID can also be sent for each sub-band channel allocated.

In some embodiments, the diversity sub-channels are assigned using a sub-channelization tree having multiple levels, with a first level in the tree comprising a plurality of nodes each representing a single sub-channel, and each subsequent level in the tree comprising one or more nodes, each node in a subsequent level combining at least two nodes of a previous level and representing all sub-channels represented by the at least two nodes of the previous level. Specific examples are given below. Each diversity channel can then be defined to include a set of one or more sub-channels represented by a respective single node in the sub-channelization tree.

In order to signal diversity channel definitions, information can be sent that associates each diversity channel with the respective single node in the sub-channelization tree. Specific examples below include bitmaps and region IDs.

Figure 9A:
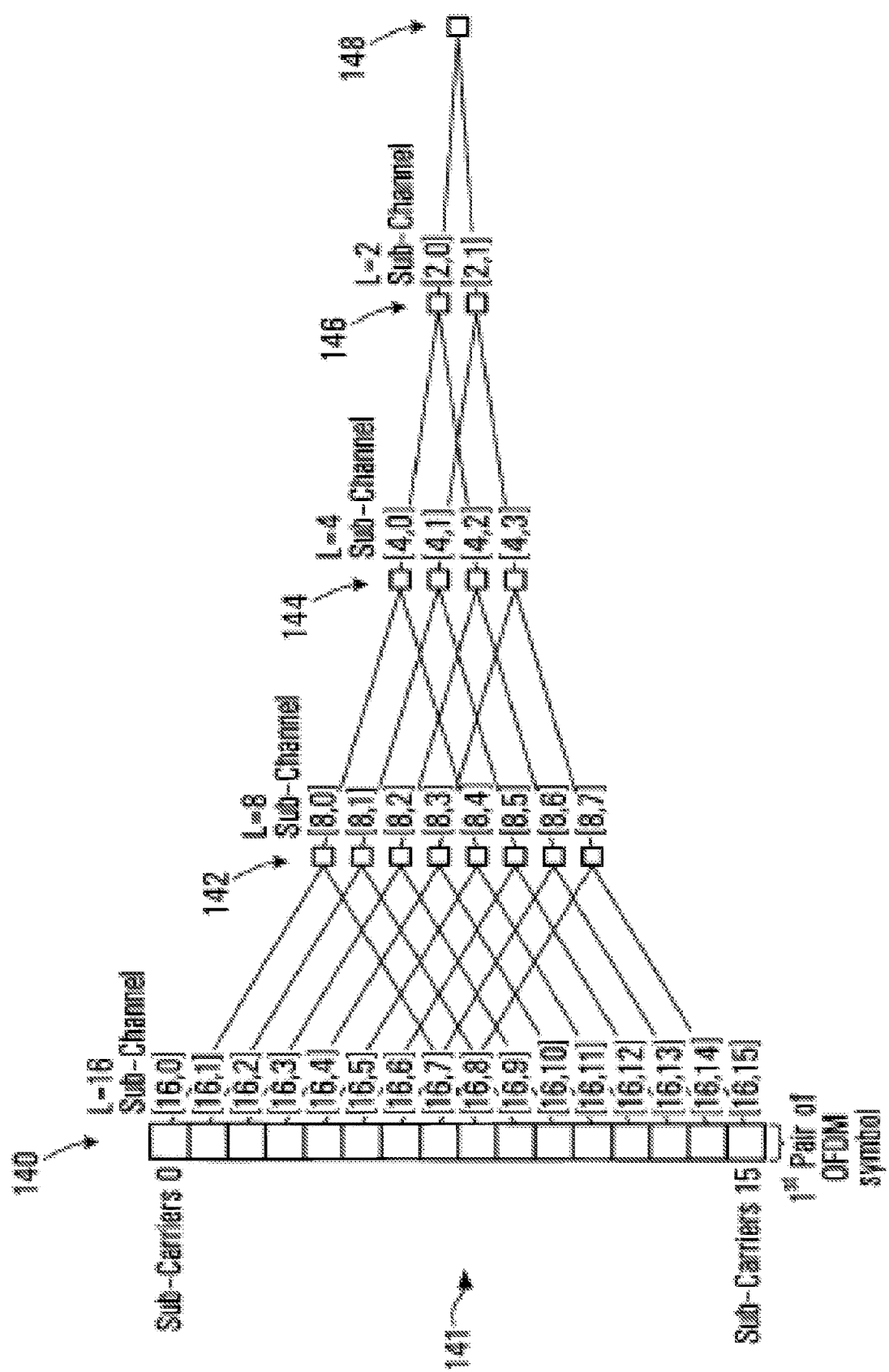
FIGS. 9A and 9B are diagrams of two different approaches to sub-channelization using sub-channelization trees.

Two examples of diversity channelization through sub-channelization definition will be described with reference to FIGS. 9A and 9B respectively. Both of these examples assume an input of a base set of sub-carriers upon which sub-channelization is performed. Example methods of defining the base set of sub-carriers are given below, suffice it to say that the base set of sub-carriers may or may not be contiguous. In these examples, the diversity sub-channels are systematically defined by the number K of sub-carriers to be used, and the number L of sub-channels to be defined using those K sub-carriers. A first option is to employ a full diversity tree method to define the sub-channels. With a full diversity tree method, a sub-channel includes non-contiguous sub-carriers if multiple sub-carriers are to be included in a sub-channel. The diversity tree method allows sets of sub-channels to be defined that contain increasingly large numbers of sub-carriers. With the example illustrated in FIG. 9A, generally indicated at 141, the assumption is that there are K=16 sub-carriers. At a first level in the diversity tree, generally indicated at 140, the K=16 sub-carriers are used to define L=16 sub-channels referred to as sub-ch[16,0] ..., sub-ch[16,15]. The next level in the diversity tree is generally indicated at 142. Here, eight sub-channels are defined and labeled sub-ch[8,0], ..., sub-ch[8,7]. Each of these sub-channels is shown to include two of the sub-channels from the first level 140 of the tree. Thus, in the second level 142, sub-ch[8,0] includes the 0.sup.th and 8.sup.th sub-carriers. This process is repeated for subsequent levels in the hierarchy. In the illustrated example, there are three more levels 144,146,148. Each sub-channel in the third level 144 contains four sub-carriers, each sub-channel in the fourth level 146 includes eight sub-carriers, while the single node in the fifth level 148 includes all of the sub-carriers. It should be readily apparent how the example presented could be extended to cover an arbitrary number of sub-carriers K. With this sub-channelization definition, a given diversity channel can be defined to include one or more of these sub-channels.

Figure 9B:
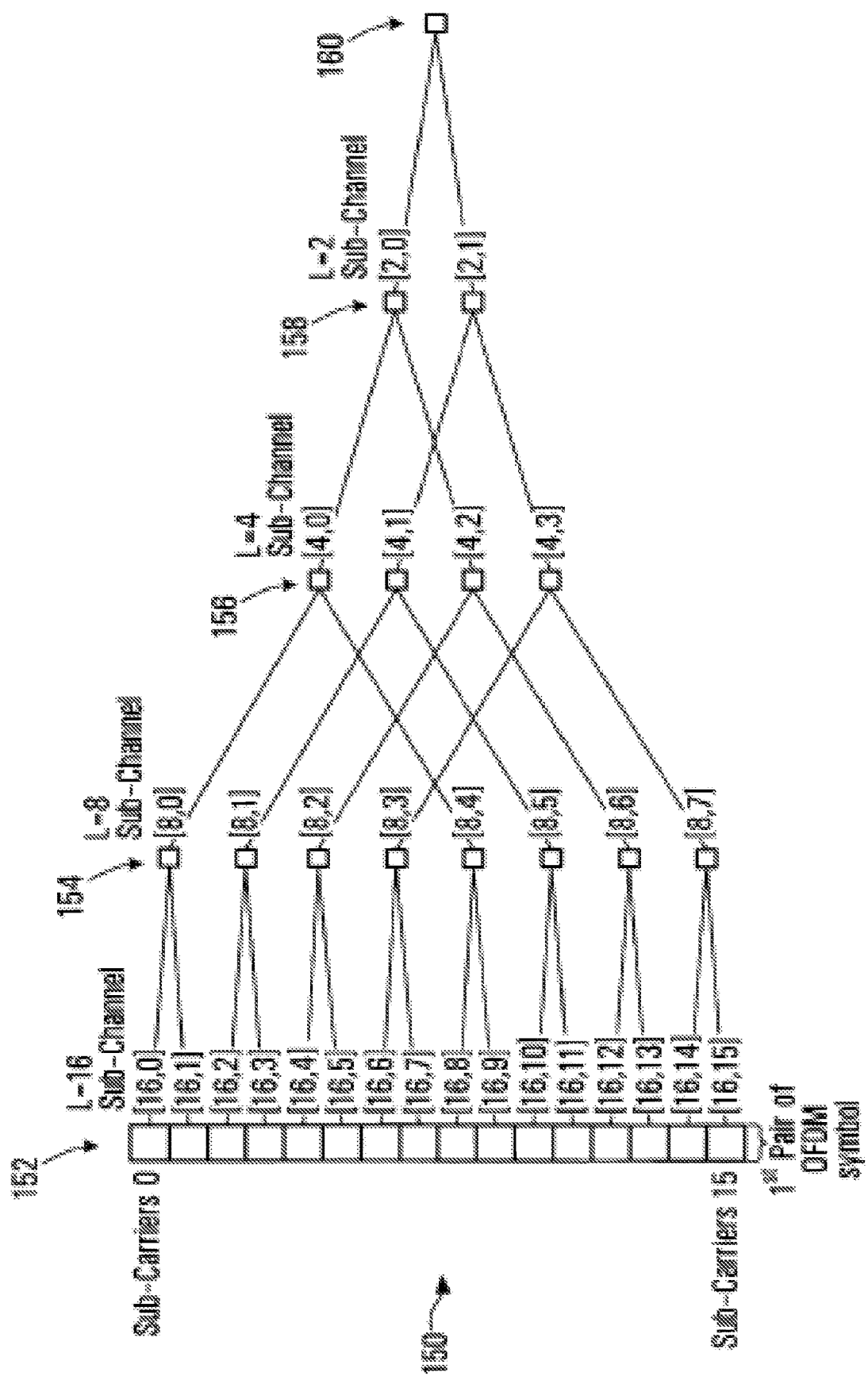

In a second example shown in FIG. 9B, generally indicated at 150, a hybrid diversity tree approach is employed. The first level in the diversity tree 152 is the same as the first level 140 of the first example 141. However, in generating the second level, pairs of adjacent sub-carriers from the first level are selected. Thus, in the second level 154, sub-ch[8,0] includes the first two consecutive sub-carriers. After this, the sub-channels of the second level 154 are combined in a similar manner to the first example, and third 156, fourth 158, and fifth 160 levels in the diversity tree can be defined. It is again readily apparent how the approach given in the example 150 can be extended to cover an arbitrary number of sub-carriers. Furthermore, while in the illustrated example two consecutive sub-carriers have been combined, in another embodiment it might be possible to include four consecutive sub-carriers, for example in the third level of the diversity tree 156. Contiguous groups of two, four or eight might be used to support STTD transmission formats for example. For applications where the base set of sub-carriers are contiguous, the approach of FIG. 9B allows for a better estimate of interference and channel conditions since there are contiguous groups of sub-carriers.

Figure 10:
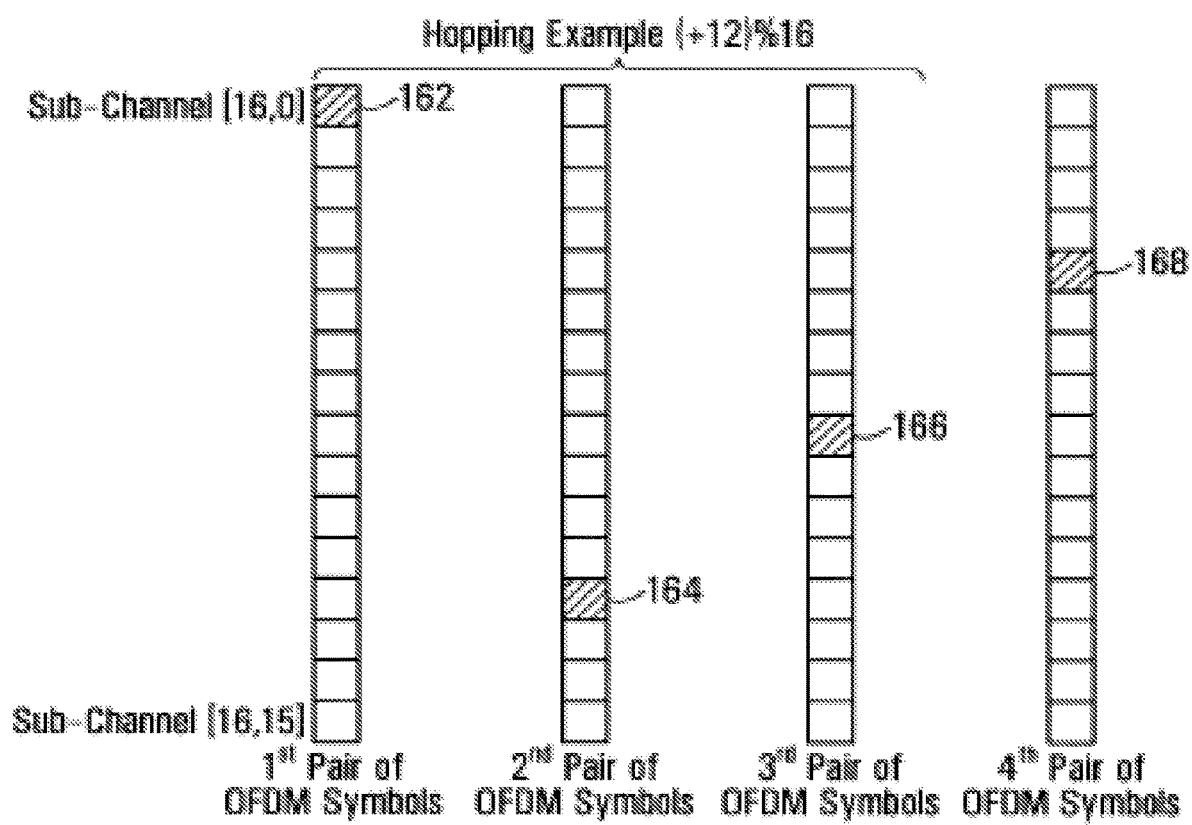
FIG. 10 is a diagram showing how sub-carrier definitions assigned to a given sub-channel can hop over time.

In another example, diversity sub-channels include sub-carrier hopping in the time domain based on a specific pattern that might for example be base station specific. An example of this is shown in FIG. 10 where the sub-carrier selected for a given diversity sub-channel is indicated at 162 for a first pair of OFDM symbols, 164 for a next pair of OFDM symbols, 166 for a third pair of OFDM symbols and 168 for a fourth pair of OFDM symbols. The sub-carriers 162,164,166,168 are all within a sub-band. In this example, the sub-band has 16 sub-carriers but it is readily apparent how this concept can be extended to an arbitrary number of sub-carriers within a sub-band. In FIG. 10, the expression (+12)% 16 defines the suo-carrier hopping that occurs for this particular example. It means that after defining a first sub-carrier location (using the sub-channelization tree for example), the sub-carrier position for the next OFDM symbol pair is determined by adding 12 to the current position (where the numbers 1 through 16 index into an arbitrarily defined base set of sub-carriers that may or may not be contiguous) and performing a modulo 16 operation. With the example given, it can be seen that 16 different sub-channels could be defined over four pairs of OFDM symbols within a sub-band. More generally, any appropriate mechanism of sub-carrier hopping can be employed; of course the mechanism needs to be deterministic in the sense that it can be reproduced at a receiver. In the above example, sub-carrier hopping occurs across OFDM symbol pairs; more generally, the hopping can occur at any defined time interval of one or more OFDM symbols.

Having defined diversity sub-channels using one of the above-discussed approaches, a diversity channel is defined to include one or multiple diversity sub-channel. Addressing schemes can be employed to identify diversity channels. In one example, the addressing can be based on the position in the sub-channelization tree. Referring back to the FIG. 9 example, if a single diversity channel was to simply be one of the sub-channels referred to in the second level 142, then such a diversity channel could be identified using any mechanism that allows the identification of that position in the tree.

Figure 11:
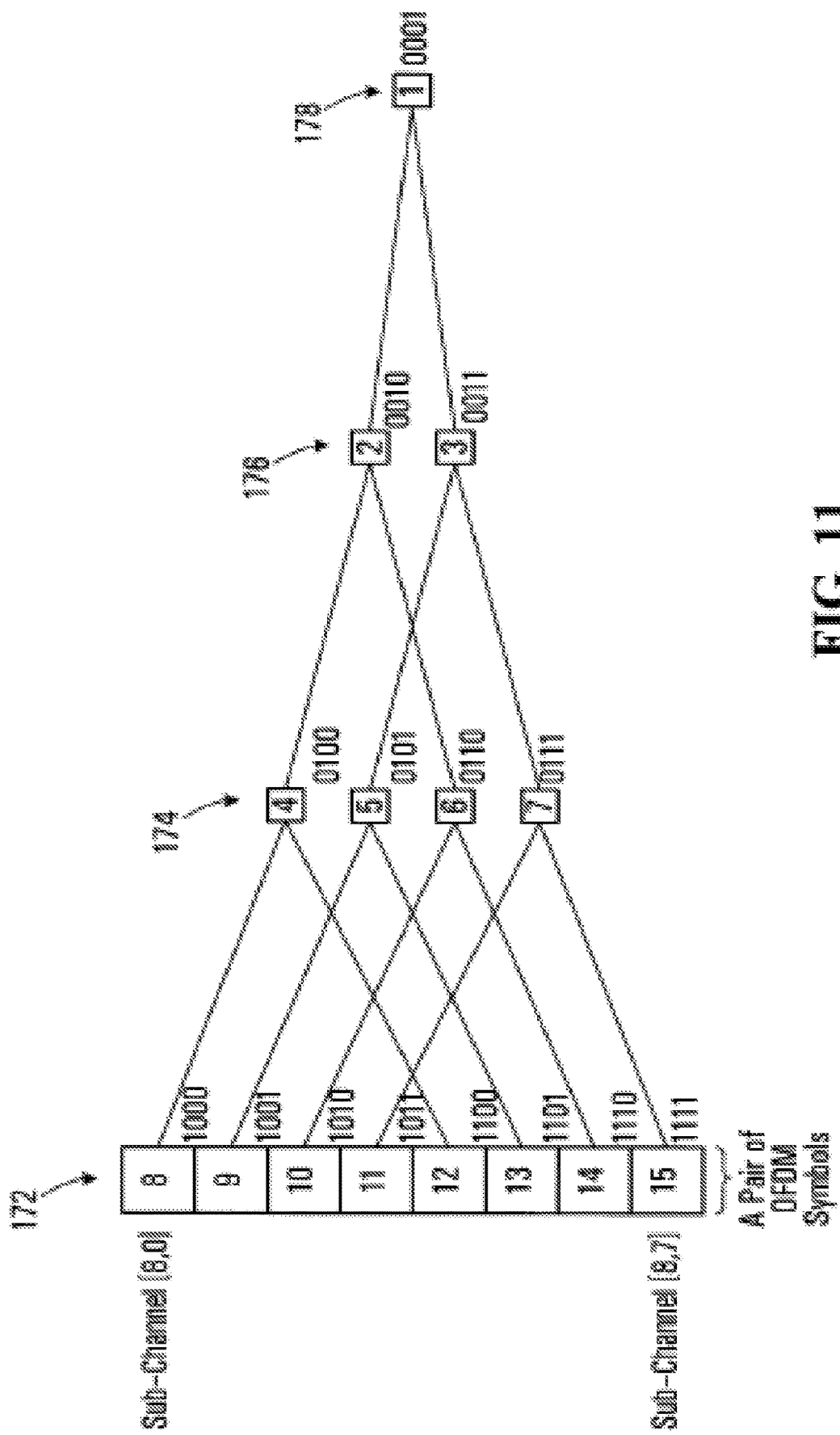
FIG. 11 is a diagram of an example of sub-channelization tree node naming.

A specific example of diversity channel addressing will now be given with reference to FIG. 11. With this example, there are eight sub-carriers that have been used to create a four level diversity tree with eight nodes in the first level 172, four nodes in the second level 174, two nodes in the third level 176, and one node in the fourth level 178. A first option is to perform the addressing based on a bitmap. For L=8 sub-channels in the first level, the size of such a bitmap would be 15 because there are 15 nodes in the tree as a whole. As was the case where bitmaps were presented as an option for signaling the occupancy of available sub-band channels, a bitmap can be transmitted to indicate which diversity sub-channels are occupied, together with user IDs for the occupied sub-channels. This combination will completely specify the content of the diversity channels. In another example, each node in the tree is assigned a "region ID". Since there are 15 nodes, four bits can used to uniquely identify each of the nodes in the tree. For example, in the illustrated example region ID "0010" identifies one of the nodes in the third level in the tree. It can be seen that a diversity channel having this region ID would include sub-carriers 8, 10, 12 and 14. It should be readily apparent how the bitmap or region ID approach could be applied to any of the diversity sub-channel definitions presented thus far.

In some embodiments, the sub-channel definition such as described above is applied across all of the sub-bands available to diversity transmission, and during a given slot or sub-slot the same user is assigned such a combined capacity. An example of this will now be given with reference to FIG. 12 where in a given slot 180, containing two sub-slots 182,184 and containing eight sub-bands 186 through 200, three sub-band users have been assigned as indicated at 202,204,206. The remaining sub-bands are used for diversity sub-channelization. In the illustrated example, each band contains eight sub-carriers and as such a sub-channelization similar to that described with reference to FIG. 11 can be employed as indicated generally at 208. Applying the same sub-channelization to all of the sub-slots and sub-bands that are not assigned for sub-band users, several diversity channels can be defined. Two particular diversity channels are illustrated by way of example with sub-carriers 210 being used to define a first diversity channel and sub-carriers 212 used to define a second diversity channel. In this case, the assignment is on a slot basis, with the sub-channelization being applied for the entire slot and then assigned to a given diversity channel. For consecutive OFDM symbol pairs, the sub-carriers assigned to each sub-channel in this example alternate between two sets that are offset from each other by one sub-carrier, this being an example of the hopping described by way of example above with reference to FIG. 10. It can be seen that there is still room for several additional diversity channels. Then, the diversity channel can be identified simply by its position in the bitmap or region ID. For example, the diversity channel 210 would simply be identified by position 4 in the bitmap, or region ID "0100". Similarly, the diversity channel 212 would be identified by position 6 in the bitmap, or region ID "0110". The following is an example of diversity channel assignment signaling that might be employed to that effect:

```
For bitmap case
    Bitmap
        For each 1 bit
            { user ID }
    For region ID case
        Number of users
        For number of users
            { user ID
              region ID}
```

The signaling might be employed as follows to signal the two diversity channel shown in FIG. 12:
   User ID=4, region ID=0100
   User ID=5, region ID=0110

In another example, diversity channels are defined on a sub-slot basis. An example of this is shown in FIG. 13. This example includes a sub-slot, sub-band structure the same as that of FIG. 12, and includes the same three sub-band users 202,204.206. Furthermore, the same diversity tree 208 is employed to define and identify sub-channels. In this case, three different diversity channels are illustrated. The sub-carriers used for a first diversity channel are indicated at 220, for a second diversity channel at 222, and for a third diversity channel at 224. In this case, it can be seen that the content for the first diversity channel 220 spans both sub-slots 182,184; the content for the second diversity channel 222 is located only in the first sub-slot 182, while the content for the third diversity channel 224 is located only in the second sub-slot 184. Thus, a given diversity channel can be assigned to one or the other of the two sub-slots, or to both of the sub-slots. The following is an example of how diversity channel assignment signaling could be implemented to signal sub-slot contents for such an implementation:

```
For bitmap case
    For each sub-slot
        { Bitmap
            For each 1 bit
                { user ID }
    For region ID case
        For each sub-slot
            { Number of users
                For number of users
                    { user ID
                      region ID }
```

For the specific diversity channels shown in FIG. 13, the following signaling could be employed to completely identify the diversity channels:
For diversity User
   For sub-slot 0
      User ID=4, region ID=0100
      User ID=5, region ID=0110
   For sub-slot 1
      User ID=4, region ID=0100
      User ID=6, region ID=1001

Figure 12:
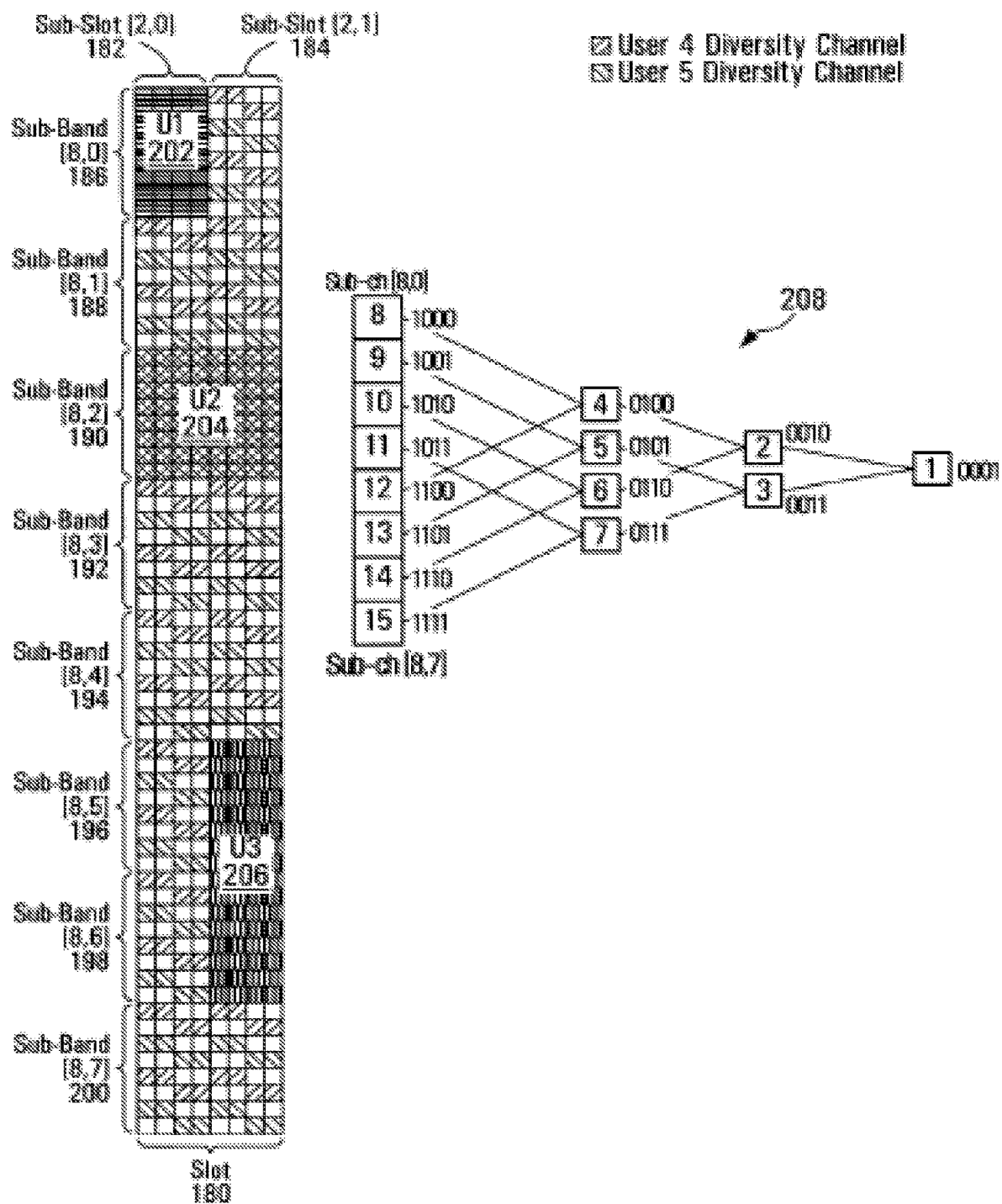
FIG. 12 is a diagram of an example of diversity sub-channel definition that takes place using sub-carriers leftover sub-band channel assignment.
Figure 13:
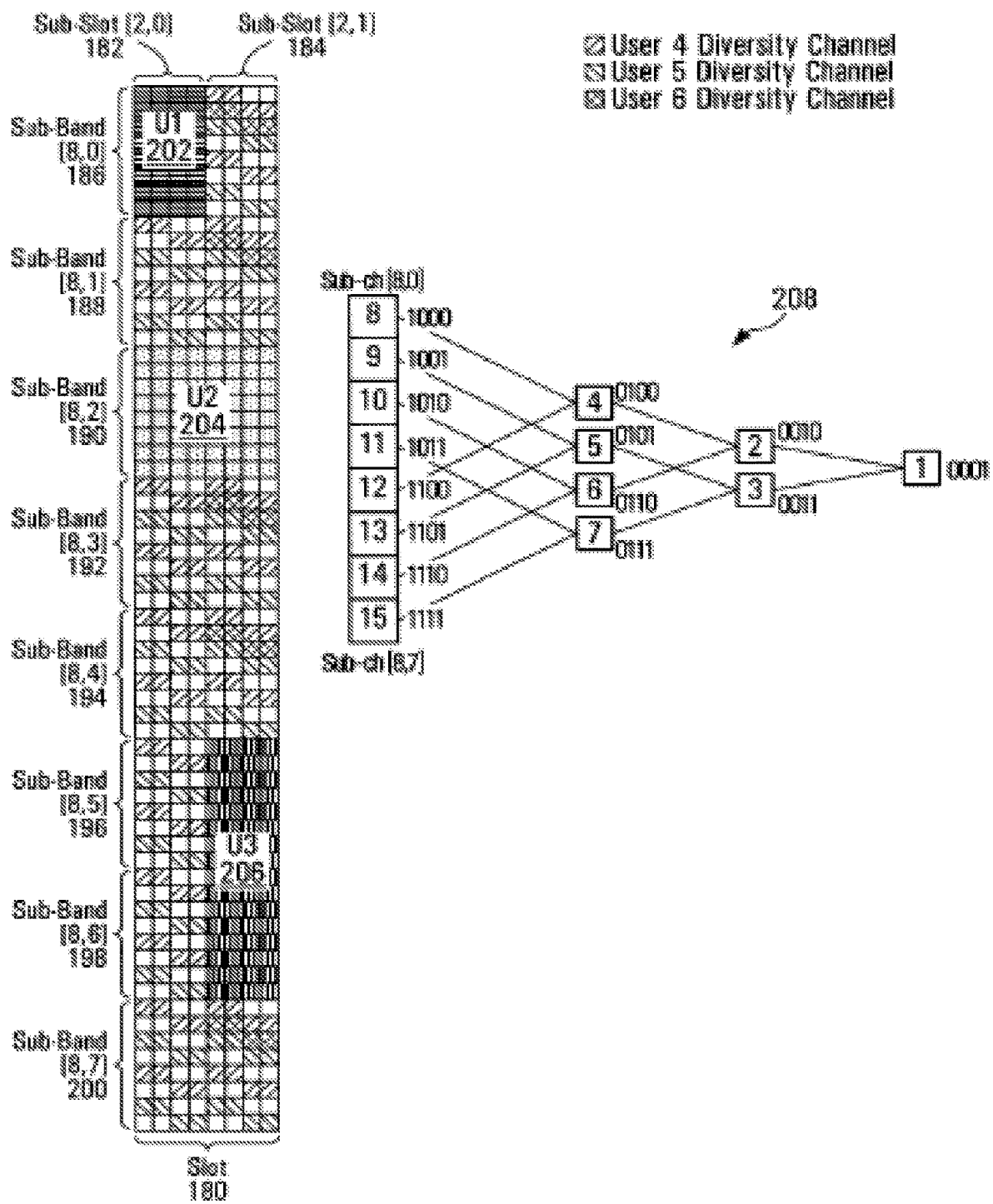
FIG. 13 is a diagram of another example of diversity sub-channel definition that uses sub-carriers leftover after sub-band assignment.

Note that in the examples of FIGS. 12 and 13, each sub-slot contained two OFDM symbol pairs, and sub-carrier hopping was employed for each sub-channel. For example, it can be seen that the sub-channel identified by region ID 0100 (the sub-channel used by diversity channel 222) is offset by two sub-carriers in the second OFDM symbol pair in sub-slot 182. It should be readily apparent that sub-carrier hopping may or may not be employed in a given implementation. Furthermore, it should also be readily apparent how the example of FIGS. 12 and 13 can be extended to an arbitrary slot definition, an arbitrary sub-slot definition, an arbitrary number of sub-carriers and an arbitrary number of sub-bands.

The above examples are examples of sub-band-wise sub-channelization. In another implementation, diversity channelization is employed by creating a diversity channelization tree taking into account all leftover sub-carriers after a sub-band channel assignment, this being so-called leftover-space-wise-sub-channelization.

In a first example, such a diversity channelization is performed on a per sub-slot basis, and assignment to mobile stations is performed on a per-sub-slot basis. An example of this will now be given with reference to FIG. 14 where a slot structure consisting of two sub-slots 230,232, and eight sub-bands 234 through 248 are defined each containing six sub-carriers, and three sub-bands users are indicated at 250,252,254. During the first sub-slot 230, all of the available sub-carriers for diversity channelization are combined at 256, and then these sub-carriers can be used to create a sub-channelization tree such as described previously. Then, diversity channels can be defined using the bitmap or region ID as in previous examples. In the illustrated example, during the first sub-slot, there are 36 sub-carriers available for diversity channelization tree creation, while during the second sub-slot 232, the sub-carriers available for diversity channelization are indicated at 258, and it can be seen that there are 30 such sub-carriers.

Figure 14:
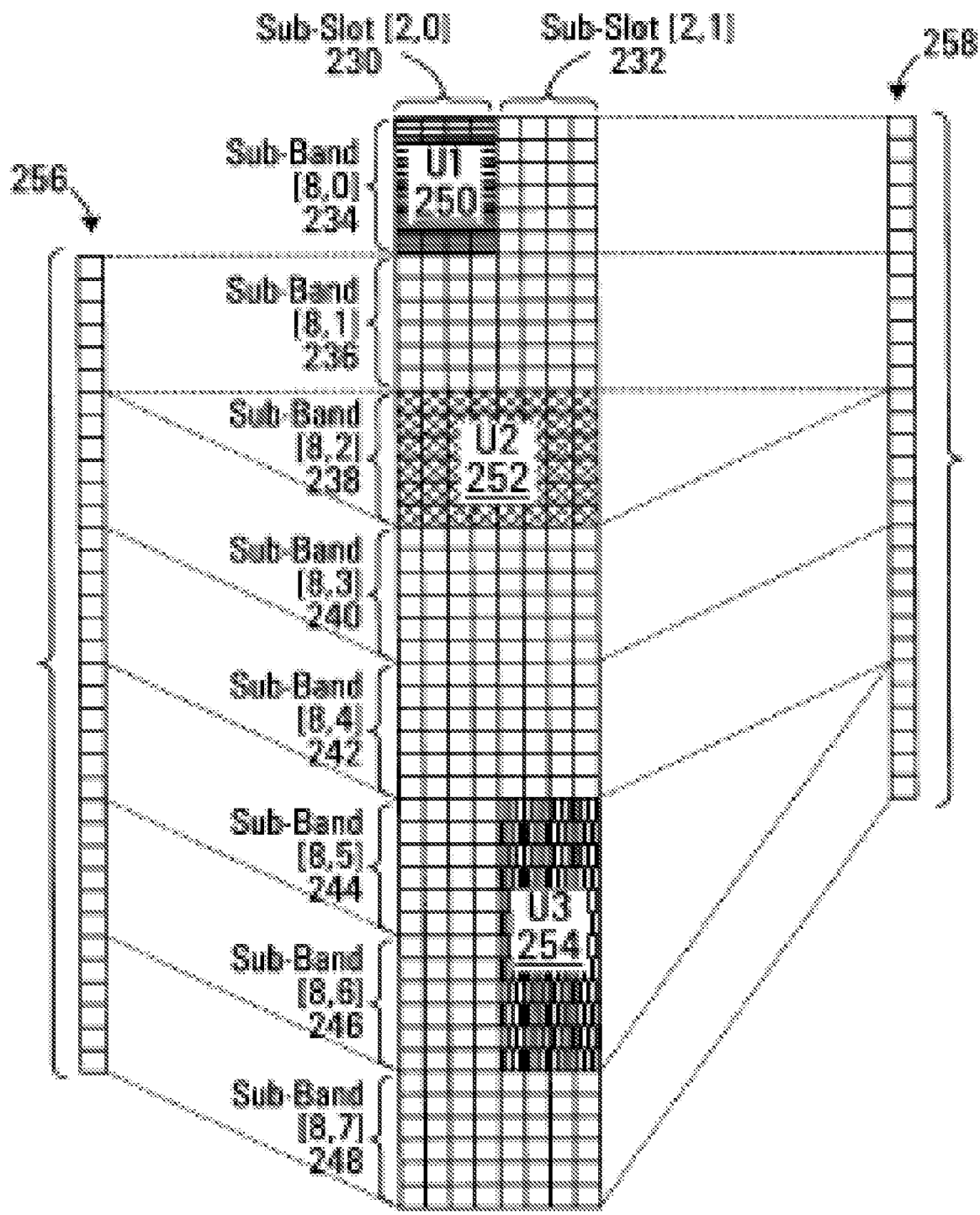
FIG. 14 is a diagram of another example of diversity sub-channel definition using sub-carriers leftover after sub-band channel assignment.
Figure 15:
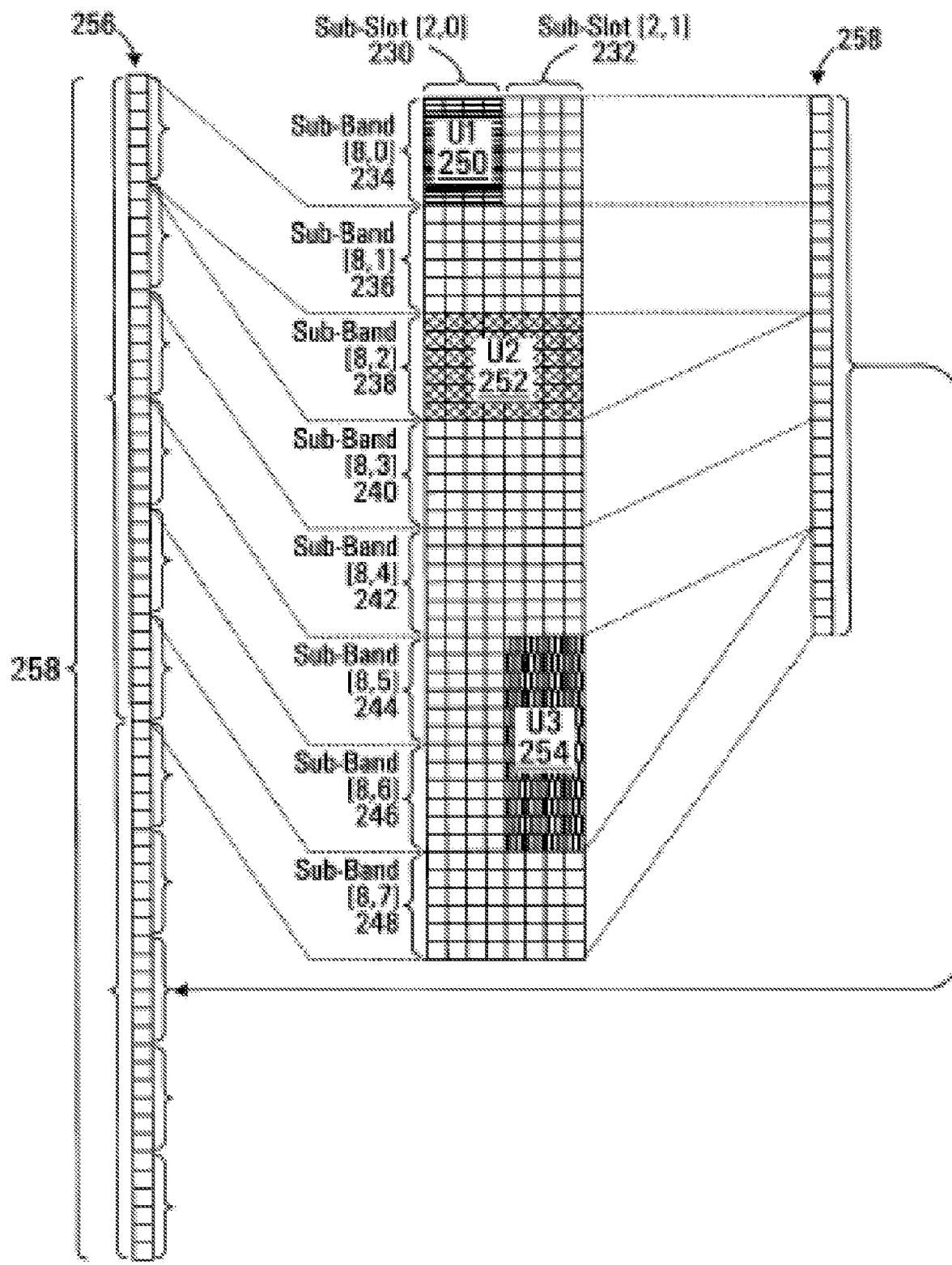
FIG. 15 is diagram of another example of diversity sub-channel definition using sub-carriers leftover after sub-band channel assignment.
Figure 16:
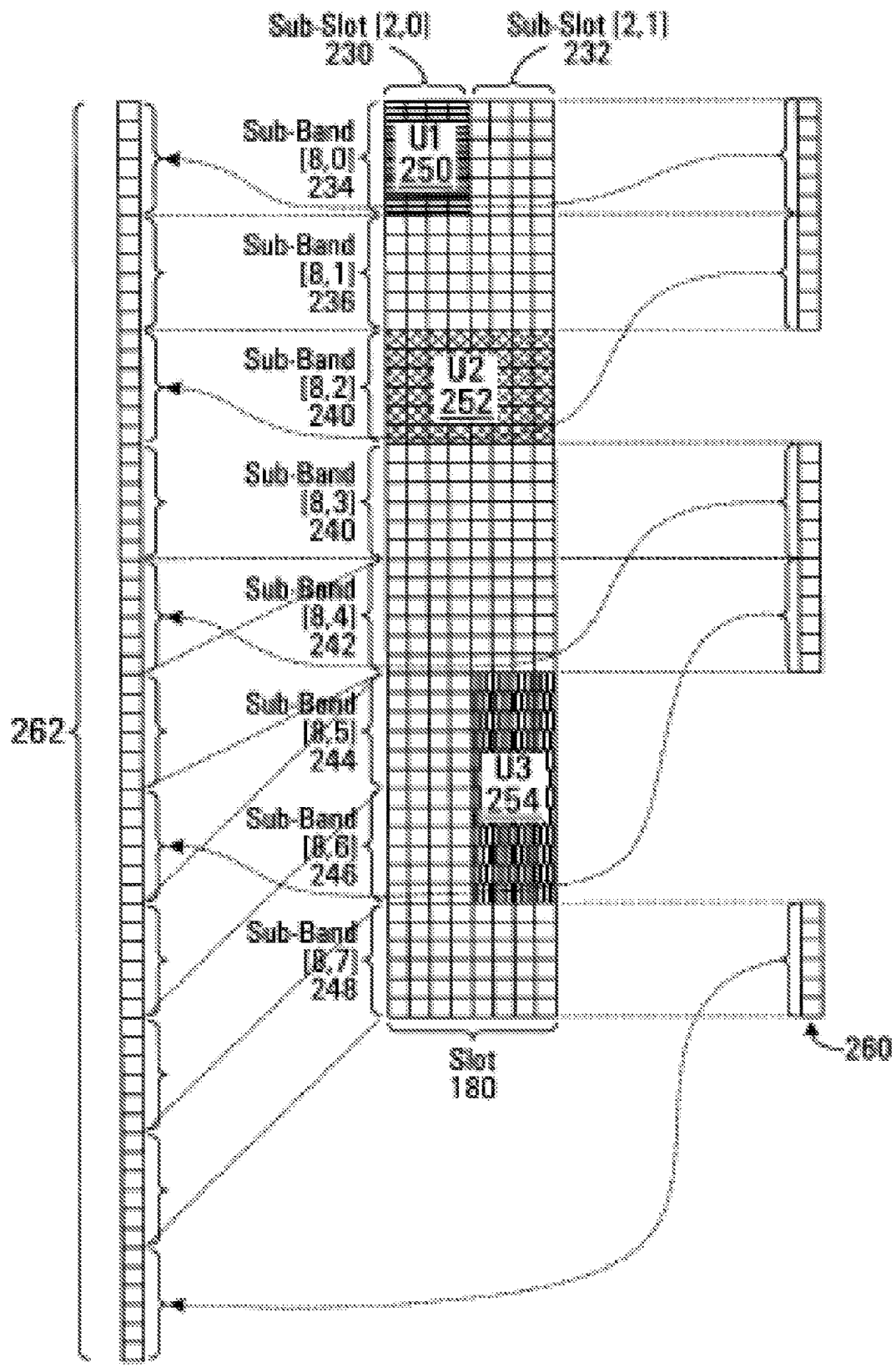
FIG. 16 is diagram of another example of diversity sub-channel definition using sub-carriers leftover after sub-band channel assignment.

In another implementation, all leftover sub-carriers in each sub-slot are combined as was the case in the FIG. 14 example, then, the two sets of sub-carriers are combined to create a single list of sub-carriers and diversity sub-channelization is performed using the combined list. Referring to FIG. 15, an example of this is shown where the sub-carriers 256 from the first sub-slot 230 and the sub-carriers 258 from the second sub-slot 232 are combined to create a single list 258 which is then used to create a diversity sub-channelization tree structure. In this case, assignment to mobile stations would be performed on a per slot basis. In another example of diversity channel definition, all leftover sub-carriers within a sub-slot and in a given sub-band are listed first. These sub-band based list are then combined into an overall list for the entire slot, and diversity sub-channelization tree is created using this combined list. Then, assignment to mobile stations is performed on a per slot basis. An example of this is given in FIG. 16 where again the same sub-slot and sub-band structure and sub-band user assignment is shown as was the case for the FIG. 15 example. The available sub-carriers in the second sub-slot 232 are organized by sub-band as indicated at 260. These are then combined with similarly organized sub-bands of the first sub-slot 230 to generate a combined list 262 that is then used for a diversity sub-channelization tree generation.

The above introduced slot diversity channel trees have been defined in such a way that any sub-band channel assignments do not affect the slot diversity channel tree structure and may be used to allocate resources. Presented below are further examples of slot diversity channel trees. For purposes of embodiments of the invention presented below the slot diversity channel tree uses a diversity sub-channel which includes a defined number of L sub-carriers and each slot includes a defined number M of OFDM symbols (or M sets of OFDM symbols of a defined size, for example pairs). The slot structure may be provided by the following:

For a given OFDM symbol, the available sub-carriers are divided into L groups. Depending on the total number of suo-carriers N.sub.tot available for diversity sub-channelization, the number of sub-channels N.sub.ch will be N.sub.ch=N.sub.tot/(L) since there are L sub-carriers per sub-channel. For each OFDM symbol (or set of symbols) (m=1, . . . , M) N.sub.ch sub-channels are defined by taking one sub-carrier from each of the L groups. In a particular example illustrated in FIG. 17, M=10, and L=24. As such, a sub-channel [m=1, 2, . . . , 10, i=1, 2, . . . , N] is created by taking one sub-carrier from each group within OFDM symbol (or set of symbols) m. A diversity channel includes 24 sub-carriers. The number N of sub-channels depends on the bandwidth available. For these particular numbers, N=3, 6, 12, 25, 39, 53 for bandwidths of 1.25 MHz, 2.5 MHz, 5 MHz, 10 MHz, 15 MHz and 20 MHz, respectively. In the illustrated example, the location of the sub-carrier within each group that is included in a given sub-channel is the same. Thus, for the first sub-channel 272 illustrated in FIG. 17, this includes the first sub-carrier of each of the 24 groups.

Sub-channelization is performed to define a set of base sub-channels such that the set includes a respective sub-set of sub-channels defined on each of a plurality of OFDM symbols (or sets of OFDM symbols). The sub-channels can be defined as in the example of FIG. 17 by dividing the available sub-carriers into a number of groups equal to the number of sub-channels to be defined, and taking a sub-carrier from each group, optionally in the same position. However, other methods of defining the sub-channels can be employed. The sub-channels thus defined (over multiple OFDM symbols or sets of OFDM symbols) can then be combined into diversity channels as in previous examples, for example using a sub-channelization tree.

Figure 17:
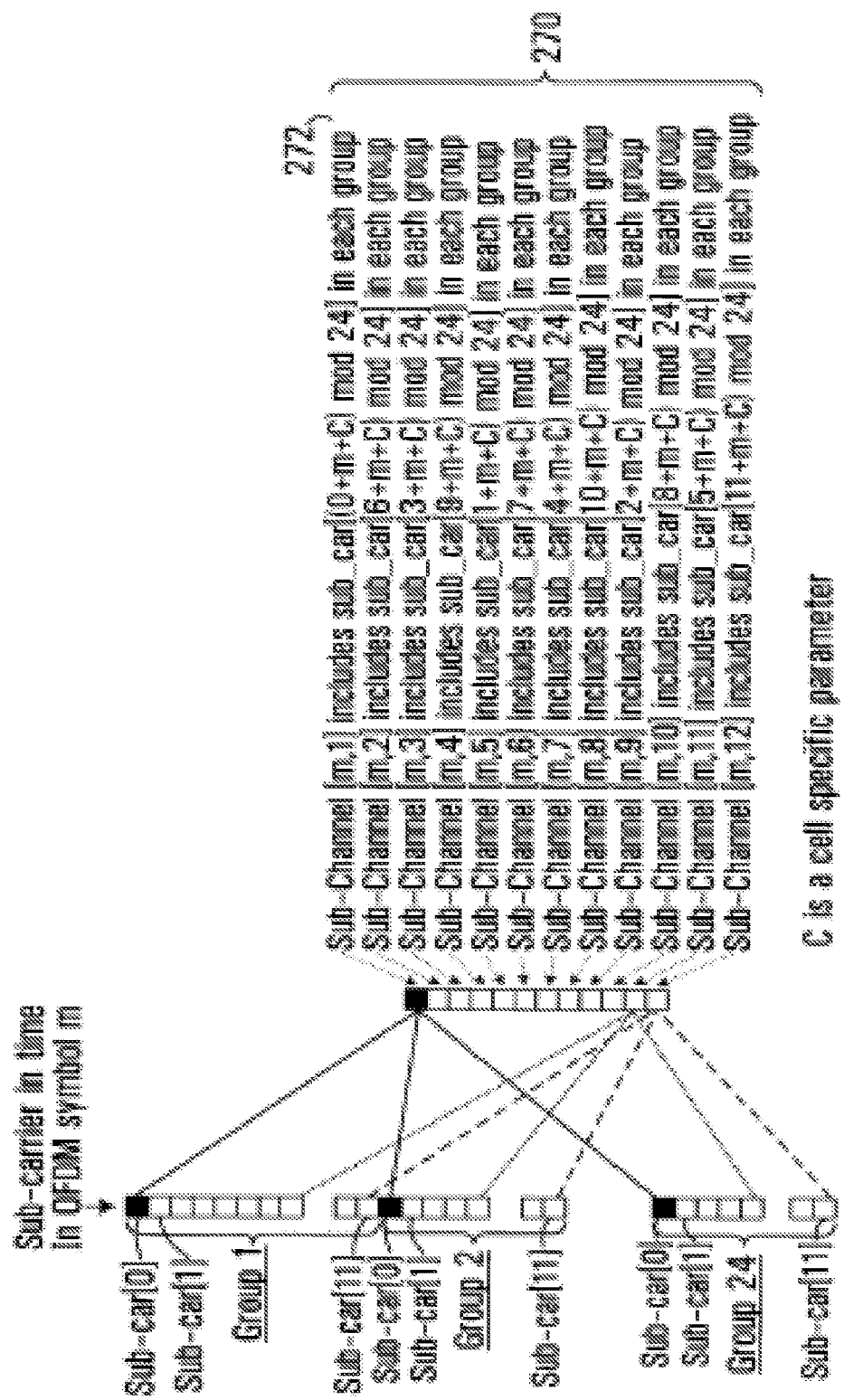
FIG. 17 is another example of diversity sub-channel definition.
Figure 18:
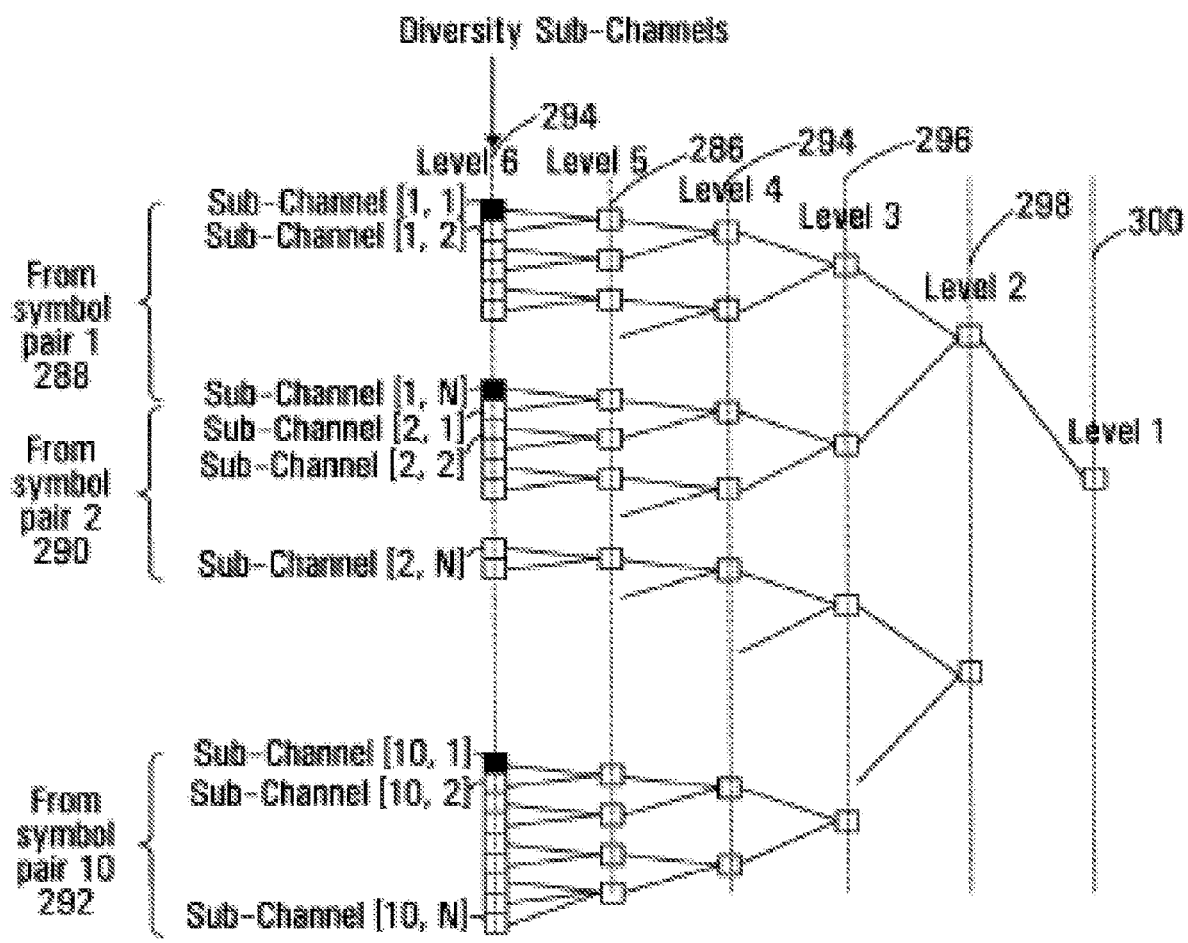
FIG. 18 is an example of a diversity sub-channelization tree using the definition of FIG. 17.

FIG. 18 shows an example of diversity sub-channelization that uses the set of base sub-channels as defined in FIG. 17. A hybrid diversity tree method as generally described previously with reference to FIG. 9B is employed, but more generally any method of combining the sub-channels into diversity channels can be employed. In the illustrated example, pairs of "adjacent" sub-channels are combined in the first level of combination (referred to as level 5 to 80) in FIG. 18. Note that depending upon the definition of the base set of sub-carriers, this may or may not result in adjacent sub-carriers in the sub-channels defined in the first level of combination. The input to the sub-channelization is similar to that described with reference to FIG. 17. More particularly, all of the available sub-carriers for diversity sub-channelization are taken from all of the symbols (or groups of symbols) within the slot and a single diversity tree structure is made from those sub-carriers. In the illustrated example, a single slot consists of 10 symbol pairs and there is a set of available sub-carriers from each symbol pair indicated at 288,290,292 for the first, second and tenth symbol pairs respectively. The basic diversity sub-channel is indicated at 294 and includes one sub-carrier from each symbol pair. However, the next level combination at 286 combines diversity sub-channels in a manner such that there are pairs of consecutive sub-carriers. The remainder of the diversity tree is constructed as before with further levels indicated at 294,296,298,300.

Figure 19:
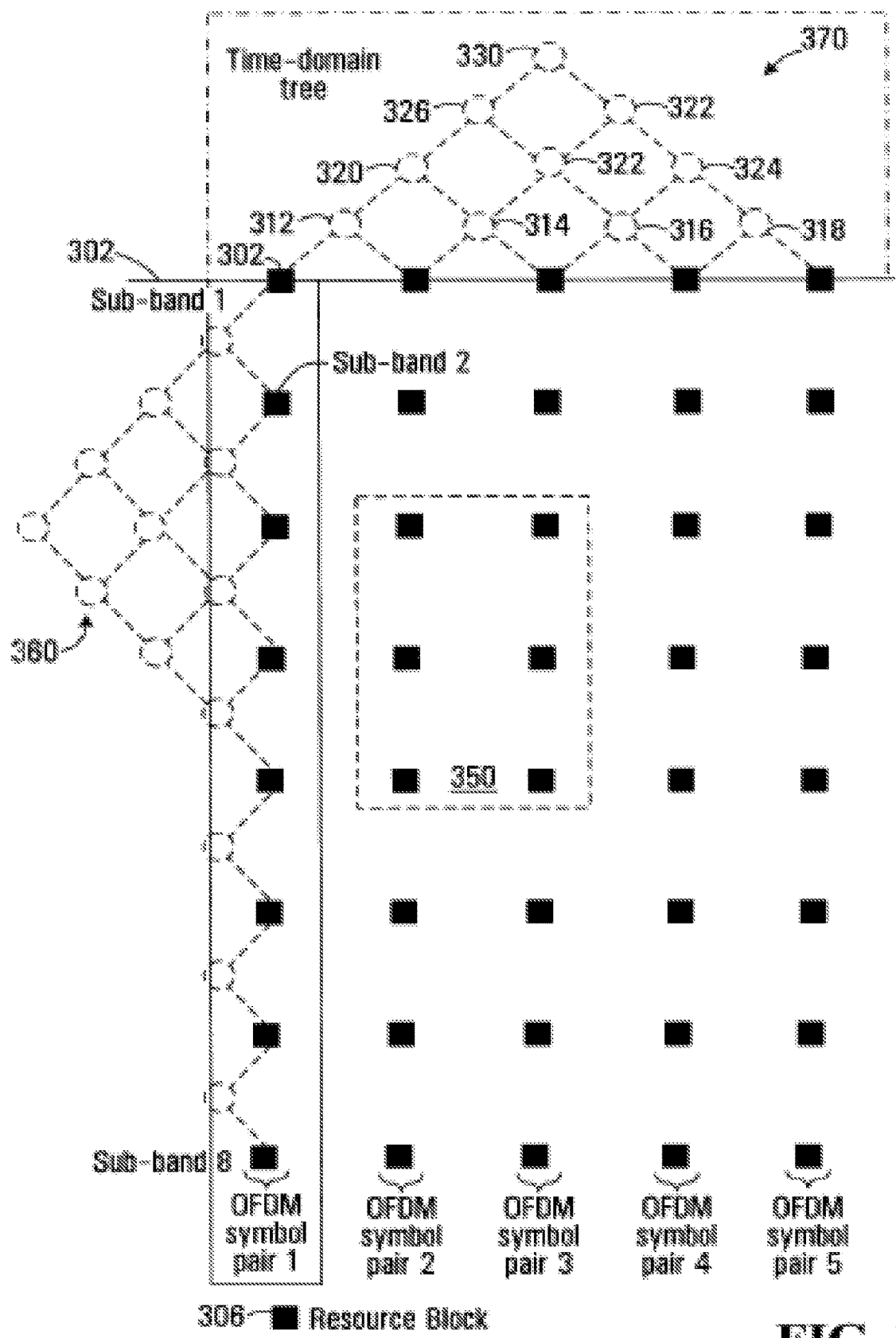
FIGS. 19-20 are diagrams of examples of the assignment of resource blocks to sub-band channels.

Referring now to FIGS. 19 through 23, a set of examples of sub-band channel definition will now be presented. Recall that with sub-band channels, a given sub-band user is allocated a set of resources that is contiguous both in frequency and time within a given slot. Assuming that a resource block has N sub-carriers over M (≥1) OFDM symbols, resources can be assigned to a sub-band user by allocating them K×N sub-carriers (in other words K resource blocks where K≥1), over J sets of M OFDM symbol intervals, where J≥1. The smallest unit of sub-band allocation is a single resource block. FIG. 19 shows a slot structure in which the time domain runs from left to right along axis 302, and the frequency domain runs from top to bottom along frequency domain axis 304. The slot structure includes five OFDM symbol pairs (i.e. M=2) and eight sub-bands. There is a respective resource block 306 indicated in the time-frequency plane for each possible sub-band over each set of symbol pair. For example, resource block 308 consists of the very first sub-band of sub-carriers over the first pair of OFDM symbols. It is readily apparent how such a breakdown could be prepared for an arbitrary number of sub-bands within an overall band, and for an arbitrary number OFDM symbol pairs (or sets of M>=1 OFDM symbols) within a slot. A time-domain tree structure, generally indicated at 310 allows for an efficient definition of any set of consecutive OFDM symbol pairs (or sets of M>=1 symbols). The first level on the tree has a resolution equal to individual OFDM symbol pairs. In the illustrated example there would be five nodes in this tree although these are not shown separately from the nodes for resource blocks. The next level in the tree contains nodes 312,314,316,318 each of which uniquely identifies a pair of consecutive OFDM symbol pairs. For example, node 312 would identify the first and second OFDM symbol pairs. The third level in the tree has nodes 320,322,324. Each of these nodes uniquely identifies three consecutive OFDM symbol pairs. For example, node 320 would identify the consecutive combination of the first three OFDM symbol pairs. In the fourth level, nodes 326 and 328 each identify four consecutive OFDM symbol pairs. For example, node 326 is associated with the first four OFDM symbol pairs. Finally, in the fifth level of the tree, there is a single node 320 that would be associated with all five OFDM symbol pairs of the slot. Thus, by uniquely identifying one of the nodes in the tree (there being 5+4+ 3+2+1=15 nodes) any consecutive set of OFDM symbol pairs can be uniquely identified. As was the case for earlier diversity definitions, the time-domain tree 310 can have associated bitmapping or region identifiers to refer to particular nodes within the tree.

A similar tree structure is defined in the frequency domain to enable the unique referencing of any allowable combination of contiguous sub-bands. In some implementations, a maximum of two contiguous sub-bands can be combined into a sub-band channel; in other implementations an arbitrary combination is allowed. In the illustrated example, a complete tree (not shown) would have eight nodes in the first level, seven nodes in the second level, etc., for a total of 36 nodes. The nodes can be identified again using a bitmap or region ID for example.

In a particular example, an arbitrary node in the time-domain tree 310 can be identified using four bits while an arbitrary node in the frequency domain could be identified using six bits.

Having defined the time-domain tree 310, and the frequency domain tree, an arbitrary sub-band channel can be defined by combining a node identified from the time-domain tree with a node identifier from the frequency domain tree. For the purpose of example, a portion of the frequency domain tree is illustrated. For example, a particular sub-band channel is indicated in FIG. 19 at 350, this containing three contiguous sub-bands over two consecutive OFDM symbol pair durations. This sub-band could be uniquely identified by the combination of the time-domain tree node identifier for node 314 and the frequency domain tree node identifier for 360. This embodiment allows for sub-band resource to be allocated anywhere within the entire resource space.

Figure 20:
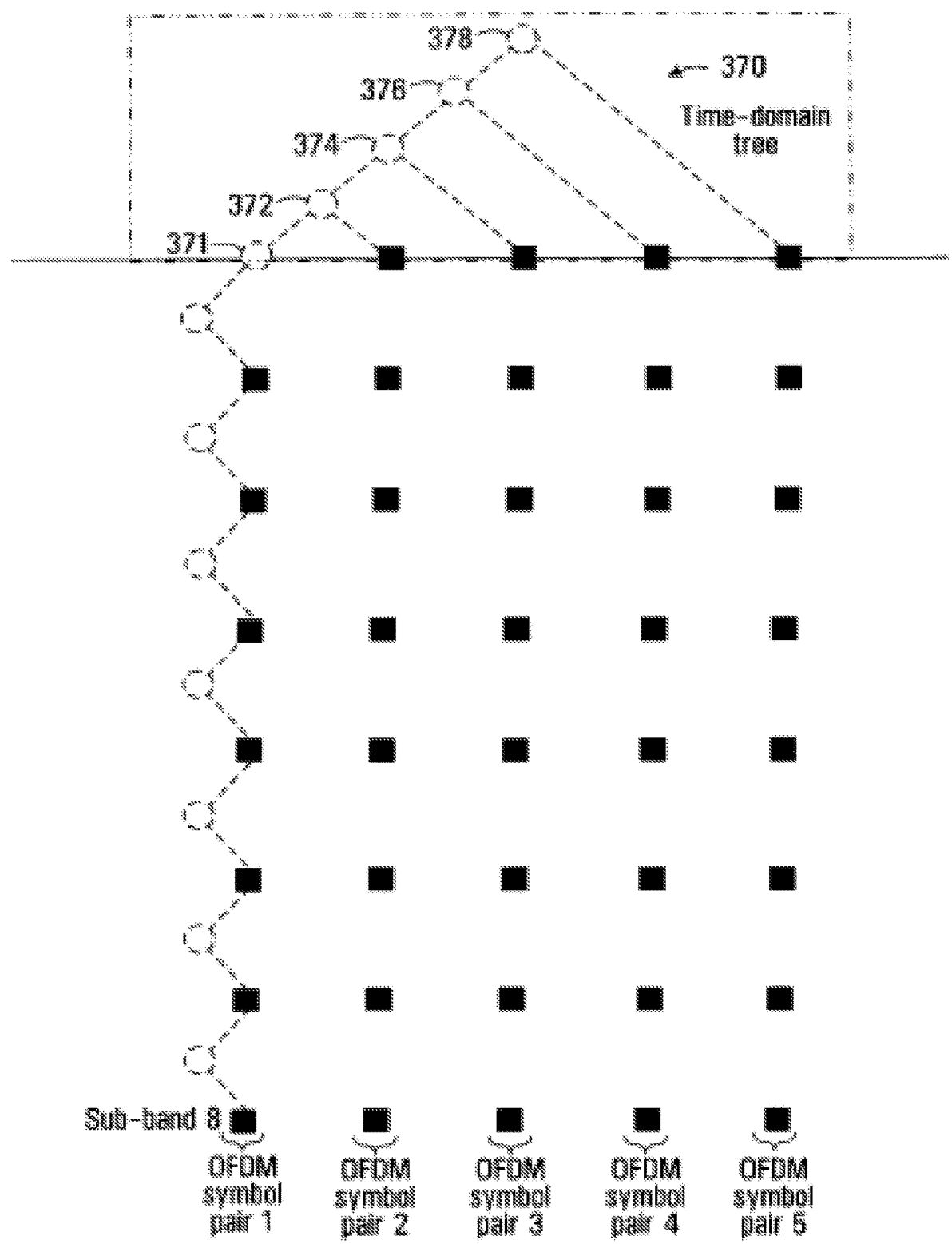

In another embodiment, all sub-band channel resources are allocated starting from this first symbol pair (more generally the first symbol or group of M symbols). This allows for a simpler time-domain tree that incurs less overhead. However, there is also less flexibility. An example of this is shown in FIG. 20 where the time-domain tree, generally indicated at 370, only includes nodes that represent the combinations of consecutive OFDM symbol pairs starting from the start of the slot. Node 372 represents the first two OFDM symbol pairs, the next node 374 represents the first three OFDM symbol pairs, the next node 376 represents the first four OFDM symbol pairs while the top node 378 represents all five OFDM symbol pairs. The tree does not allow for a reference to, for example, the third and fourth consecutive OFDM symbol pairs. It can be seen however that since there are only five nodes in the tree (assuming the first node 371 is included) this can represented using only three bits. The frequency domain tree structure could be the same as that described with reference to FIG. 19.

Note that given implementations may limit the number of consecutive sub-bands that can be combined into a sub-band channel. For example, it may be that only a maximum of two sub-bands can be combined into a given sub-band channel. In this case, the frequency domain tree would only have two levels, the first level that uniquely identifies each sub-band, and the second level that uniquely identifies any pair of contiguous sub-bands. In this case, for the example of FIG. 19 where there are eight sub-band basics, there would be seven nodes in the next level of the tree for a total of 15 nodes in the frequency domain, and these could be uniquely identified using four bits.

Figure 21:
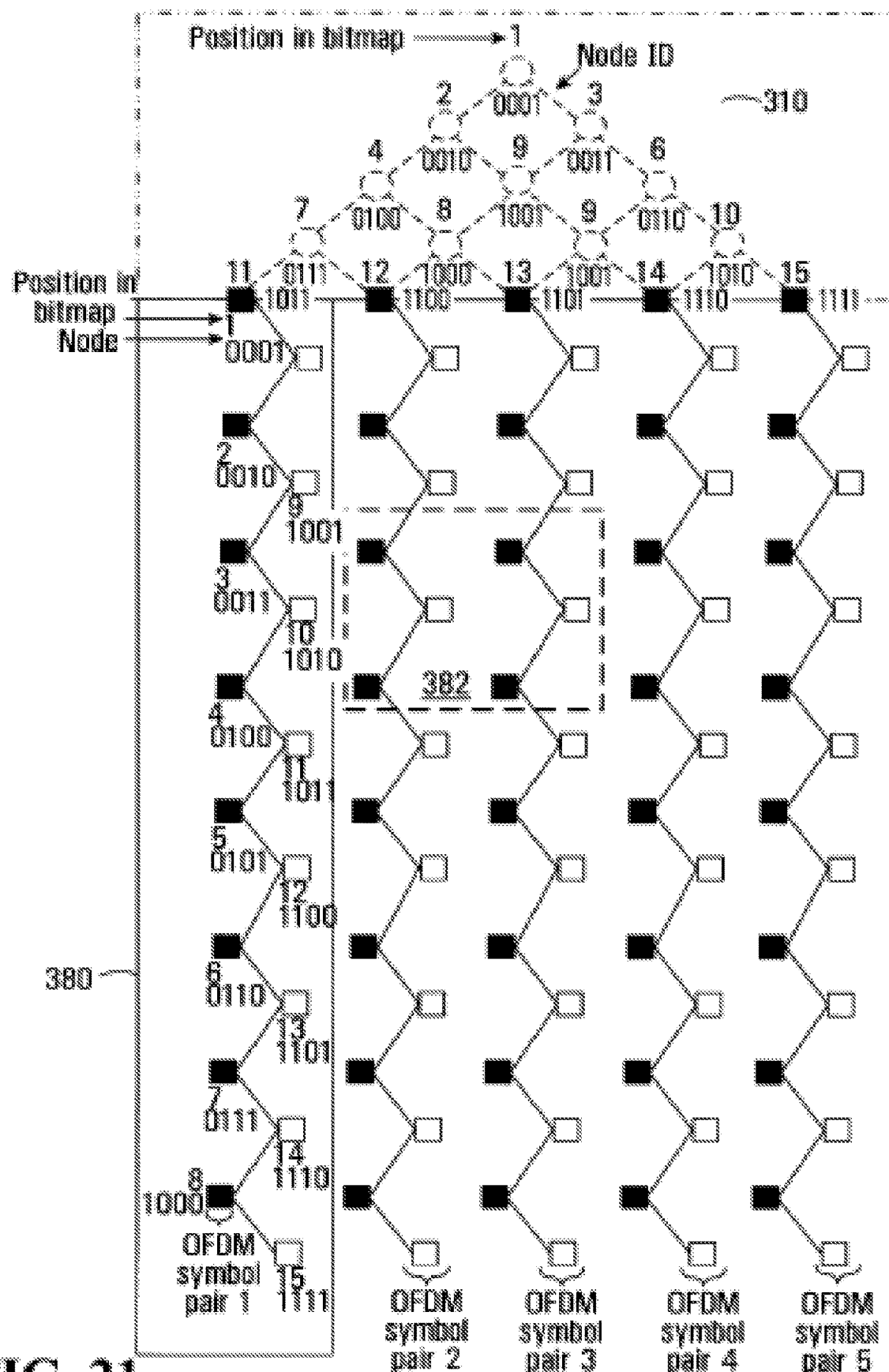
FIG. 21 is a diagram of an example of resource block assignment for sub-band channels with two examples of naming approaches that can be used.

Referring now to FIG. 21, shown is an example of how sub-band channel identification might be performed for such an implementation, namely the implementation of FIG. 19, but where only a maximum of two sub-band basic access units can be combined in a sub-band channel. Here, it can be seen that in the time-domain tree 310 there are still a total of 15 nodes, and these can be identified by a position in a bitmap (referred to as 1, 2, . . . , 15) or alternatively using a four bits node ID as shown. Similarly, in the frequency domain tree, generally indicated at 380, this tree only including two levels as discussed above and having a total of 15 nodes, each node can be identified either by a position in the bitmap (1, 2, . . . , 15) or a four bit node identifier. Thus, a total of eight bits can be used to identify any one of the permitted sub-band channels for the example of FIG. 21. Furthermore, the node naming conventions used in the frequency domain or time domain do not need to be the same. For example, a bitmap approach could be used in the time domain and a node ID in the frequency domain or vice versa. It is also to be understood that any appropriate node naming convention could be employed. A particular sub-channel as indicated at 382, this consisting of two consecutive sub-bands over two OFDM symbol pairs. The node identifier might be the combination of the time domain node identifier (1000) and the frequency domain identifier (1011) for an eight bit identifier consisting of 10001011.

Figure 22:
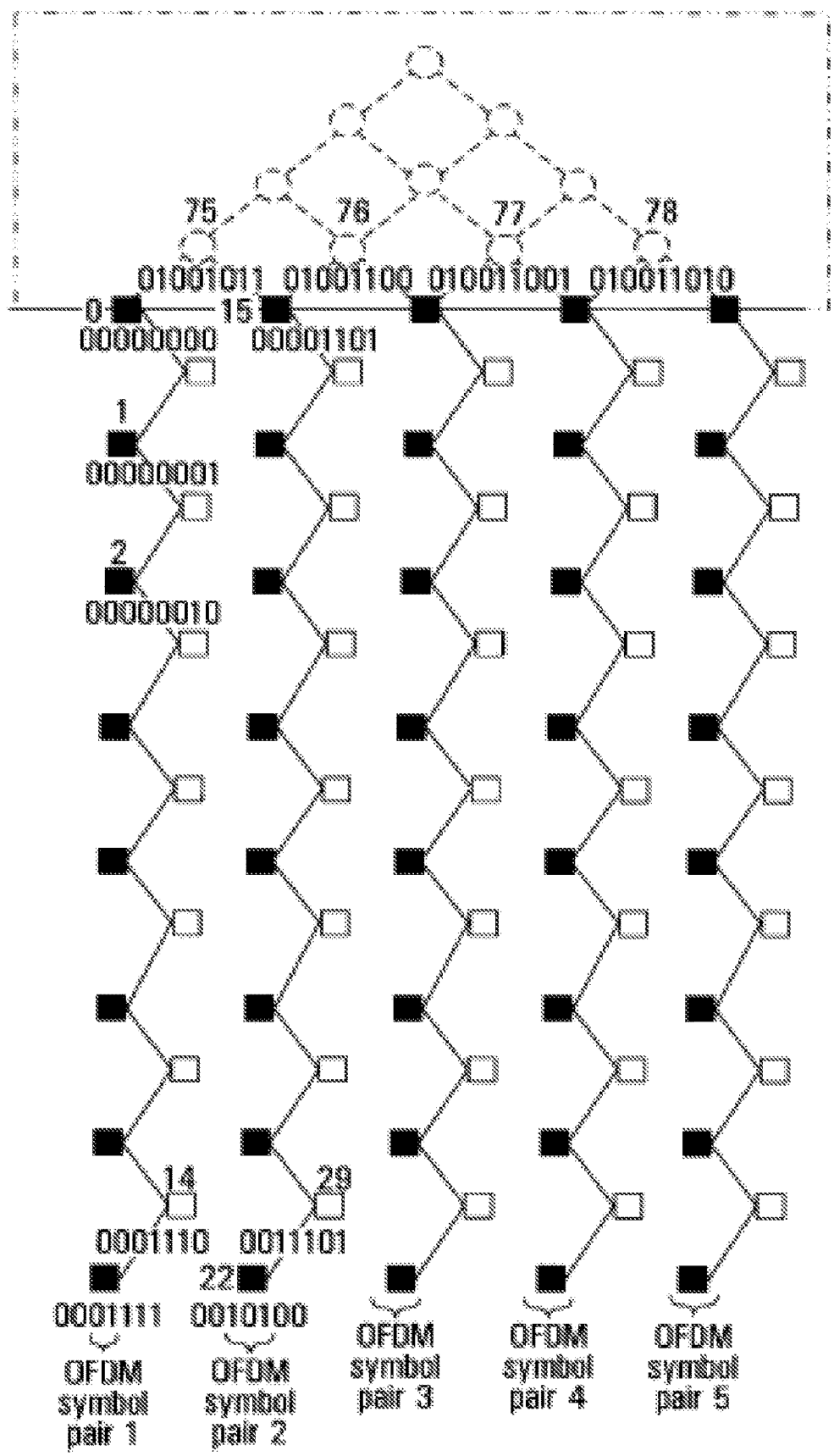
FIG. 22 is a diagram showing another naming approach for naming sub-band channels.

In another embodiment of the invention, rather than labeling nodes in the time domain and the frequency domain separately, each permutation of a frequency domain node and a time domain node has a respective unique label region ID. For the example of FIG. 21, there are 15 time domain nodes and 15 frequency domain nodes for a total of 225 nodes that are each given a unique identifier. Thus, again eight bits could be used to identify each of these 225 nodes uniquely. An example of this is shown in FIG. 22 which is the same tree structure of FIG. 21, but in which each node is uniquely labeled. In FIG. 22, only some of the nodes associated with first sub-band are labeled, since the time-domain tree is shown extending from those nodes. However, for the case where every node is to be given a unique label, a respective time domain tree such as illustrated is constructed for each sub-band. Since there are 225 nodes, these can be uniquely identified using 8 bit identifiers as shown.

In another example of channel definition and naming for sub-band channels, a two step approach is employed. In a first step, a bitmap is used to identify the resource blocks available for sub-band channel definition. For example, in a slot structure consisting of eight sub-band over four OFDM symbol pairs, the total resource would consist of 32 resource blocks, and as such a 32 bit two-dimensional bitmap could be used to identify for each resource block whether or not it is to be used for sub-band channel use. An example of such a two-dimensional bitmap is indicated at 400 in FIG. 23A for a resource space that is 4.times.8. The following is an example of the two-dimensional bitmap 400 for the particular example of FIG. 23A:

[1 0 0 0 0 0 1 1
 1 0 0 0 1 0 1 1
 1 0 1 0 0 0 0 0
 0 0 1 0 0 1 1 0]

Figure 23A:
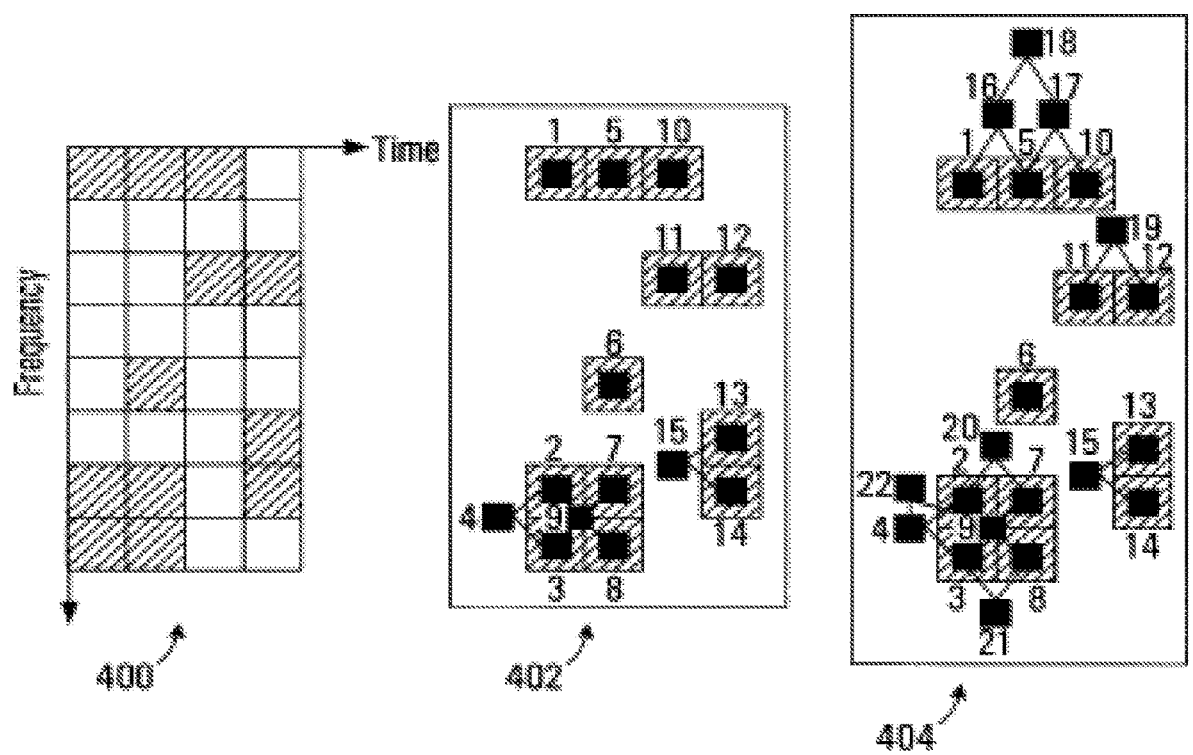
FIGS. 23A and 23B are further examples of sub-band channel definition and naming.
Figure 23B:
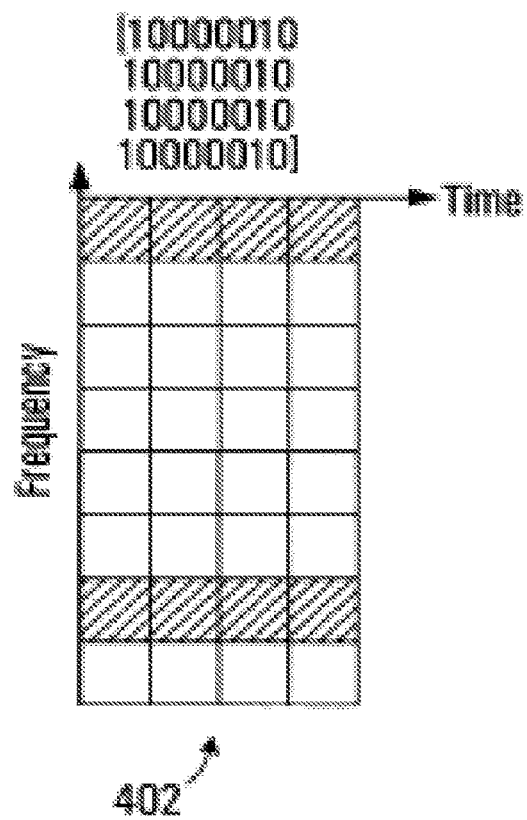
Figure 23B:
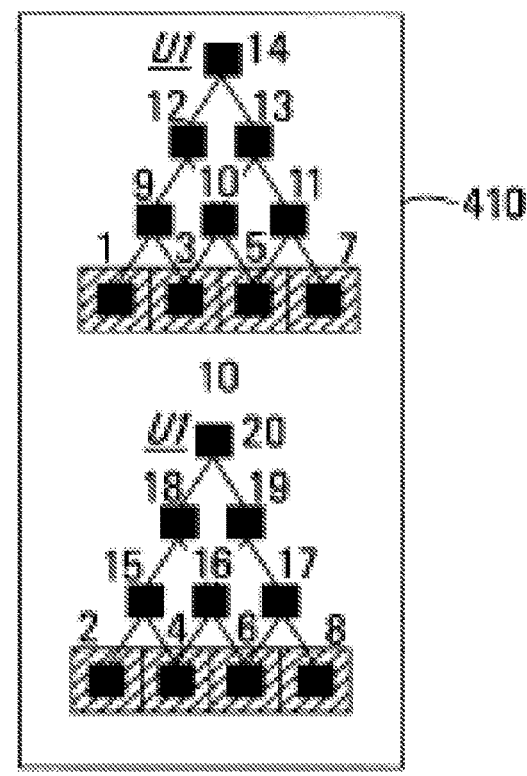

FIG. 23B shows another example of sub-band allocation using this approach. In this case, the two-dimensional bitmap is indicated at 408.

The next step is to use a systematic naming method to name each sub-band channel that can be created using one or a combination of the resource blocks identified for sub-band channel usage by the bitmap. By "systematic naming method" it is simply meant that the method can be consistently applied to a given bitmap to give the same results. In the particular example illustrated in FIG. 23A, a two step approach is performed to the uniform naming. First, naming is performed in the frequency domain with each individual sub-band being given a name, and where there is a set of contiguous sub-bands, a frequency domain tree is built using those consecutive sub-bands. In the illustrated example the first naming step is indicated at 402, it can be seen that during the first OFDM symbol pair there are three sub-band identified in the bitmap as being available for sub-band channel usage, and these have been identified as 1, 2, 3 respectively. Furthermore, since sub-bands labeled 2 and 3 are contiguous, a tree is built off that, and this results in an additional node numbered 4. During the next OFDM symbol, there are four sub-bands available for sub-band channel usage and these have been labeled 5, 6, 7, and 8, and the combination of sub-bands labeled 7 and 8 has been labeled 9. During the third OFDM symbol, there are only two sub-bands available for sub-band channel usage and these are labeled 10 and 11. The fourth OFDM symbol pair, there are three sub-bands available for sub-band channel usage, and these are labeled 12, 13 and 14. Since sub-bands labeled 13 and 14 are contiguous, there is an additional node labeled 15. Next, tree structures are built in the time domain where appropriate as indicated at 404. This is again done systematically. In the illustrated example it is done starting at the top in the frequency domain. Thus, since nodes 1, 5 and 10 are consecutive in time for a given sub-band, any permutation of 1, 2 or 3 of these resource blocks is a valid sub-band channel definition. Thus, nodes 16 and 17 are used to identify pairs of consecutive symbol pairs while node 18 is used to identify all three of them in combination. Furthermore, node 19 has been added to indicate the combination of nodes 11 and 12; node 20 has been added to indicate the combination of nodes 2 and 7 and node 21 has been added to indicate the combination of nodes 3 and 8. Finally, node 22 has been added to indicate the combination of nodes 4 and 6. Node 22 would refer to the block of four resource blocks including nodes 2, 3, 7 and 8.

Having completed such a naming convention, there are a total of 22 nodes and as such a 22-bit bitmap could be used or a five bit node ID could be used to assign any of these permutations of resource blocks for usage with a given sub-band channel. The node ID or bitmap together with the original two-dimensional bitmap 400 can be used to signal sub-band channel structure uniquely.

For the example of FIG. 23B, there are no contiguous sub-bands and as such there is no tree structure in the frequency domain.

The following is an example of signaling that might be used to perform channel assignment in combination with the bitmap:

Number of assignments=00010
U1 (user identifier for a first user), node ID=01110, PHY parameters
U2 (user identifier for a second user), node ID=10110, PHY parameters A particular naming convention has been described with reference to FIGS. 23A and 23B. More generally, after first signaling the resource blocks to be used for sub-band channelization (for example using a bitmap), any systematic naming convention can be applied to identify each permutation of contiguous sub-bands over consecutive sub-slots.

In the above described methods of allocating resources to sub-band channels or diversity channels, the assumption has been that sub-band channel resources are allocated first, and then what is left over is used to allocate to diversity channels. In another embodiment, a systematic approach to sub-band channel and diversity channel definition is employed that does not make this distinction. Rather, the entire band is made available for both sub-band channel use and diversity channel use. However, priority is given to one channel type or the other where there is a conflict. In one embodiment, where a given sub-carrier is allocated for both a sub-band channel and a diversity channel, the contents of the diversity channel are punctured or omitted, and the sub-carriers used for the sub-band channel contents. Receivers of the diversity channel can make use of signaling information to know which sub-carriers of their diversity channel have been punctured by sub-band channel and as such will know which sub-carriers to ignore.

In a first embodiment, a sub-band channel definition approach is used in accordance with any of the examples given above to allow a sub-band channel to be defined using a contiguous set of sub-carriers over one or more OFDM symbols or symbol pairs. On top of this, a diversity sub-channel is using all of the sub-carriers within the band. Particular diversity users are then assigned one or more of these diversity sub-channels. Where the diversity channels overlap with the assigned sub-band channels, the diversity channel contents are omitted in favor of the sub-band channel contents.

A specific example of this will now be described with reference to FIG. 24 where a sub-band basic access unit slot structure is shown at 410 for an example slot that provides for a 4.times.4 resource block space, each resource block consisting of eight sub-carriers by two OFDM symbols. Thus, each node in the tree 410 represents eight sub-carriers over two OFDM symbols. The tree structure shown allows for any pair of consecutive basic access units to be combined in a sub-band channel. In some embodiments, multiple groups of eight sub-carriers that are located contiguously can also be combined in generating this sub-band channel as was the case in previous examples. Thus, an arbitrary block of nodes from the tree 410 can be used to define a sub-band channel so long as they are rectangular in shape. The entire set of 32 sub-carriers for the last OFDM symbol pair in the tree 410 are shown generally indicated at 412. These 32 sub-carriers are used to define basic access units for diversity channel definition, i.e. diversity sub-channels. In the illustrated example, the 32 sub-carriers are arranged in groups of four, and every fourth sub-carrier is assigned to the same diversity sub-channel. A diversity sub-channelization tree is indicated generally at 414. The lowest level diversity sub-channels are indicated at 417. One of these sub-channels 415 is shown to include the first sub-carrier for each of the groups of four shown at 412. Four such diversity sub-channels are defined on the basis of the last OFDM symbol pair. Similarly, four diversity sub-channels are defined for the first, second and third OFDM symbol pairs respectively for a total of 16 diversity sub-channels. It can be seen that each diversity sub-channel includes eight sub-carriers, the same as in the sub-band channel for this example. The diversity sub-channelization tree 414 can then be used to define diversity channels that are combinations of diversity sub-channels. For example, node 419 in the tree would consist of the combination of the first four diversity sub-channels, all of which are implemented during the first symbol pair.

Figure 25:
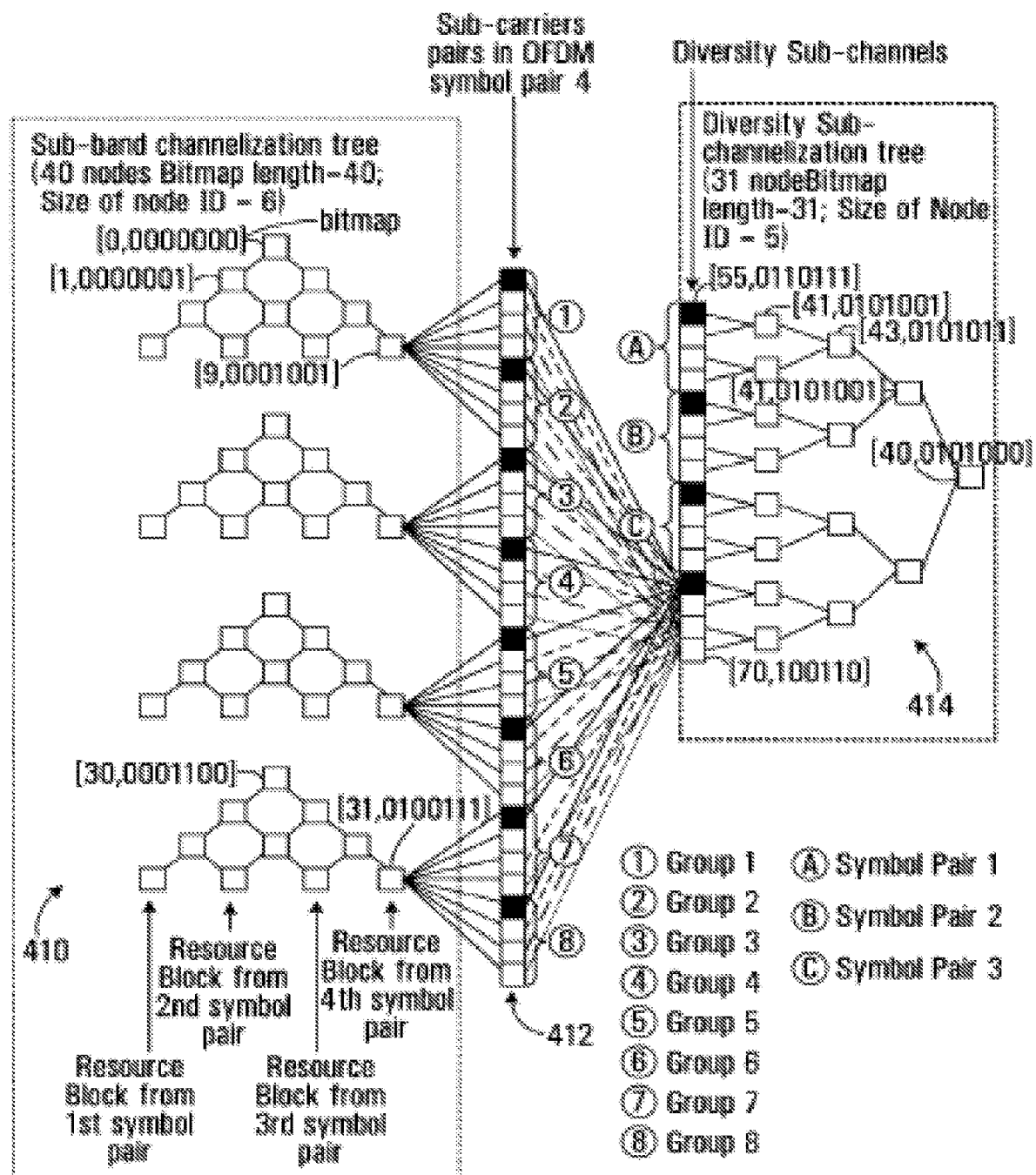

Referring now to FIG. 25, shown is an example of how the jointly defined sub-channels can be identified. In the particular example illustrated, each node in the basic access unit slot tree 410 for sub-band channels and the basic access unit slot tree 414 for diversity sub-channelization that can be used in association with a user identifier to indicate that that user identifier is to use that channel, be it a sub-band channel or a diversity channel. In another possible implementation, a bitmap containing a respective bit for each of the sub-channels is transmitted with a "1" in each position that is to be occupied. In addition to that, a user identifier can be transmitted in association with each "1" to identify which user is to occupy that channel. In a particular example illustrated in FIG. 25, there are 40 nodes in the sub-band tree and there are 31 nodes in the diversity tree 414 and as such a 71-bit bitmap could be used to identify which sub-channels are occupied.

Figure 26:
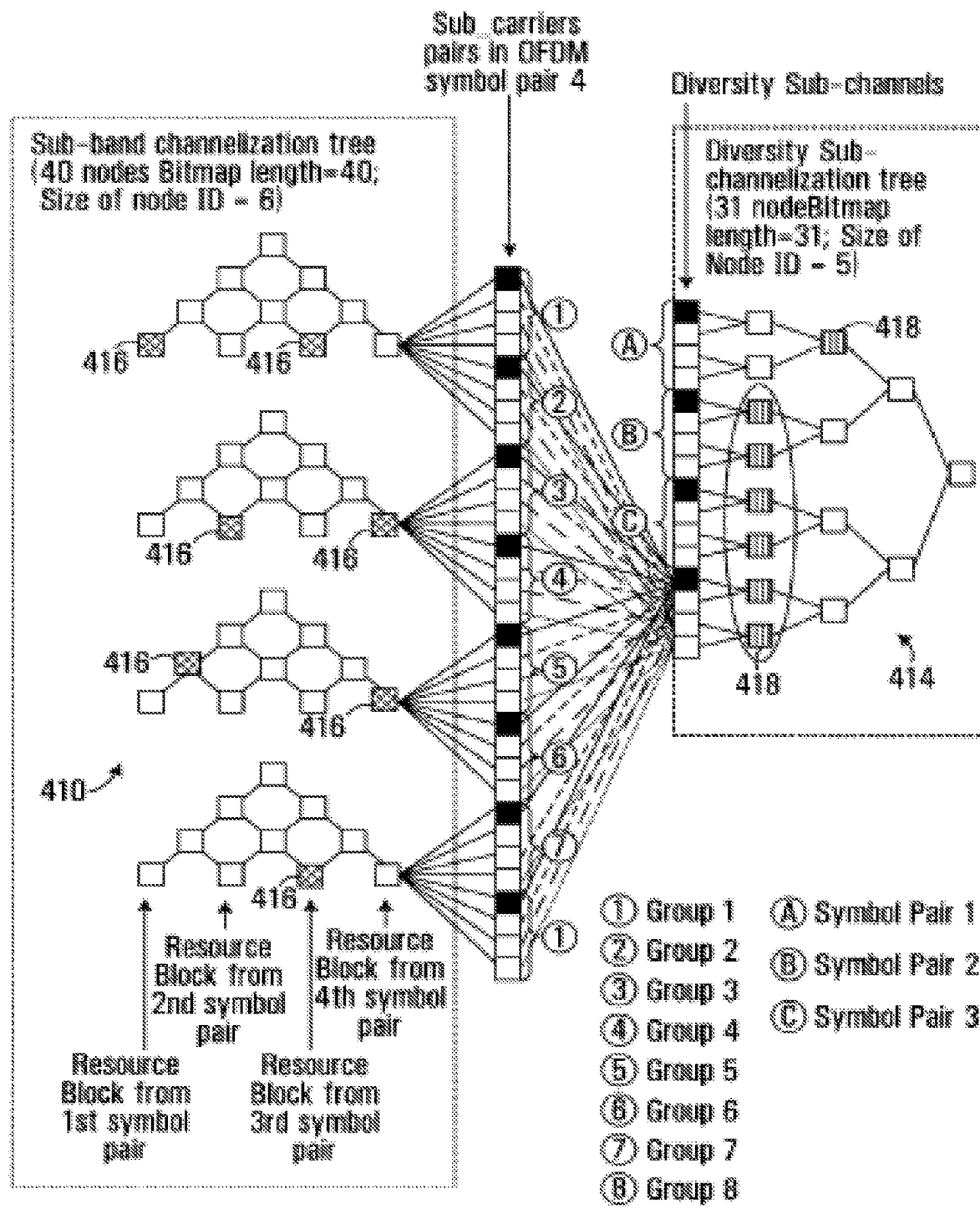

Referring now to FIG. 26, a specific example of sub-channel utilization is shown where there are seven sub-band channels 416 occupied within the sub-band tree 410, and there are seven diversity channels 418 occupied within the diversity tree 414.

Figure 24:
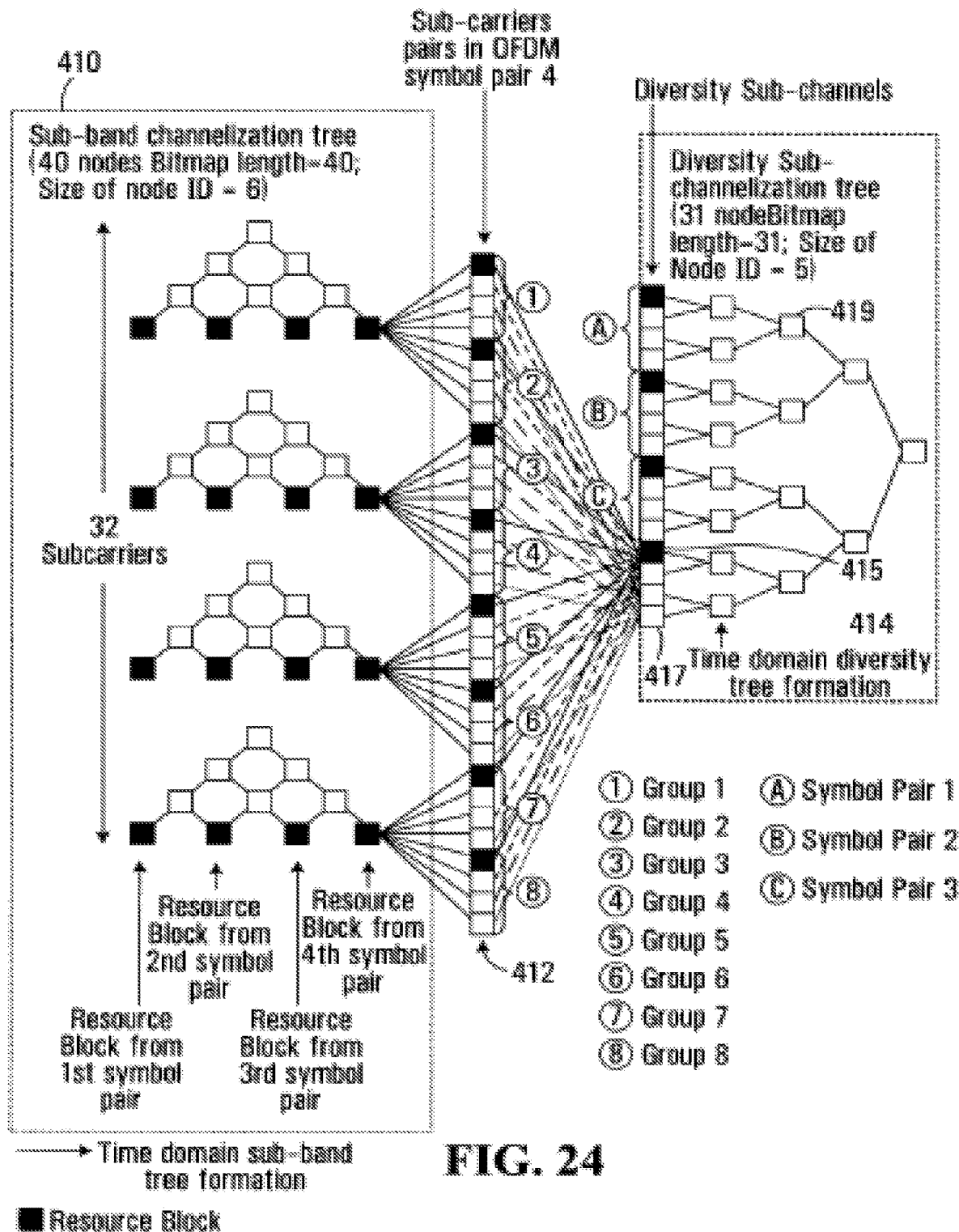
FIGS. 24 through 26 are diagrams of three different examples of diversity sub-channelization in which all of the sub-carriers are employed for diversity sub-channelization notwithstanding whether or not sub-band channels have been assigned.

With the examples of FIGS. 24 through 26, the assumption is that every single node in the sub-band tree or diversity tree is available for use in defining sub-band channels or diversity channels. In some implementations, it may be advantageous to only activate certain nodes within the tree. For example, for conditions in which the smallest sub-channel will require a combination of at least two basic access units, it would not be useful to include the bottom nodes in the sub-band basic access unit tree because these would not ever be used on their own. By reducing the number of nodes in the tree, a particular channel structure can be identified more efficiently. For example, if a bitmap is used, a smaller bitmap can be sent to identify where the active channels within the "active" channel set are. In general, the approach is to signal which portion of the tree is active, and then to perform node naming for the active nodes, and to perform channel assignment using the nodes thus named. The partial tree activation approach can be used with either the sub-band channelization tree, and/or the diversity sub-channelization tree or for the combination of the two.

Figure 27:
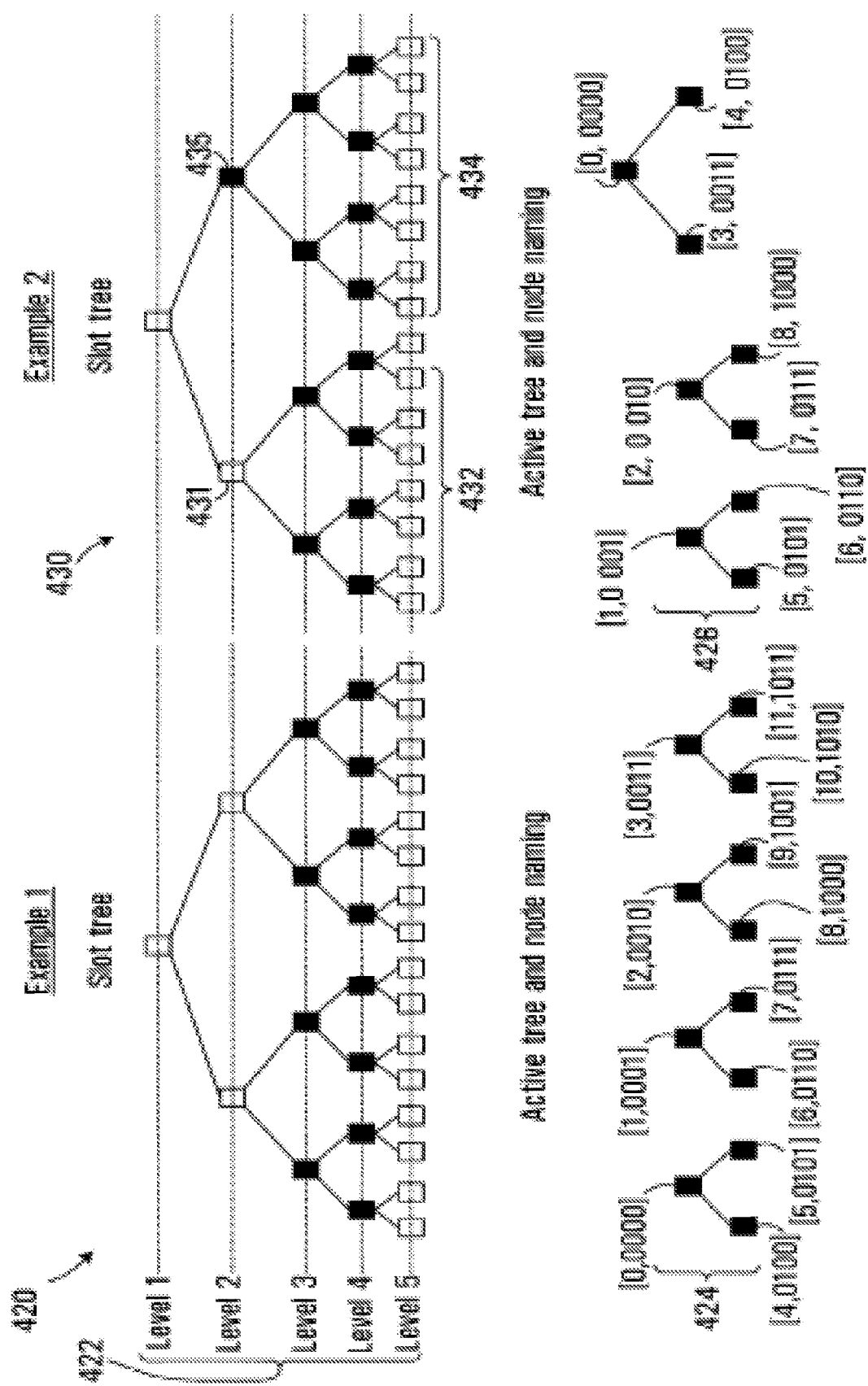
FIGS. 27 to 32 are diagrams showing how a reduced portion of an overall tree can be employed to reduce the amount of signaling required, and how updates to such a tree can be achieved.

In a first example, in order to activate a partial tree, entire levels of the tree are de-activated or activated together by signaling the top level within the tree that is active and signaling the bottom level within the tree that is active. An example of this is shown in FIG. 27, generally indicated at 420. Shown is a five level tree 422 within which it is desired to activate only the nodes of levels three and four. In other words, channels containing a single level five sub-channel are not to be allowed, and channels that correspond with level two (eight sub-channels) or level one (all of the sub-channels) are not allowed. This can achieved by signaling level three to be the top level and level four to be the bottom level which will then indicate that the active tree is that indicated generally at 424. At that point, node naming can be employed using any of the examples described before to name each of the nodes within the active tree. In the particular example illustrated, there are only 12 nodes in the active tree, and as such a 12-bit bitmap can be used or four bit region IDs can be used to identify individual nodes.

In another example, the approach is further refined to allow the top and bottom level to be defined for multiple segments within the tree, each tree being defined by a respective top node. An example of this is also shown in FIG. 27, generally indicated at 430. Here, the same five level tree 422 is shown, and there are two segments. The first segment 432 has a top node 431, and the top level in the tree that is to be activated beneath that top node is the third level, and the bottom level to be activated is the fourth level. Similarly, for the second segment 434 having top node 435, the top level to be activated is level two, and the bottom level to be activated is level three. The resulting active tree is generally indicated at 436. Once again any appropriate naming approach can be used to name the nodes thus identified. In the particular example illustrated, there is a total of nine nodes and thus a 9-bit bitmap, or four bit region identifiers can be employed. The following is an example of a signaling scheme that could be used to indicate the active tree structure:

Number of Segments
For each segment
   Top node
   Top level of tree
   Bottom level of tree
For Example 1 of FIG. 27:
   Number of segments=1
   top level=3, bottom level=4
For Example 2 of FIG. 27:
   Number of segments=2
   For segment 1 (top node ID=00001, top level=3, bottom level=4)
   For segment 2 (top node ID=00010, top level=2, bottom level=3)

Figure 28:
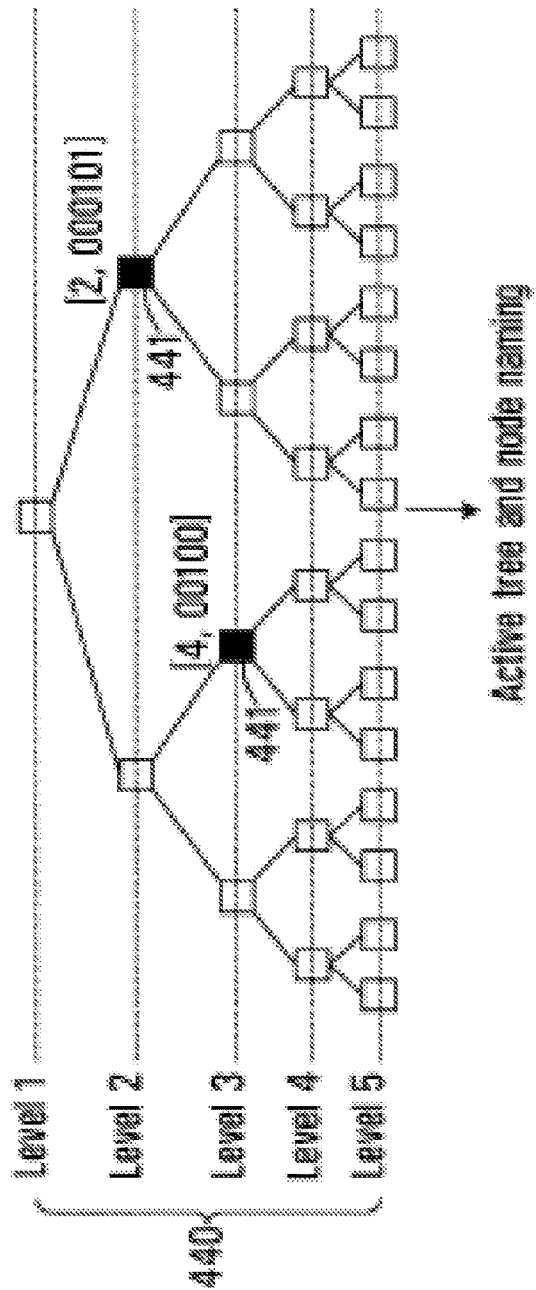
Figure 28:
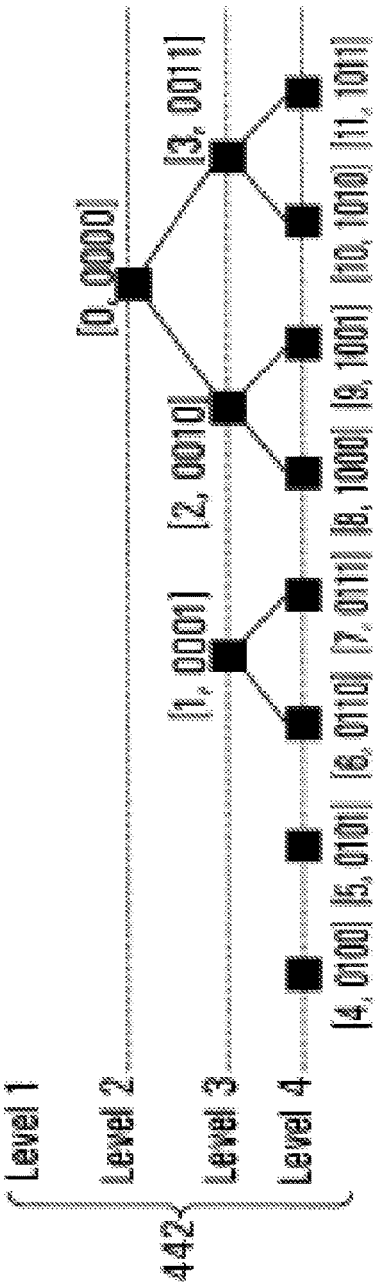

In accordance with an embodiment of the invention FIG. 28 presents another partial tree activation scheme which uses a bound tree approach. With this approach, rather than signaling a top node, and a top level of the tree and a bottom level of the tree for each of a plurality of segments, a top node is signaled for each segment, and a bottom level for each top node is signaled. Thus, all of the nodes beneath each top node that is identified down to the associated bottom level are included in the active tree. In the example of FIG. 28, a five level tree is indicated at 440, and two top nodes 441 are to be included in the active tree, and the bottom level is level four. Thus, the active tree that results is that shown generally indicated at 442. With such an active tree thus established, the node naming can proceed using any appropriate method for example some of the methods described previously.

Figure 29:
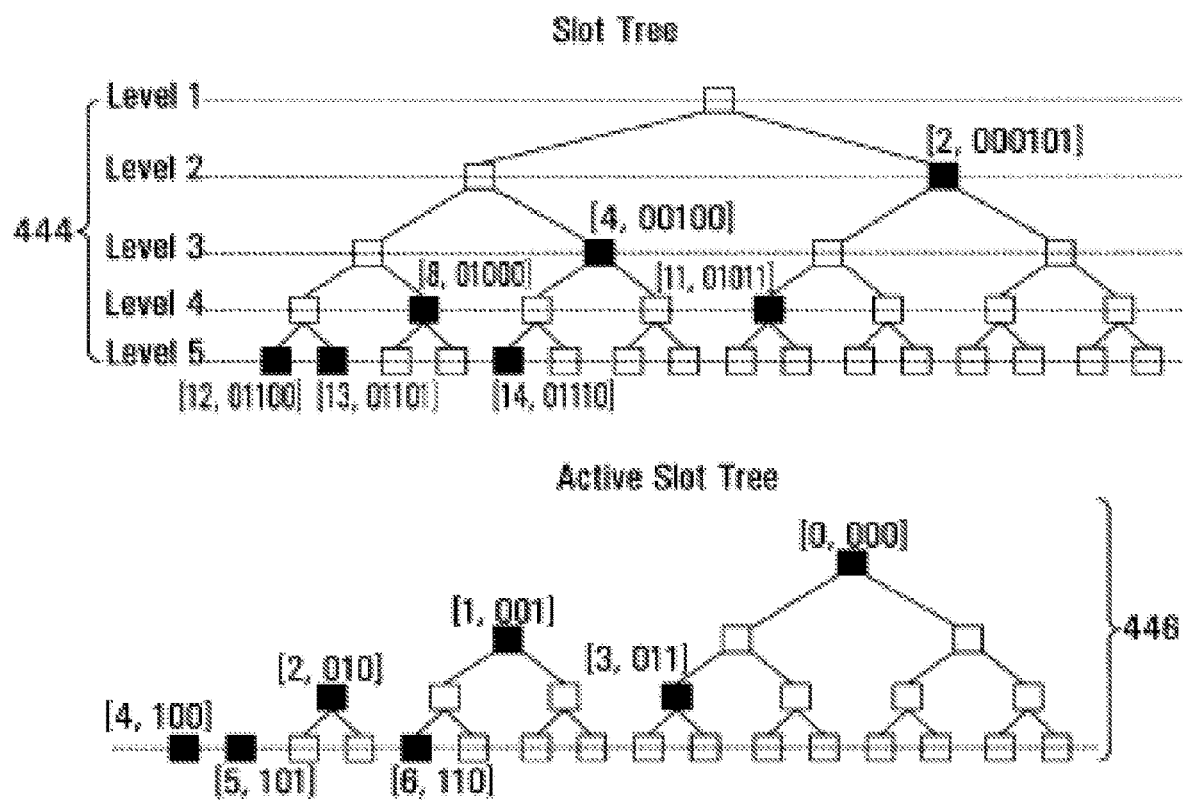

In accordance with an embodiment of the invention FIG. 29 presents another partial tree activation scheme which uses a node activation approach. With this approach, to begin all of the nodes that are active within an overall tree is identified. This can be done for example using a bitmap. Once a smaller number of nodes is thus identified, the remaining active nodes are named using an appropriate naming approach. An example of this is shown in FIG. 29 where a five level tree is shown at 444 containing 31 nodes. A subset of these nodes are selected to be active, these including the seven node shown in bold in FIG. 29. A 31-bit bitmap can be transmitted to indicate that seven nodes that are active. Then, as the active slot tree as generally indicated at 446, and each of the active nodes can be named. In the illustrated example, since there are seven active nodes, three bits can be used to identify each of the nodes uniquely, or a 7-bit bitmap can be used to indicate which of the nodes in the active slot tree are used. In this case, it can be seen that there is an unbalanced resource assignment since the nodes in the active slot tree have differing amounts of resources assigned to them.

Figure 30:
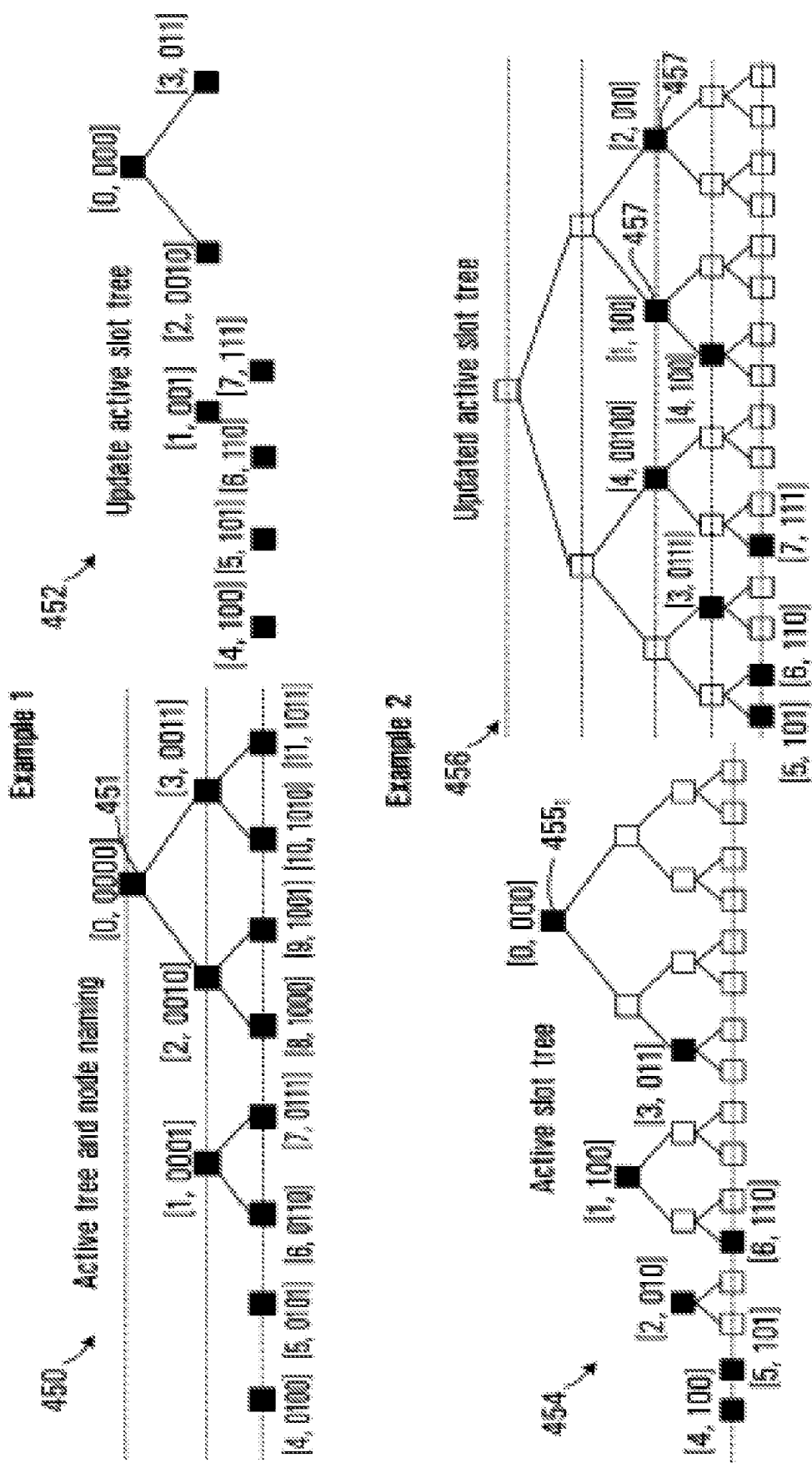

The nodes that make up the active tree can be updated either slowly or dynamically. In some embodiments, the entire tree can be updated. In other embodiments, only the portions of the tree that have changed are updated so as to reduce overhead. Two specific examples are illustrated in FIG. 30. In the first example, a top node is used to define the portion (or segment) of the tree that needs modification. Preferably the top node is referred to using the full tree, i.e. prior to pruning the tree to be an active tree. In example 1 of FIG. 30, the active tree 450 needs to be amended so as to be the active tree 452. Thus, the full tree identifier for node 451 is identified, and then the new update information for that node is provided. In this example, this consists of a bottom level for the node, again referring to the full tree for the level definition. It is much more efficient to signal simply the single node 451 and its update information than to re-signal the entire active tree.

In example 2 of FIG. 30, the top node again is signaled, and then a bitmap is used to indicate which sub-tended nodes are to be active after amendment. Thus, having identified node 455, again with reference to the full tree, a bitmap can be used to indicate which of the nodes are to be active in the updated active tree 456. In the illustrated example, this consists of the three nodes 457.

Figure 31:
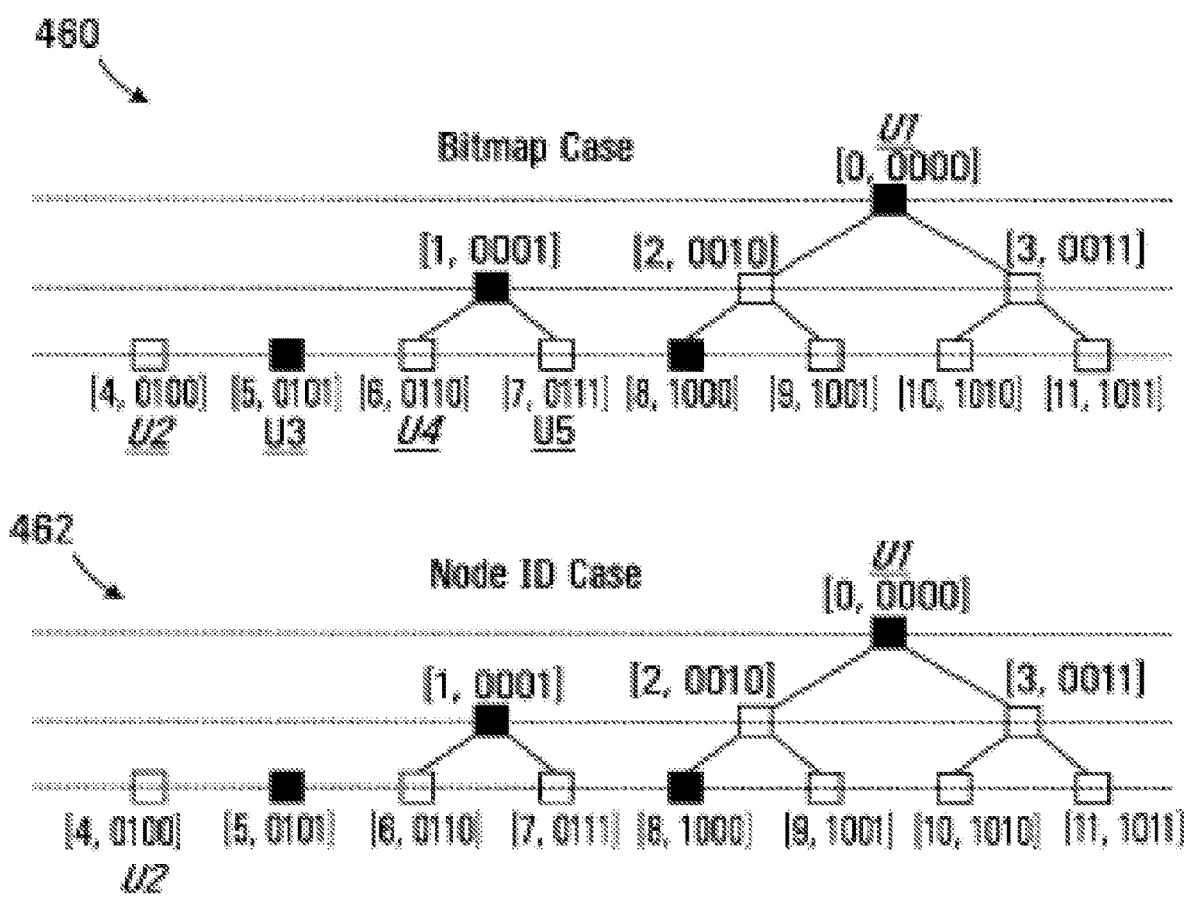

Referring now to FIG. 31, two specific examples of assignment signaling will be provided. For the bitmap approach, a bitmap is transmitted indicating which nodes in the active tree are assigned, and for each node, a respective user ID is signaled. The following is an example of such a bitmap and user ID signaling for the active tree 460 of FIG. 31:

Bitmap:
100011111000
User IDs: U1, U2, U3, U4, U5, U6.

In another example, rather than using a bitmap, individual node IDs are assigned to individual user IDs. An example is shown in FIG. 31 where the number of nodes IDs being assigned is 2. An example of the signaling that might be employed is as follows:

Number of assignments=0010 (2)
User ID U1 assigned to node ID=0000
User ID U2 assigned to node ID=0100

As in all of the other examples described herein, a physical layer parameters may also be transmitted in association with the assignment signaling if these are not known a priority to the receiver.

Three further signaling examples are will be described by way of example with reference to FIG. 32. In the first example, generally indicated at 464, a 7-bit bitmap can be used to indicate which of the active nodes are being assigned, and then a user ID is transmitted for each bit in the bitmap. For the illustrated example, the following signaling could be employed:

Bitmap 1110110
User IDs U1, U2, U3, U4, U5

For the second example generally indicated at 466, a node assignment can be employed. The following signaling might be used:

Number of assignments=010 (2)
User ID U1 assigned to node ID 000;
User ID U2 assigned to node ID 001.

Figure 32:
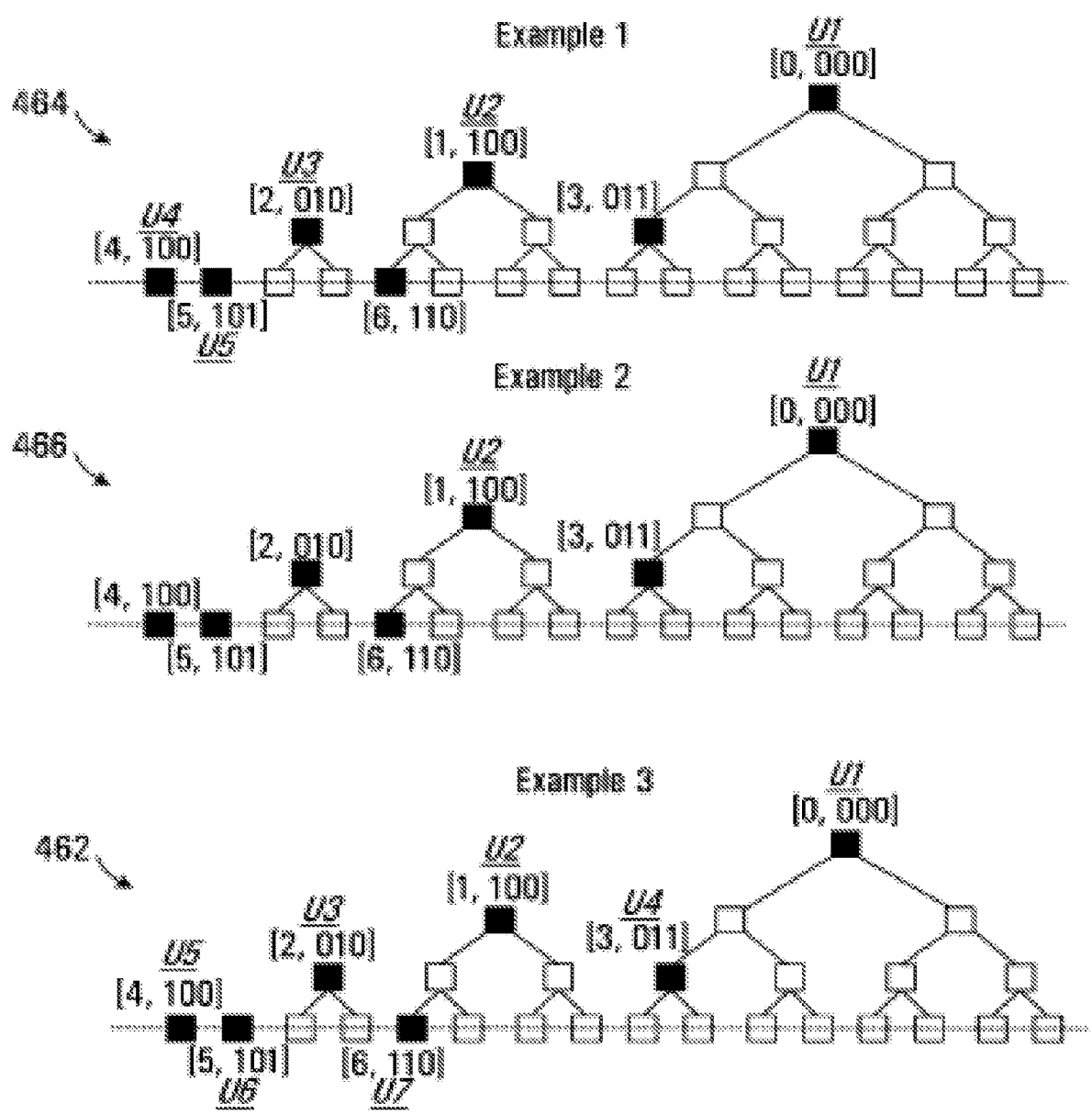

A third example is shown generally at 468 in FIG. 32. In this example, all seven active nodes are used and as such it is necessary to transmit a bitmap to indicate which of the active nodes are being assigned. Rather, it is only necessary to signal a user identifier for each active node.

Static Partitioning

Based on distribution of sub-band and diversity users and their traffic load, the partitioning could remain for a certain time and be updated through a slow signaling. Any of the above approaches can be used for static partitioning.

Dynamic Partitioning

In some embodiments, for each slot, based on the scheduling algorithm, the partitioning between sub-band and diversity channels is dynamically generated. The partitioning can be broadcast dynamically through a two-dimensional bitmap. Any of the above approaches can be used for dynamic partitioning.

Examples have been described in which sub-band channels are allocated first, and then diversity channels are generated using the remaining resource blocks. In some embodiments in which this sequence of allocation is exercised, a threshold is defined that limits the amount of the total transmission resource that can be assigned to sub-band users. The reason for this is that if too much of the spectrum is occupied by sub-band users, there may not be enough spectrum left to define diversity channels that have an acceptable level of frequency diversity as defined for a given application. In some implementations, once such a threshold is reached, no further sub-band channels are allowed to be scheduled. In other implementations, once such a threshold is reached, no diversity channels are allowed to be scheduled, and the remaining bandwidth is made available for sub-band channel use.

Examples have also been described in which diversity channels are defined using the entire set of OFDM sub-carriers, and in which sub-band channel allocation takes away from the sub-carriers of a given diversity sub-channel. Similar thresholding can be applied to ensure that there are sufficient resources for the transmission of diversity channels. In some embodiments, a threshold on the amount of sub-band channel bandwidth occupancy is defined.

Power Off of Partial Resource

In accordance with an embodiment of the invention, a scheme is provided for supporting power off of a partial resource of bandwidth. Power off of partial resource (POPR) of bandwidth may be used in some cases in order to control inter-cell interference and enhance cell coverage by allowing sub-carriers across a fractional slot to be turned off dynamically. The location and size of POPR in the slot may be cell (base station) specific and may power off and on dynamically.

Various examples can be used to implement signaling that enables dynamic POPR control. For cases where the POPR bandwidth is slowly updated, a bitmap might be employed to identify the resources that are to be powered off. For example, a one-dimensional (each bit corresponding to a sub-band with the first bit for the first sub-band) or two-dimensional bitmap (each bit corresponding to a resource block.

Figure 33:
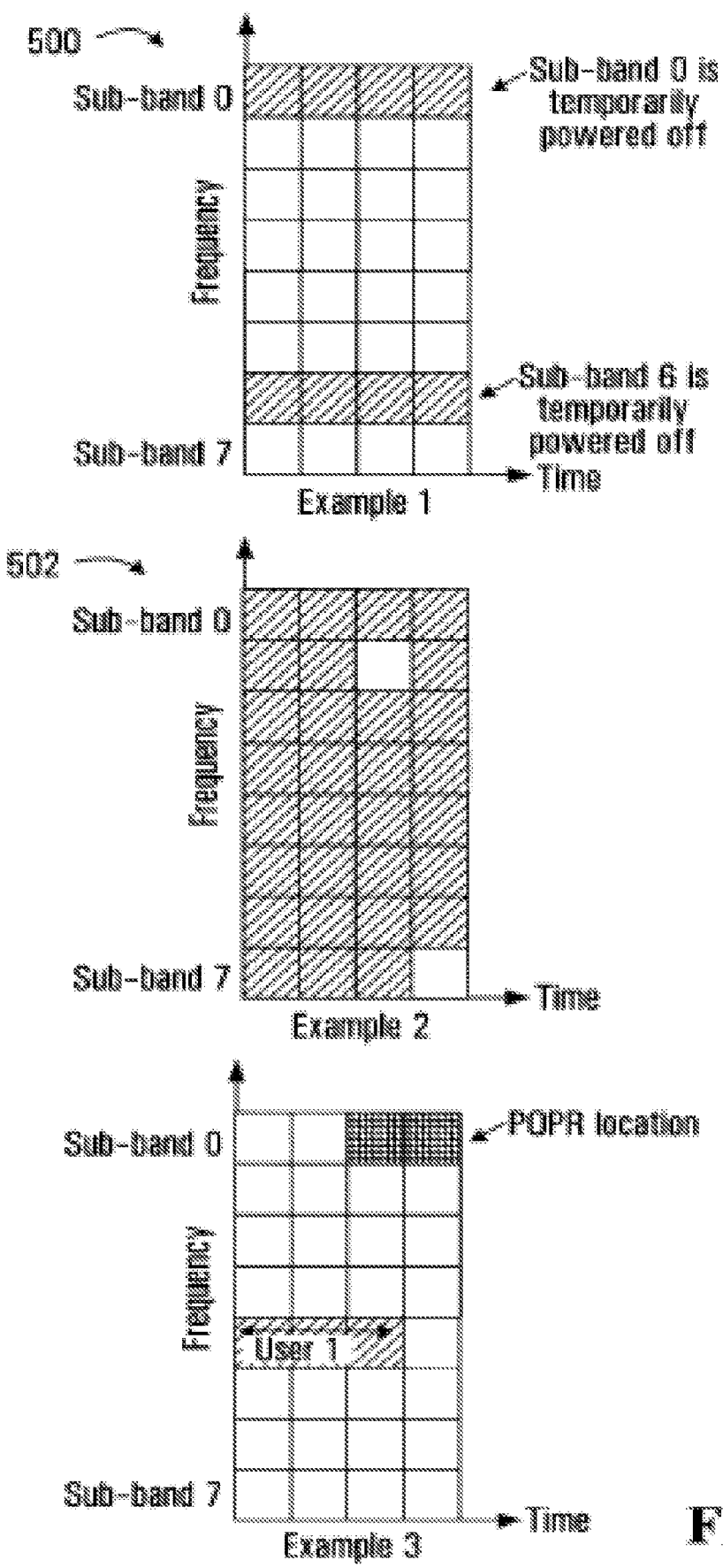
FIG. 33 is a diagram of an example of temporarily switching off sub-bands within the overall OFDM resource.
Figure 34:
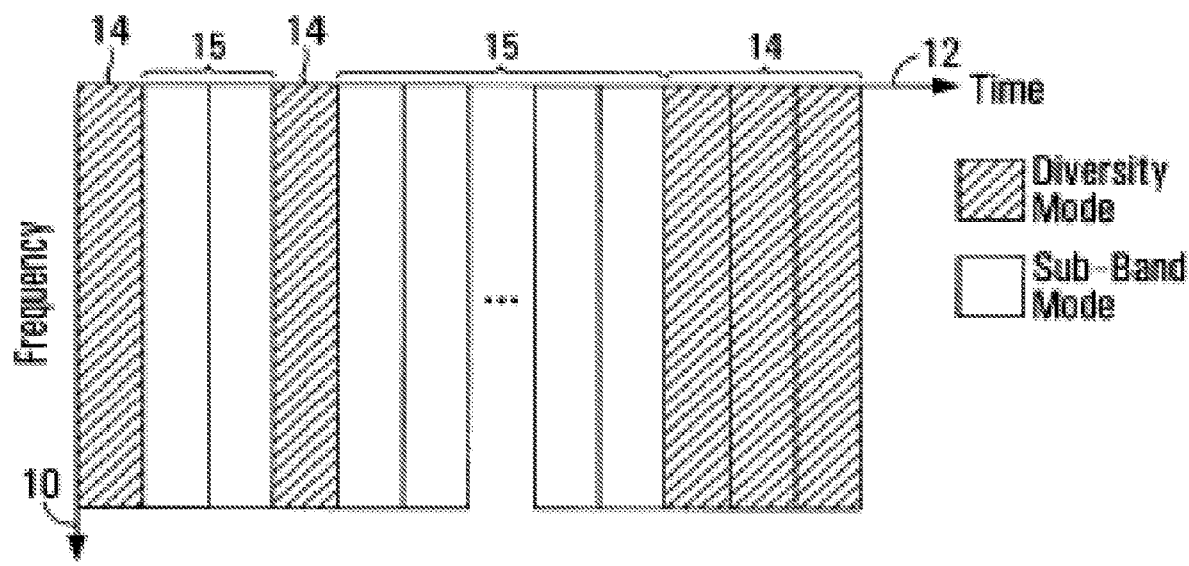
FIG. 34 is a diagram of a set of OFDM transmissions that do not allow for the co-existence of sub-band channels and diversity channels on single OFDM symbols.

Referring now to FIG. 33, a one-dimensional bitmap can be used to signal the POPR case generally indicated by 500 where it can be seen that sub-bands 0 and sub-bands 6 are to be temporarily powered off. A one-dimensional bitmap can be used to indicate that these sub-bands have been powered off. The following is an example of such a bitmap:

Example 1—One-Dimensional Bitmap (Frequency Domain)

[0 1 1 1 1 1 0 1], first bit corresponding to the first sub-band

In a second example, a two-dimensional bitmap is employed. This enables sub-bands to be turned off during specific time intervals within a slot structure. An example of this is generally indicated at 502 in FIG. 33 where a separate bit is used for each resource block. In this case, a 32-bit bitmap could be employed. Alternatively, a one-dimensional bitmap for frequency domain could be used first to indicate that sub-bands that are affected together with additional information indicating how the sub-bands are affected. The following is an example of a frequency domain bitmap for the example of 502 of FIG. 33:
Frequency Domain
  [1 0 1 1 1 1 1 0]->sub-band 1 and 7 are affected
Having identified that sub-bands 1 and 7 are affected using the one-dimensional frequency domain bitmap, a one-dimensional bitmap for the time domain for each of the affected frequency domain sub-bands can be generated. The following is an example of this that indicates that OFDM symbol pair (more generally OFDM symbol or group of M>=1 symbols) 2 in the second sub-band is turned off and OFDM symbol 3 in the seventh sub-band is turned off:
Time Domain
  For sub-band 1: [1 1 0 1]->OFDM symbol pair 2 is turned off
  For sub-band 7: [1 1 1 0]->OFDM symbol pair 3 is turned off
When it comes time to define diversity channels, for example using diversity sub-channelization techniques described earlier, it will be necessary that both the transmitter and receiver would understand that the sub-carriers occupied by PCPR would not be available for diversity channel construction. In this case, a reduced-size diversity channel can be used to transmit a reduced amount of data; alternatively, the same amount of data can be transmitted with the expectation that redundancy in the data can be leveraged at the receiver to compensate for the missing sub-carriers.

In another approach to providing for POPR locations, this can be achieved by simply by assigning the sub-band resources that are to be turned off to null users, for example with a MAC ID=0 in this manner, these channels will not be used. This provides for a very simple dynamic updating of the resources to be turned off.

Scheduling

In accordance with embodiments of the invention scheduling schemes for an OFDM air interface which supports sub-band and/or diversity users are presented below.

There are three cases that can be considered in scheduling the forward link resources:
  All the users are sub-band users.
  All the users are diversity users.
  There is a mix of sub-band users and diversity users.

In some embodiments, a given mobile station can indicate its preference for sub-band channel or diversity channel assignment by indicating whether it would like to report a sub-band CIR or a full band CIR. In some implementations, the system will give each mobile station what it wants. However, in other implementations although the mobile station indicates whether it would like to report a sub-band CIR or a full band CIR, the scheduler decides which of the users that indicate a preference for sub-band reporting actually report a sub-band CIR. For example, the scheduler can indicate to a mobile that would prefer to report one or more sub-band CIRs to instead report a full band CIR, or vice versa, based on factors such as traffic type, buffer size, geometry or the ratio of diversity users to sub-band users. More generally, scheduling each user to be either a sub-band channel or a diversity channel can be performed as a function of information received from users.

The first two cases (where all of the users are sub-band users or all of the users are diversity users) can easily be handled since the next user to be scheduled does not interfere with the previously scheduled users. However, the third case, where there is a mix of sub-band and diversity users, is more complex. When a sub-band channel is scheduled it can take away sub-carriers from several diversity channels. If a diversity user is scheduled before a sub-band user, in the same slot, the number of sub-carriers remaining in the diversity channel may not be sufficient to transmit at the assigned data rate.

The above three cases can be handled using the scheduling schemes described below. In accordance with embodiments of the invention the schemes presented are in accordance with the channelization schemes described above.

The broader concepts are not, however, limited in this regard and can be applied to other channelization schemes including, for example, if the diversity channels take sub-carriers away from the sub-band channels or the case where the sub-carriers used by the sub-band channels and the diversity channels are mutually exclusive.

Figure 40:
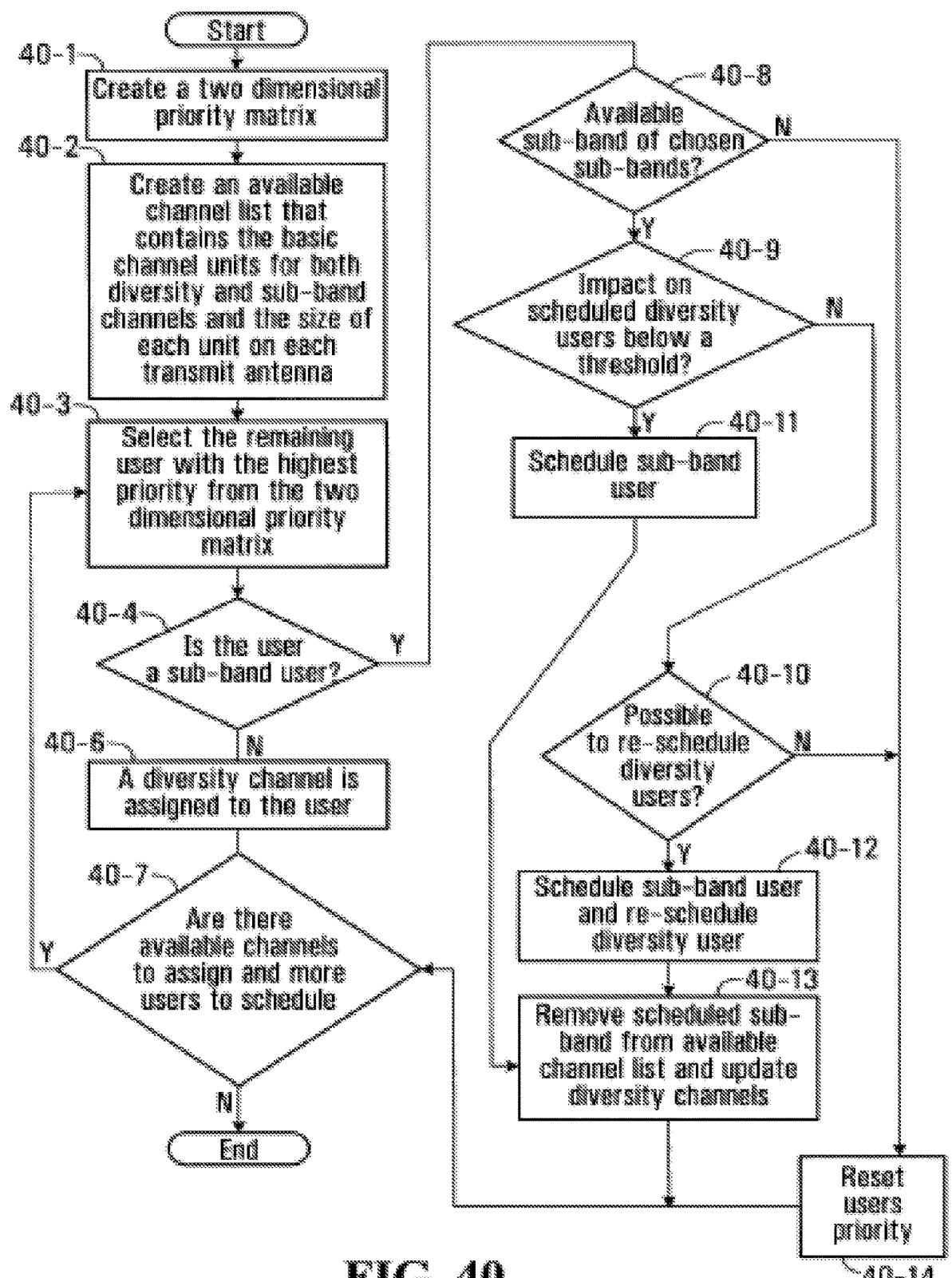
FIG. 40 is a flowchart of an example method of scheduling diversity users and sub-band users.

With reference to FIG. 40, in accordance with an embodiment of the invention a scheduling scheme is provided as follows:

40-1) Create a two-dimensional priority matrix, where the first N.sub.s columns represent each user's priority for the individual bands and the last column represents the priority for the entire band. If a mobile is not reporting a CIR on each individual band then set the individual sub-band priorities for the user to zero. For mobiles that report a CIR for some or all of the sub-bands, the diversity priority is set to zero if the full band CIR is not reported. If both full band CIR and sub-band CIR are reported and if the sub-band CIR maps to the same data rate as the full band CIR then the sub-band priority may be set to zero as, in this case, there may be no benefit to assigning a sub-band. The following is an example of such a matrix, where P.sub.i,j is the priority for the i.sup.th user in the j.sup.th band, and P.sub.i is the i.sup.th user's priority for the entire band. Any appropriate prioritization scheme can be employed.

$$\begin{bmatrix} P_{1,1} & P_{1,2} & \ldots & P_{1,N_b} & P_1 \\ P_{2,1} & P_{2,2} & \ldots & P_{2,N_b} & P_2 \\ \vdots & \vdots & \ldots & \vdots & \vdots \\ P_{n,1} & P_{n,2} & \ldots & P_{n,N_b} & P_n \end{bmatrix}$$

40-2) Create an available channel list that contains the basic sub-channels for both diversity and sub-band channels and the size of each unit on each transmit antenna. An example of such a channel list is as follows where D.sub.i is a diversity channel unit and S.sub.i is a sub-band channel unit (the same as a resource block as defined previously). The same approach can be used for an arbitrary number (one or more) of antennas by providing a column for each antenna.

| Channel Unit | Available sub-carriers on antenna 1 | Available sub-carriers on antenna 2 |
|---|---|---|
| $D_1$ | $B_{D,1}^{(1)}$ | $B_{D,1}^{(2)}$ |
| $D_2$ | $B_{D,2}^{(1)}$ | $B_{D,2}^{(2)}$ |
| ... | ... | ... |
| $D_d$ | $B_{D,d}^{(1)}$ | $B_{D,d}^{(2)}$ |
| $S_1$ | $B_{S,1}^{(1)}$ | $B_{S,1}^{(2)}$ |
| ... | ... | ... |
| $S_s$ | $B_{S,s}^{(1)}$ | $B_{S,s}^{(2)}$ |

40-3) Select the user with the highest priority from the two-dimensional priority matrix.

40-4) Is the user a sub-band user?

If the user is a sub-band user (yes path, step 40-4) then at step 40-5, if there is an available sub-band channel on the chosen sub-band (yes path, step 40-8), and if the impact to the previously scheduled diversity channels is below a threshold (yes path, step 40-9) (e.g. the number of sub-carriers that may be taken from the diversity channel and still allow that diversity channel to be re-scheduled at an equivalent data rate to what was assigned previously), or preferably there is no impact, then a sub-band channel is assigned that has an impact to all of the diversity channels that is below a threshold at step 40-11. In some embodiments a sub-channel which has the least impact is assigned. If the impact on diversity users is not below the threshold (no path, step 40-9) then if the previously scheduled diversity channels cannot be re-assigned (no path, step 40-10) then a choice may be made not to schedule the sub-band user. Accordingly, the user's priority can be set to zero at step 40-14 and go back to step 40-3. Otherwise, continue. If the impacted diversity channels can be re-assigned (yes path, step 40-10) then the sub-band user is scheduled, and the diversity users re-assigned at step 40-12.

After scheduling, the assigned sub-band channel is removed from available channel list, and the size of diversity channels (available and scheduled) is updated at step 40-13.

If the user is a diversity user (no path, step 40-4), then a diversity channel is assigned to the user at step 40-6.

If there are available channels to assign and there are more users to schedule then go back to step 40-3.

A very specific method of scheduling has been described with reference to FIG. 40. This is a very specific combination of features that a scheduler may employ. More generally, subsets of these features may be present in a given implementation.

For example, in some embodiments a scheduling method is provided that involves scheduling each receiver to either a sub-band channel or a diversity channel as a function of information received from receivers. A selection of sub-bands, or sub-band CQI information, or a preference for sub-band vs. diversity channel are three examples of such information.

In some embodiments, the method involves defining a priority for each receiver, and attempting to schedule each receiver in order of priority.

According to an embodiment of the invention, in the case of MIMO transmission, using for example per antenna rate control (PARC) or space-time transmit diversity (STTD), the scheduling procedure is the same. However, for PARC or for the mixed case where some users are using PARC and some STTD, the available channel list and the priority matrix may be maintained per transmit antenna. Despite the fact that the example shown above is for a MIMO scenario, the scheduling schemes set out above and below are applicable to a one antenna arrangement.

According to another embodiment of the invention, instead of re-assigning the resources for the previously scheduled diversity users after a sub-band user is scheduled, the scheduler may account for the amount of resources that are required for each of the scheduled diversity user and assign the actual diversity channels after the users are selected and the sub-band users are assigned a sub-band channel.

When determining the impact of assigning a sub-band channel on the diversity channels, the number of sub-carriers remaining in the diversity channels and the distance between the sub-carriers may both be considered. The sub-band assignment should minimize the number of sub-carriers taken away from the diversity channels and the distance between the remaining sub-carriers should be maximized.

According to another embodiment of the invention a multi-slot/persistent resource assignment scheme is provided by the following. In the case of delay sensitive traffic with a constant packet arrival rate, such as VoIP, the scheduler may pre-assign multiple slots spaced at an interval equal to the packet arrival rate. The benefit of assigning multiple slots is that it reduces the signaling overhead. Since the VoIP users are pre-scheduled, only the non-VoIP users are scheduled using the above method.

The multi-slot assignment may start from the first OFDM symbol of the slot. If the multi-slot assignment does not completely occupy a symbol then the remaining sub-carriers in the symbol belong to the same channel format (diversity or sub-band). In a scheduling instance, the number of channel units that are used for multi-slot transmission are signaled by the base station. That is to say the number of channel units is signaled, rather than the user, data rate and channel. This allows the other users to know how much was pre-assigned so they know where the current assignment starts and it avoids the signaling associated with identifying the user, data rate and channel, because it is the same as the initial assignment. The non-persistent channel assignment may start from the first channel unit of the remaining channel units.

When a user is pre-scheduled for multiple slots, the data rate and the amount of resources may be kept constant. In order to track each user's channel, power management may be used in place of rate control. If a given user's channel improves, less power may be allocated to the sub-carriers assigned to the user and more power can be assigned to the users that have a worse channel condition. Once a multiple slot format has been assigned, subsequent sub-band allocation may be performed if it does not puncture any of the sub-carriers from the assigned multi-slot channel.

In some embodiments, when the base station detects a silent slot from a user for a given number of slots, the base station removes the persistent assignment until a non-silent slot is detected.

More generally, in some embodiments, scheduling is implemented so as to allocate some resources persistently over multiple slots and allocate other resources non-persistently. In some embodiments, the persistently allocated resources are located at the beginning of each slot and signaling information is sent indicating how much resource has been allocated persistently, with non-persistent allocations following the persistent allocations.

VoIP traffic is a particular example of a type of traffic that would benefit from persistent allocation in combination with synchronous HARQ.

In an embodiment of the invention providing persistently allocated capacity for VoIP with Synchronous HARQ, only two MCS (modulation and coding scheme) levels are used for VoIP traffic. The MCS is assigned at the beginning of the call and is only changed if transmitter (such as a base station) detects a significant change in the receiver's (such as a mobile station) average reported CQI.

Since the MCS is constant for a number of transmissions while the mobile station's CQI is varying, power management can be used to improve the use of the resources. The mobile station reports CQI to the base station for this purpose; the CQI reporting can come in any form. Specific examples include multi-level, differential, single bit up/down, two bit up/down/no change.

The power is adjusted based on the mobile station's reported CQI. No additional signaling from the base station to the mobile station is required. A mapping between the amount of power adjustment and the reported CQI is employed to select the power adjustment; this mapping is known to both the base station and the mobile station.

In some embodiments, if the mobile station reports a CQI that maps to a higher MCS than the operating MCS then the power is decreased by the amount specified for the difference between the two MCS levels. If the mobile station reports a CQI that maps to a lower MCS than the operating MCS then no power adjustment is performed.

According to another embodiment of the invention both persistent and non-persistent transmissions may use asynchronous HARQ, where all retransmitted packets are assigned a higher priority than non-retransmitted packets. In this case, a retransmission may be scheduled as soon as a NAK is received. The retransmitted packet may be assigned the same modulation and coding scheme as the initial transmission, however, the assigned channel may be different.

Figure 35:
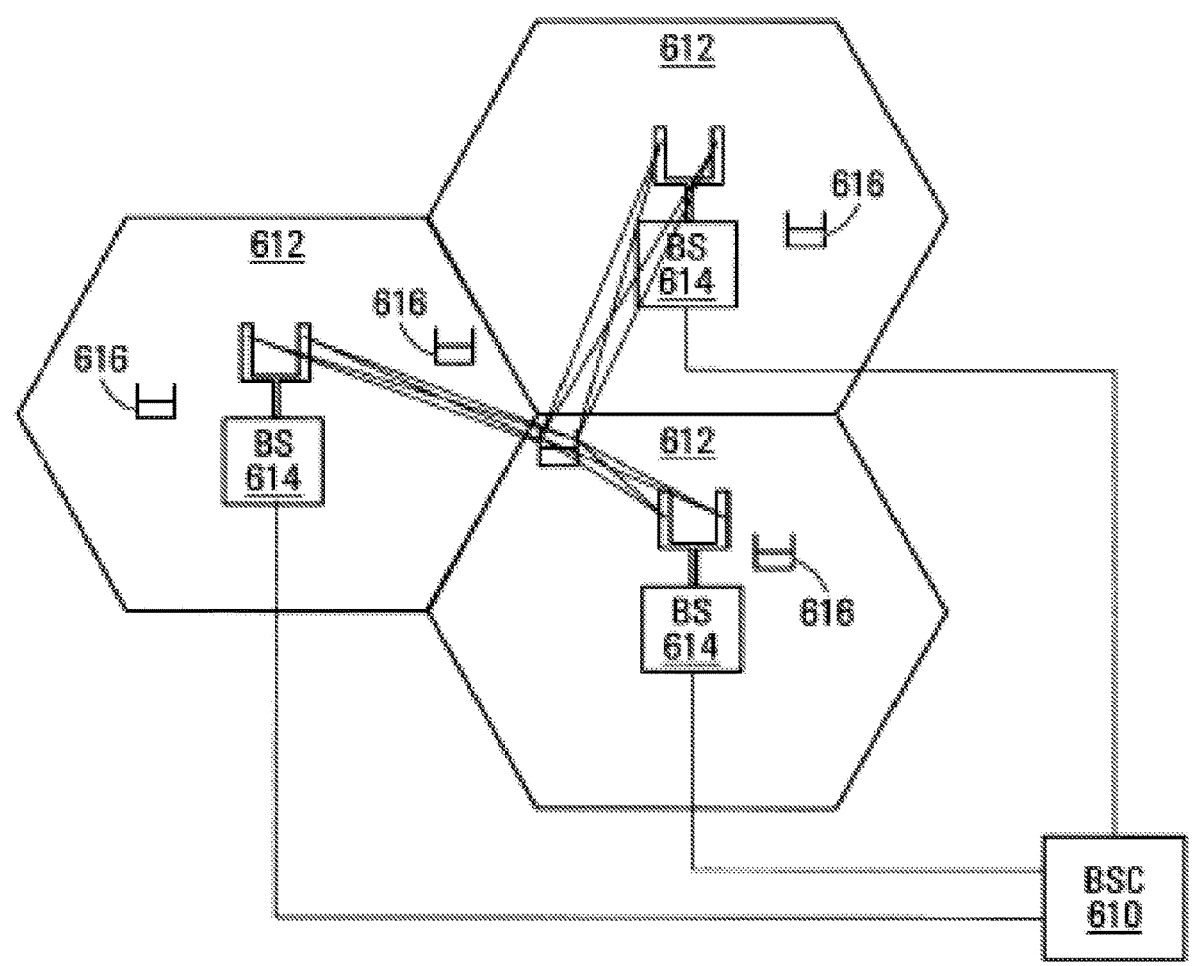
FIG. 35 is a block diagram of a cellular communication system.

For the purposes of providing context for embodiments of the invention for use in a communication system, FIG. 35 shows a base station controller (BSC) 610 which controls wireless communications within multiple cells 612, which cells are served by corresponding base stations 614. In general, each base station 614 facilitates communications using OFDM with mobile and/or wireless terminals 616, which are within the cell 612 associated with the corresponding base station 614. The movement of the mobile stations 616 in relation to the base stations 614 results in significant fluctuation in channel conditions. As illustrated, the base stations 614 and mobile stations 616 may include multiple antennas to provide spatial diversity for communications.

Figure 36:
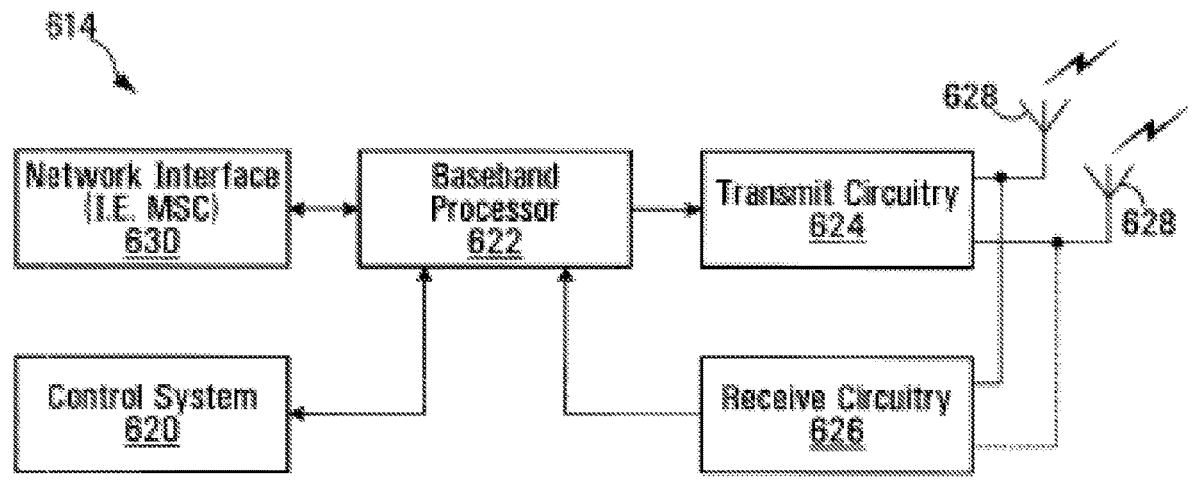
FIG. 36 is a block diagram of an example base station that might be used to implement some embodiments of the present invention.

A high level overview of the mobile stations 616 and base stations 614 upon which aspects of the present invention may be implemented is provided prior to delving into the structural and functional details of the preferred embodiments. With reference to FIG. 36, a base station 614 is illustrated. The base station 614 generally includes a control system 620, a baseband processor 622, transmit circuitry 624, receive circuitry 626, multiple antennas 628, and a network interface 630. The receive circuitry 626 receives radio frequency signals bearing information from one or more remote transmitters provided by mobile stations 616 (illustrated in FIG. 35). A low noise amplifier and a filter (not shown) may be provided that cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 622 processes the digitized received signal to extract the information or data bits conveyed in the received signal. This processing typically comprises demodulation, decoding, and error correction operations. As such, the baseband processor 622 is generally implemented in one or more digital signal processors (DSPs) or application-specific integrated circuits (ASICs). The received information is then sent across a wireless network via the network interface 630 or transmitted to another mobile station 16 serviced by the base station 614.

On the transmit side, the baseband processor 622 receives digitized data, which may represent voice, data, or control information, from the network interface 630 under the control of control system 620, and encodes the data for transmission. The encoded data is output to the transmit circuitry 624, where it is modulated by a carrier signal having a desired transmit frequency or frequencies. A power amplifier (not shown) will amplify the modulated carrier signal to a level appropriate for transmission, and deliver the modulated carrier signal to the antennas 628 through a matching network (not shown). Modulation and processing details are described in greater detail below.

Figure 37:
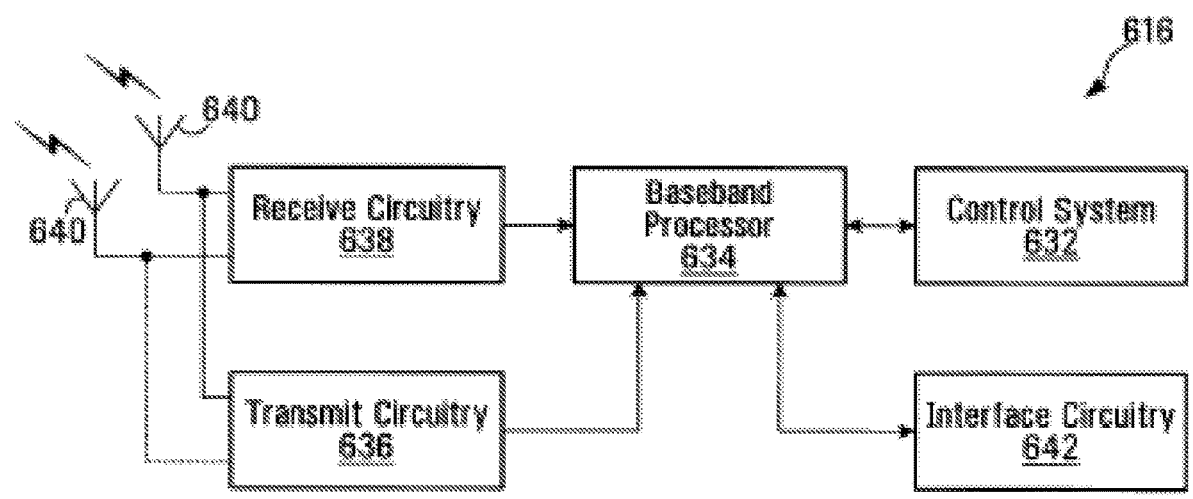
FIG. 37 is a block diagram of an example wireless terminal that might be used to implement some embodiments of the present invention.

With reference to FIG. 37, a mobile station 616 configured according to one embodiment of the present invention is illustrated. Similarly to the base station 614, the mobile station 616 will include a control system 632, a baseband processor 634, transmit circuitry 636, receive circuitry 638, one or multiple antennas 640, and user interface circuitry 642. The receive circuitry 638 receives radio frequency signals bearing information from one or more base stations 614. A low noise amplifier and a filter (not shown) may be provided that cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 634 processes the digitized received signal to extract the information or data bits conveyed in the received signal. This processing typically comprises demodulation, decoding, and error correction operations. The baseband processor 634 is generally implemented in one or more digital signal processors (DSPs) and application specific integrated circuits (ASICs).

For transmission, the baseband processor 634 receives digitized data, which may represent voice, data, or control information, from the control system 632, which it encodes for transmission. The encoded data is output to the transmit circuitry 636, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 640 through a matching network (not shown). Various modulation and processing techniques available to those skilled in the art are used for signal transmission between the mobile station and the base station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for downlink and/or uplink transmission between the base stations 614 to the mobile stations 616. Each base station 614 is equipped with "n" (≥1) transmit antennas 628, and each mobile station 616 is equipped with "m" (≥1) receive antennas 640. Notably, the respective antennas can be used for reception and transmission using appropriate duplexers or switches and are so labelled only for clarity.

Figure 38:
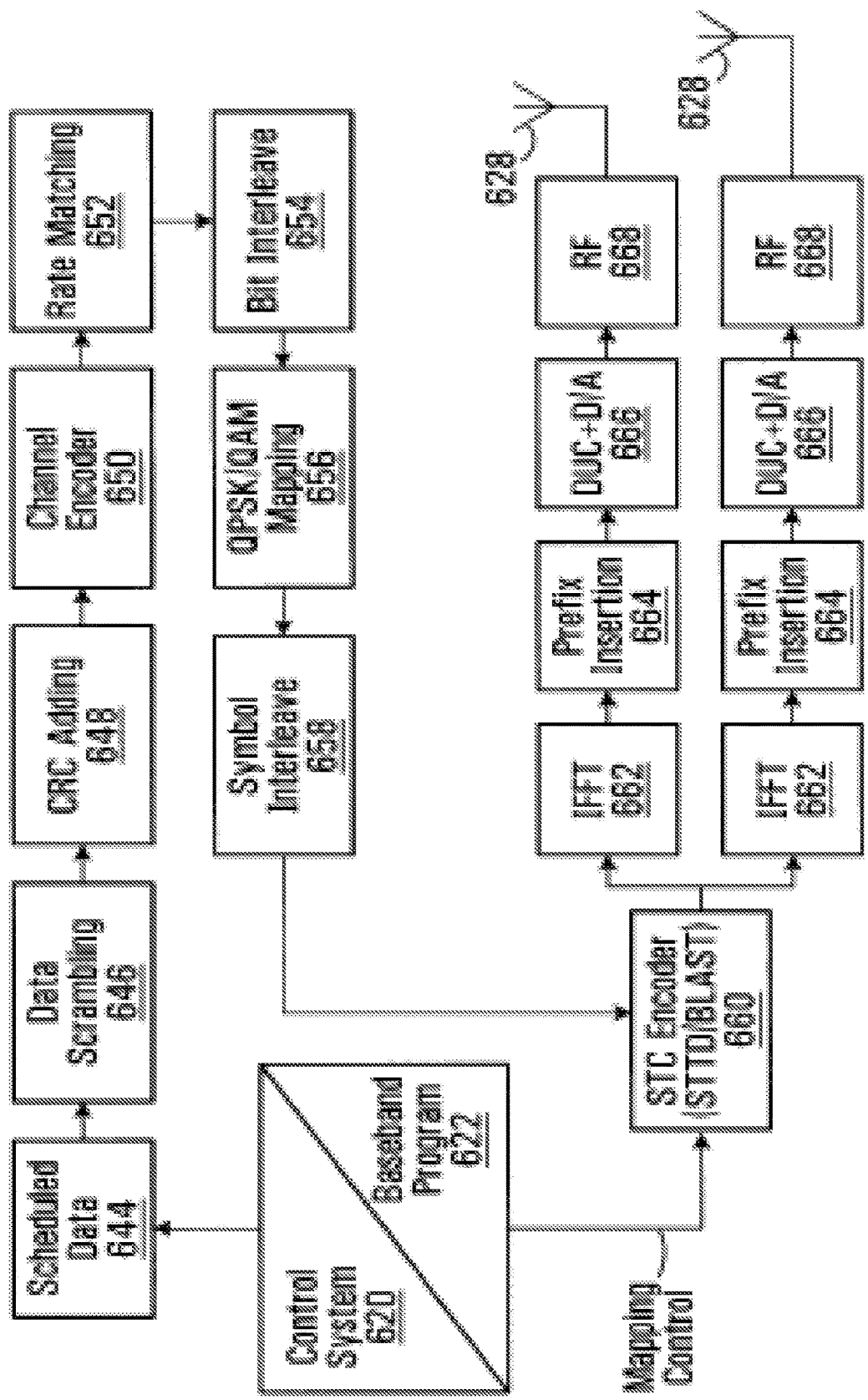
FIG. 38 is a block diagram of a logical breakdown of an example OFDM transmitter architecture that might be used to implement some embodiments of the present invention.

With reference to FIG. 38, a logical OFDM transmission architecture will be described. Initially, the base station controller 610 will send data to be transmitted to various mobile stations 616 to the base station 614. The base station 614 may use the channel quality indicators (CQIs) associated with the mobile stations to schedule the data for transmission as well as select appropriate coding and modulation for transmitting the scheduled data. The CQIs may be directly from the mobile stations 616 or determined at the base station 614 based on information provided by the mobile stations 616. In either case, the CQI for each mobile station 616 is a function of the degree to which the channel amplitude (or response) varies across the OFDM frequency band.

Scheduled data 644, which is a stream of bits, may be scrambled in a manner reducing the peak-to-average power ratio associated with the data using data scrambling logic 646. A cyclic redundancy check (CRC) for the scrambled data is determined and appended to the scrambled data using CRC adding logic 648. Next, channel coding is performed using channel encoder logic 650 to effectively add redundancy to the data to facilitate recovery and error correction at the mobile station 616. Again, the channel coding for a particular mobile station 616 may be based on the CQI. In some implementations, the channel encoder logic 650 uses known Turbo encoding techniques. The encoded data is then processed by rate matching logic 652 to compensate for the data expansion associated with encoding.

Bit interleaver logic 654 systematically reorders the bits in the encoded data to minimize the loss of consecutive data bits. The resultant data bits are systematically mapped into corresponding symbols depending on the chosen baseband modulation by mapping logic 656. In some embodiments, Quadrature Amplitude Modulation (QAM) or Quadrature Phase Shift Key (QPSK) modulation is used. The degree of modulation may be chosen based on the CQI for the particular mobile station. The symbols may be systematically reordered to further bolster the immunity of the transmitted signal to periodic data loss caused by frequency selective fading using symbol interleaver logic 658.

At this point, groups of bits have been mapped into symbols representing locations in an amplitude and phase constellation. When spatial diversity is desired, blocks of symbols are then processed by space-time block code (STC) encoder logic 660, which modifies the symbols in a fashion making the transmitted signals more resistant to interference and more readily decoded at a mobile station 616. The STC encoder logic 660 will process the incoming symbols and provide "n" outputs corresponding to the number of transmit antennas 628 for the base station 14. The control system 20 and/or baseband processor 622 as described above with respect to FIG. 36 will provide a mapping control signal to control STC encoding. At this point, assume the symbols for the "n" outputs are representative of the data to be transmitted and capable of being recovered by the mobile station 616.

For the present example, assume the base station 614 has two antennas 28 (n=2) and the STC encoder logic 660 provides two output streams of symbols. Accordingly, each of the symbol streams output by the STC encoder logic 660 is sent to a corresponding IFFT processor 662, illustrated separately for ease of understanding. Those skilled in the art will recognize that one or more processors may be used to provide such digital signal processing, alone or in combination with other processing described herein. The IFFT processors 662 will preferably operate on the respective symbols to provide an inverse Fourier Transform. The output of the IFFT processors 662 provides symbols in the time domain. Each set of time domain symbols output by the IFFT processors 662 (each "frame") is associated with a prefix by prefix insertion logic 664. Each of the resultant signals is up-converted in the digital domain to an intermediate frequency and converted to an analog signal via the corresponding digital up-conversion (DUC) and digital-to-analog (D/A) conversion circuitry 666. The resultant (analog) signals are then simultaneously modulated at the desired RF frequency, amplified, and transmitted via the RF circuitry 668 and antennas 628. Pilot signals known by the intended mobile station 616 may also be transmitted. These may for example be scattered among the sub-carriers. The mobile station 616, which is discussed in detail below, will use the pilot signals for channel estimation. Note that many examples have been provided above of how user content can be mapped to OFDM sub-carriers. In the particular example of FIG. 38, the different sub-band and diversity channels are appropriately mapped to inputs of the IFFT functions. A channelizer (not shown) maps the symbols to the OFDM sub-carriers using any of the schemas described above.

Figure 39:
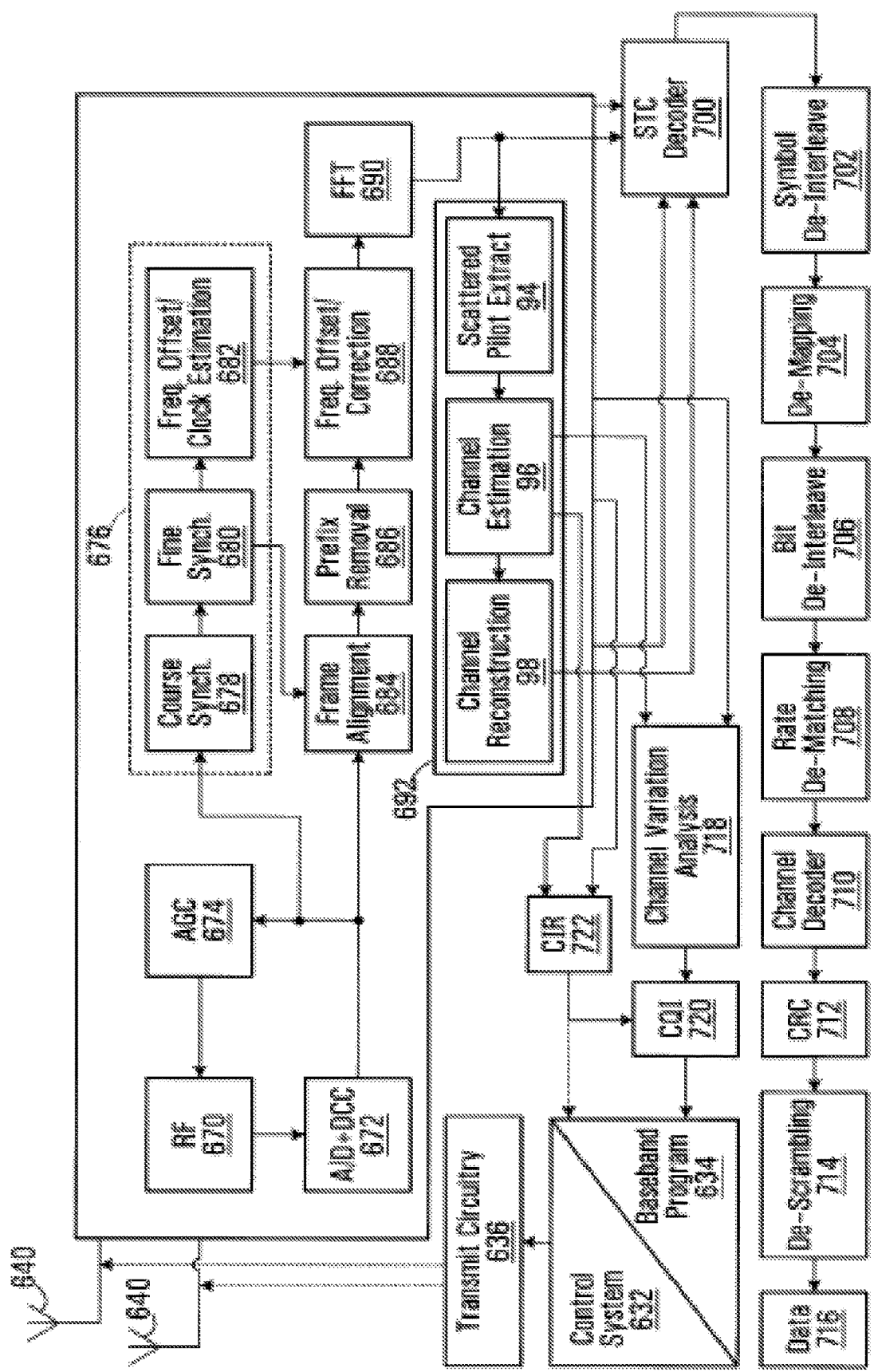
FIG. 39 is a block diagram of a logical breakdown of an example OFDM receiver architecture that might be used to implement some embodiments of the present invention.

Reference is now made to FIG. 39 to illustrate reception of the transmitted signals by a mobile station 616. Upon arrival of the transmitted signals at each of the antennas 640 of the mobile station 616, the respective signals are demodulated and amplified by corresponding RF circuitry 670. For the sake of conciseness and clarity, only one of the two receive paths is described and illustrated in detail. Analog-to-digital (A/D) converter and down-conversion circuitry 672 digitizes and downconverts the analog signal for digital processing. The resultant digitized signal may be used by automatic gain control circuitry (AGC) 674 to control the gain of the amplifiers in the RF circuitry 670 based on the received signal level.

Initially, the digitized signal is provided to synchronization logic 676, which includes coarse synchronization logic 678, which buffers several OFDM symbols and calculates an auto-correlation between the two successive OFDM symbols. A resultant time index corresponding to the maximum of the correlation result determines a fine synchronization search window, which is used by fine synchronization logic 680 to determine a precise framing starting position based on the headers. The output of the fine synchronization logic 680 facilitates frame acquisition by frame alignment logic 684. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 686 and resultant samples are sent to frequency offset correction logic 688, which compensates for the system frequency offset caused by the unmatched local oscillators in the transmitter and the receiver. Preferably, the synchronization logic 676 includes frequency offset and clock estimation logic 682, which is based on the headers to help estimate such effects on the transmitted signal and provide those estimations to the correction logic 688 to properly process OFDM symbols.

At this point, the OFDM symbols in the time domain are ready for conversion to the frequency domain using FFT processing logic 690. The results are frequency domain symbols, which are sent to processing logic 692. The processing logic 692 extracts the scattered pilot signal using scattered pilot extraction logic 694, determines a channel estimate based on the extracted pilot signal using channel estimation logic 696, and provides channel responses for all sub-carriers using channel reconstruction logic 698. In order to determine a channel response for each of the sub-carriers, the pilot signal is essentially multiple pilot symbols that are scattered among the data symbols throughout the OFDM sub-carriers in a known pattern in both time and frequency. Continuing with FIG. 39, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 700, which provides STC decoding on both received paths to recover the transmitted symbols. The channel reconstruction information provides equalization information to the STC decoder 700 sufficient to remove the effects of the transmission channel when processing the respective frequency domain symbols The recovered symbols are placed back in order using symbol de-interleaver logic 702, which corresponds to the symbol interleaver logic 658 of the transmitter. The de-interleaved symbols are then demodulated or de-mapped to a corresponding bitstream using de-mapping logic 704. The bits are then de-interleaved using bit de-interleaver logic 706, which corresponds to the bit interleaver logic 654 of the transmitter architecture. The de-interleaved bits are then processed by rate de-matching logic 708 and presented to channel decoder logic 710 to recover the initially scrambled data and the CRC checksum. Accordingly, CRC logic 712 removes the CRC checksum, checks the scrambled data in traditional fashion, and provides it to the de-scrambling logic 714 for de-scrambling using the known base station de-scrambling code to recover the originally transmitted data 716.

In parallel to recovering the data 716, a CQI, or information sufficient to create a CQI at the base station 614, may be determined and transmitted to the base station 614. As noted above, the CQI may be a function of the carrier-to-interference ratio (CR), as well as the degree to which the channel response varies across the various sub-carriers in the OFDM frequency band. For this embodiment, the channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

FIGS. 35 to 39 provide one specific example of a communication system that could be used to implement embodiments of the invention. It is to be understood that embodiments of the invention can be implemented with communications systems having architectures that are different than the specific example, but that operate in a manner consistent with the implementation of the embodiments as described herein.

The MAC (media access control) layer is used to enable features in the physical (PHY) layer in an OFDM air interface framework. Frames are a format used to transmit data over the air interface between base stations and wireless terminals. A wireless terminal is any OFDM capable wireless device and may be fixed location, nomadic or mobile, for example a cellular telephone, computer with a wireless modem, or PDA. Some types of information elements (IE) are included in the frame to provide a structure within the frame for defining where downlink and uplink information are located within the frame.

In respect of a transmitter that uses the channelization approaches taught above, this may include the transmissions of one or more of sub-band channel assignments and/or definitions, diversity channel assignments, and/or definitions, POPR signaling, and partial activation information. This may include the reception of one or more CQI, sub-band vs diversity channel preferences, and preferred sub-band information.

In the embodiments described above, all of the diversity channels are assumed to be distributed in the frequency domain. In another embodiment, diversity channels are defined that use one or more sub-carriers, but with distribution in the time domain. There would be content on select spaced OFDM symbol durations for a given time domain diversity channel. Similar naming approaches can be adopted to define sub-channels and diversity channels using time domain diversity.

Numerous modifications and variations of the present invention are possible in light of the above teachings. It is therefore to be understood that within the scope of the appended claims, the invention may be practiced otherwise than as specifically described herein.

What is claimed is:

1. An apparatus, comprising:
a memory; and
a processing element coupled to the memory, wherein the processing element is configured to:
partition a plurality of subcarriers of an orthogonal frequency division multiplexing (OFDM) band into a plurality of sub-bands, wherein each sub-band comprises a respective contiguous set of sub-carriers across a plurality of orthogonal frequency division multiplexing (OFDM) symbol durations;
map first encoded data for a first user equipment device onto a first diversity channel of a plurality of diversity channels, wherein the first diversity channel utilizes a first set of distributed sub-bands of the plurality of sub-bands in a first plurality of OFDM symbols and a second set of distributed sub-bands of the plurality of sub-bands in a second plurality of OFDM symbols, wherein the second set of distributed sub-bands are shifted in frequency from the first set of distributed sub-bands;
map second encoded data for a second user equipment device onto a first sub-band channel of a plurality of sub-band channels, wherein the sub-band channel utilizes a set of contiguous sub-bands in the first and second plurality of OFDM symbols, wherein the sub-band channel utilizes sub-bands located at the same frequencies for the first and second plurality of OFDM symbols; and transmit, via a wireless interface, the plurality of diversity and sub-band channels within an OFDM band.

2. The apparatus of claim 1, wherein the processing element is further configured to apply a Discrete Fourier Transform (DFT) pre-transformation to the first or second encoded data prior to OFDM modulation.

3. The apparatus of claim 1, wherein the processing element is further configured to transmit the plurality of diversity and sub-band channels on a downlink to one or more mobile devices.

4. The apparatus of claim 1, wherein the sub-bands are organized into allowable respective combinations for the sub-band channels and the diversity channels.

5. The apparatus of claim 1, wherein each sub-band used in one of the diversity or sub-band channels includes an equal number of subcarriers, and wherein each sub-band used in one of the diversity or sub-band channels includes an equal number of OFDM symbol durations.

6. The apparatus of claim 1, wherein the plurality sub-bands of the OFDM band are divided into sub-bands for diversity channels and sub-bands for sub-band channels, and wherein the division into sub-bands is changed dynamically for each transmit time interval.

7. The apparatus of claim 1, wherein transmission of the plurality of diversity and sub-band channels within the OFDM band includes scattered pilots.

8. A method of operating a base station, comprising:
partitioning a plurality of subcarriers of an orthogonal frequency division multiplexing (OFDM) band into a plurality of sub-bands, wherein each sub-band comprises a respective contiguous set of sub-carriers across a plurality of orthogonal frequency division multiplexing (OFDM) symbol durations;
mapping first encoded data for a first user equipment device onto a first diversity channel of a plurality of diversity channels, wherein the first diversity channel utilizes a first set of distributed sub-bands of the plurality of sub-bands in a first plurality of OFDM symbols and a second set of distributed sub-bands of the plurality of sub-bands in a second plurality of OFDM symbols, wherein the second set of distributed sub-bands are shifted in frequency from the first set of distributed sub-bands;
mapping second encoded data for a second user equipment device onto a first sub-band channel of a plurality of sub-band channels, wherein the sub-band channel utilizes a set of contiguous sub-bands in the first and second plurality of OFDM symbols, wherein the sub-band channel utilizes sub-bands located at the same frequencies for the first and second plurality of OFDM symbols; and
transmitting, via a wireless interface of the base station, the plurality of diversity and sub-band channels within an OFDM band.

9. The method of claim 8, further comprising applying a Discrete Fourier Transform (DFT) pre-transformation to the first or second encoded data prior to OFDM modulation.

10. The method of claim 8, wherein the transmitting of the plurality of diversity and sub-band channels occurs on a downlink to one or more mobile devices.

11. The method of claim 8, wherein the sub-bands are organized into allowable respective combinations for the sub-band channels and the diversity channels.

12. The method of claim 8, wherein each sub-band used in one of the diversity or sub-band channels includes an equal number of subcarriers, and wherein each sub-band used in one of the diversity or sub-band channels includes an equal number of OFDM symbol durations.

13. The method of claim 8, wherein the plurality sub-bands of the OFDM band are divided into sub-bands for diversity channels and sub-bands for sub-band channels, and wherein the division into sub-bands is changed dynamically for each transmit time interval.

14. The method of claim 8, wherein transmission of the plurality of diversity and sub-band channels within the OFDM band includes scattered pilots.

15. A base station for communicating with one or more mobile stations, comprising:
a memory that stores processor executable program instructions; and
a processor coupled to the memory, wherein the program instructions, when executed by the processor, cause the processor to:
partition a plurality of subcarriers of an orthogonal frequency division multiplexing (OFDM) band into a plurality of sub-bands, wherein each sub-band comprises a respective contiguous set of sub-carriers across a plurality of orthogonal frequency division multiplexing (OFDM) symbol durations;
map first encoded data for a first user equipment device onto a first diversity channel of a plurality of diversity channels, wherein the first diversity channel utilizes a first set of distributed sub-bands of the plurality of sub-bands in a first plurality of OFDM symbols and a second set of distributed sub-bands of the plurality of sub-bands in a second plurality of OFDM symbols, wherein the second set of distributed sub-bands are shifted in frequency from the first set of distributed sub-bands;
map second encoded data for a second user equipment device onto a first sub-band channel of a plurality of sub-band channels, wherein the sub-band channel utilizes a set of contiguous sub-bands in the first and second plurality of OFDM symbols, wherein the sub-band channel utilizes sub-bands located at the same frequencies for the first and second plurality of OFDM symbols; and
transmit, via a wireless interface, the plurality of diversity and sub-band channels within an OFDM band.

16. The base station of claim 15, wherein the processor is further configured to apply a Discrete Fourier Transform (DFT) pre-transformation to the first or second encoded data prior to OFDM modulation.

17. The base station of claim 15, wherein the processor is further configured to transmit the plurality of diversity and sub-band channels on a downlink to one or more mobile devices.

18. The base station of claim 15, wherein the sub-bands are organized into allowable respective combinations for the sub-band channels and the diversity channels.

19. The base station of claim 15, wherein each sub-band used in one of the diversity or sub-band channels includes an equal number of subcarriers, and wherein each sub-band used in one of the diversity or sub-band channels includes an equal number of OFDM symbol durations.

20. The base station of claim 15, wherein the plurality sub-bands of the OFDM band are divided into sub-bands for diversity channels and sub-bands for sub-band channels, and wherein the division into sub-bands is changed dynamically for each transmit time interval.

* * * * *